(12) United States Patent
Chang et al.

(10) Patent No.: US 10,761,297 B2
(45) Date of Patent: *Sep. 1, 2020

(54) OPTICAL IMAGE CAPTURING SYSTEM

(71) Applicant: ABILITY OPTO-ELECTRONICS TECHNOLOGY CO.LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 149 days.

This patent is subject to a terminal disclaimer.

(21) Appl. No.: 16/038,681

(22) Filed: Jul. 18, 2018

(65) Prior Publication Data

US 2019/0285842 A1 Sep. 19, 2019

(30) Foreign Application Priority Data

Mar. 14, 2018 (TW) .............................. 107108701 A

(51) Int. Cl.
*G02B 9/62* (2006.01)
*H04N 5/357* (2011.01)
(Continued)

(52) U.S. Cl.
CPC .......... *G02B 9/62* (2013.01); *G02B 27/0037* (2013.01); *H04N 5/2254* (2013.01); *H04N 5/357* (2013.01)

(58) Field of Classification Search
CPC .. G02B 13/0045; G02B 9/60; G02B 27/0025; G02B 13/18; G02B 5/208; G02B 5/005; G02B 13/002; G02B 3/04; G02B 13/0015; G02B 13/04; G02B 13/06; G02B 1/041; G02B 9/62; G02B 13/004; G02B 9/34; G02B 13/006; G02B 13/02; G02B 9/00;
(Continued)

(56) References Cited

U.S. PATENT DOCUMENTS

2014/0177076 A1\* 6/2014 Hsu ......................... G02B 9/60
359/714
2017/0269337 A1\* 9/2017 Lai ..................... G02B 13/0045
(Continued)

FOREIGN PATENT DOCUMENTS

TW           M553425         12/2017

*Primary Examiner* — William R Alexander
*Assistant Examiner* — Sharrief I Broome
(74) *Attorney, Agent, or Firm* — Muncy, Geissler, Olds & Lowe, P.C.

(57) ABSTRACT

A six-piece optical image capturing system is provided. In order from an object side to an image side along the optical axis, the optical image capturing system includes a first lens element, a second lens element, a third lens element, a fourth lens element, a fifth lens element, a sixth lens element. A least one of the first lens element through the fifth lens element has positive refractive power. The sixth lens element has negative refractive power. At least one of the image-side surface and object-side surface thereof is aspheric. At least one of the surfaces of the sixth lens element has an inflection point. The six lenses have refractive power. The optical lens can increase aperture value and improve the image quality for use in compact cameras.

25 Claims, 19 Drawing Sheets

(51) Int. Cl.
*H04N 5/225* (2006.01)
*G02B 27/00* (2006.01)

(58) Field of Classification Search
CPC .... G02B 13/00; G02B 13/001; H04N 5/2254; H04N 5/2253; H04N 5/225; H04N 5/2258; H04N 13/282; H04N 2101/00; H04N 5/2252; H04N 5/2257; H04N 5/232; H04N 5/23212; H04N 5/23296; H04N 5/2351; H04N 5/374; H04N 9/045; H04N 9/097
See application file for complete search history.

(56) References Cited

U.S. PATENT DOCUMENTS

2017/0269338 A1* 9/2017 Lai .................... G02B 5/208
2018/0203208 A1* 7/2018 Hsueh ................. G02B 3/04

* cited by examiner

OPTICAL IMAGE CAPTURING SYSTEM

CROSS-REFERENCE TO RELATED APPLICATION

This application claims the benefit of Taiwan Patent Application No. 107108701, filed on Mar. 14, 2018, in the Taiwan Intellectual Property Office, the disclosure of which is incorporated herein in its entirety by reference.

BACKGROUND OF THE INVENTION

1. Field of the Invention

The present invention generally relates to an optical system, and more particularly to a compact optical image capturing system for an electronic device.

2. Description of the Related Art

In recent years, with the rise of portable electronic devices having camera functionalities, the demand for an optical image capturing system has gradually been raised. The image-sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image-sensing device, the development of the optical image capturing system has gravitated towards the field of high pixels. Therefore, the requirement for high imaging quality is rapidly raised.

The conventional optical system of the portable electronic device usually has four or five lens elements. However, the optical system is required to have higher resolution and take pictures in a dark environment, in other words, the optical system is required to have a large aperture stop. A conventional optical system which provides high optical performance is required.

Another important issue is to increase the quantity of light entering the lens. In addition, a modern lens is also required to have several characteristics, including high image quality.

SUMMARY OF THE INVENTION

The aspect of embodiment of the present disclosure directs to an optical image capturing system and an optical image capturing lens which uses a combination of refractive powers, convex and concave surfaces of six-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameters in the embodiment of the present are shown as below for further reference.

The Lens Parameters Related to a Length or a Height in the Lens:
The maximum height for image formation of the optical image capturing system is denoted by HOI. The height of the optical image capturing system is denoted by HOS. A distance from the object-side surface of the first lens elements to the image-side surface of the sixth lens is denoted by InTL. The distance from the first lens element to the second lens element is denoted by IN12 (instance). The central thickness of the first lens of the optical image capturing system on the optical axis is denoted by TP1 (instance).

The Lens Parameters Related to a Material in the Lens:
The Coefficient of dispersion of the first lens element in the optical image capturing system is denoted by NA1 (instance). The refractive index of the first lens element is denoted by Nd1 (instance).

The Lens Parameters Related to a View Angle of the Lens:
The view angle is denoted by AF. Half of the view angle is denoted by HAF. The major light angle is denoted by MRA.

The Lens Parameter Related to Exit/Entrance Pupil in the Lens:
The entrance pupil diameter of the optical image capturing system is denoted by HEP. The exit pupil diameter of the optical image capturing system is the image formed with respect to the image space after the light passes through the lens elements assembly behind the aperture stop. The exit pupil diameter is denoted by HXP. For any surface of any lens element, the maximum effective half diameter (EHD) is a perpendicular distance between an optical axis and a crossing point on the surface where the incident light with a maximum viewing angle of the system passing the very edge of the entrance pupil. For example, the maximum effective half diameter of the object-side surface of the first lens element is denoted by EHD11. The maximum effective half diameter of the image-side surface of the first lens element is denoted by EHD12, the maximum effective half diameter of the object-side surface of the second lens is denoted by EHD21, the maximum effective half diameter of the image-side surface of the second lens is denoted by EHD22, and so on. The maximum effective diameter of the image-side surface which is nearest to the image plane of the optical image capturing system is denoted by PhiA, and the relationship is satisfied: PhiA=double EHD. If the surface is aspheric, the cut-off point of the maximum effective diameter namely includes the cut-off point of the aspherical surface. An ineffective half diameter (IHD) position of any surface of single lens element means the surficial section of the cut-off point (if it is an aspheric surface, a point end of the aspherical coefficient is on the surface) of the maximum effective diameter extending from the same surface away from the optical axis. The maximum diameter of the image-side surface of the lens element which is nearest to the image plane of the optical image capturing system is denoted by PhiB, and the relationship is satisfied: PhiB a double (a maximum EHD+a maximum IHD)=PhiA+a double (a maximum IHD).

In the optical image capturing system of the present disclosure, the maximum effective diameter of the image-side surface on the lens element that is closest to the image plane (i.e. image space) is the optical exit pupil thereof, and the maximum effective diameter is denoted by PhiA. For instance, when the optical exit pupil is at the image-side surface of the third lens element, the maximum effective diameter is denoted by PhiA3. When the optical exit pupil is at the image-side surface of the fourth lens element, the maximum effective diameter is denoted by PhiA4. When the optical exit pupil is at the image-side surface of the fifth lens element, the maximum effective diameter is denoted by PhiA5. When the optical exit pupil is at the image-side surface of the sixth lens element, the maximum effective diameter is denoted by PhiA6. For the optical image capturing system having different number of lens elements, the maximum effective diameter (optical exit pupil) may be denoted in a similar fashion. The pupil magnification ratio of the optical image capturing system is denoted by PMR, and the following condition is satisfied: PMR=PhiA/REP.

The Lens Parameters Related to an Arc Length of the Lens Shape and an Outline of Surface:
The length of the outline curve of the maximum effective half diameter position of any surface of a single lens element refers to a length of outline curve from an axial point on the surface of the lens element to the maximum effective half diameter position of the surface along an outline of the surface of the lens element and is denoted as ARS. For example, the length of the outline curve of the maximum effective half diameter position of the object-side surface of the first lens element is denoted as ARS11. The length of the outline curve of the maximum effective half diameter position of the image-side surface of the first lens element is denoted as ARS12. The length of the outline curve of the maximum effective half diameter position of the object-side surface of the second lens element is denoted as ARS21. The length of the outline curve of the maximum effective half diameter position of the image-side surface of the second lens element is denoted as ARS22. The lengths of the outline curves of the maximum effective half diameter position of any surface of the other lens elements in the optical image capturing system are denoted in a similar way.

A length of the outline curve of a half of a pupil diameter (HEP) of any surface of a single lens element refers to a length of the outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE. For example, the length of the outline curve of the half of the entrance pupil diameter (HEP) of the object-side surface of the first lens element is denoted as ARE11. The length of the outline curve of the half of the entrance pupil diameter (HEP) of the image-side surface of the first lens element is denoted as ARE12. The length of the outline curve of the half of the entrance pupil diameter (HEP) of the object-side surface of the second lens element is denoted as ARE21. The length of the outline curve of the half of the entrance pupil diameter (HEP) of the image-side surface of the second lens element is denoted as ARE22. The lengths of the outline curves of the half of the entrance pupil diameters (HEP) of any surface of the other lens elements in the optical image capturing system are denoted in a similar way.

The Lens Parameters Related to a Depth of the Lens Shape:
The distance parallel to the optical axis from a point where the optical axis passes through to an end point of the maximum effective semi diameter on the object-side surface of the sixth lens is denoted by InRS61 (the depth of the maximum effective semi diameter). The distance parallel to the optical axis from a point where the optical axis passes through to an end point of the maximum effective semi diameter on the image-side surface of the sixth lens is denoted by InRS62 (the depth of the maximum effective semi diameter). The depth of the maximum effective semi diameter (sinkage) on the object-side surface or the image-side surface of any other lens is denoted in the same manner.

The Lens Parameters Related to the Lens Shape:
The critical point C is a tangent point on a surface of a specific lens, and the tangent point is tangent to a plane perpendicular to the optical axis and the tangent point cannot be a crossover point on the optical axis. Following the above description, a distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point C61 on the object-side surface of the sixth lens and the optical axis is HVT61 (instance), and a distance perpendicular to the optical axis between a critical point C62 on the image-side surface of the sixth lens and the optical axis is HVT62 (instance). A distance perpendicular to the optical axis between a critical point on the object-side or image-side surface of other lenses, such as the sixth lens, the optical axis is denoted in the same manner.

The object-side surface of the sixth lens has one inflection point IF611 which is the first nearest to the optical axis, and the sinkage value of the inflection point IF611 is denoted by SGI611 (instance). SGI611 is also the distance parallel to an optical axis from an inflection point on the object-side surface of sixth lens element that is the first nearest to the optical axis to an axial point on the object-side surface of the sixth lens element. The distance perpendicular to the optical axis between the inflection point IF611 and the optical axis is HIF611 (instance). The image-side surface of the sixth lens has one inflection point IF621 which is the first nearest to the optical axis, and the sinkage value of the inflection point IF621 is denoted by SGI621 (instance). SGI621 is also the distance parallel to an optical axis from an inflection point on the image-side surface of the sixth lens element that is the first nearest to the optical axis to an axial point on the image-side surface of the sixth lens element. The distance perpendicular to the optical axis between the inflection point IF621 and the optical axis is HIF621 (instance).

The object-side surface of the sixth lens has one inflection point IF612 which is the second nearest to the optical axis, and the sinkage value of the inflection point IF612 is denoted by SGI612 (instance). The distance perpendicular to the optical axis between the inflection point IF612 and the optical axis is HIF612 (instance). The image-side surface of the sixth lens has one inflection point IF622 which is the second nearest to the optical axis, and the sinkage value of the inflection point IF622 is denoted by SGI622 (instance). The distance perpendicular to the optical axis between the inflection point IF622 and the optical axis is HIF622 (instance).

The object-side surface of the sixth lens has one inflection point IF613 which is the third nearest to the optical axis, and the sinkage value of the inflection point IF613 is denoted by SGI613 (instance). The distance perpendicular to the optical axis between the inflection point IF613 and the optical axis is HIF613 (instance). The image-side surface of the sixth lens has one inflection point IF623 which is the third nearest to the optical axis, and the sinkage value of the inflection point IF623 is denoted by SGI623 (instance). The distance perpendicular to the optical axis between the inflection point IF623 and the optical axis is HIF623 (instance).

The object-side surface of the sixth lens has one inflection point IF614 which is the fourth nearest to the optical axis, and the sinkage value of the inflection point IF614 is denoted by SGI614 (instance). The distance perpendicular to the optical axis between the inflection point IF614 and the optical axis is HIF614 (instance). The image-side surface of the sixth lens has one inflection point IF624 which is the fourth nearest to the optical axis, and the sinkage value of the inflection point IF624 is denoted by SGI624 (instance). The distance perpendicular to the optical axis between the inflection point IF624 and the optical axis is HIF624 (instance).

The inflection point, the distance perpendicular to the optical axis between the inflection point and the optical axis, and the sinkage value thereof on the object-side surface or image-side surface of other lenses are denoted in the same manner.

The Lens Parameters Related to an Aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. The offset of the spherical aberration is denoted by DFS. The offset of the coma aberration is denoted by DFC.

The transverse aberration of the edge of the aperture stop is defined as STOP Transverse Aberration (STA), which assesses the specific performance of the optical image capturing system. The tangential fan or sagittal fan may be used to calculate the STA of any fields of view, and in particular, to calculate the STAs of the longest operation wavelength (e.g. 650 nm) and the shortest operation wavelength (e.g. 470 nm), which serves as the standard to indicate the performance. The aforementioned direction of the tangential fan can be further defined as the positive- (overhead-light) and negative- (lower-light) directional tangential fans. The STA of the longest operation wavelength is defined as the distance between the position of the image formed when the longest operation wavelength passing through the edge of the entrance pupil strikes a specific field of view of the image plane and the image position of the reference primary wavelength (e.g. wavelength of 555 nm) on specific field of view of the image plane. Whereas the STA of the shortest operation wavelength is defined as the distance between the position of the image formed when the shortest operation wavelength passing through the edge of the entrance pupil strikes a specific field of view of the image plane and the image position of the reference primary wavelength on a specific field of view of the image plane. The criteria for the optical image capturing system to be qualified as having excellent performance may be set as: both STA of the incident longest operation wavelength and the STA of the incident shortest operation wavelength at 70% of the field of view of the image plane (i.e. 0.7 HOI) has to be less than 100 μm or even less than 80 μm.

The maximum height for image formation perpendicular to the optical axis on the image plane is denoted as HOI, the transverse aberration of the visible rays with the longest operation wavelength from the positive-directional tangential fan, which passes through an edge of the entrance pupil and strike at the position of 0.7 HOI on the image plane, is denoted as PLTA, the transverse aberration of the visible rays with the shortest operation wavelength from the positive-directional tangential fan, which passes through the edge of the entrance pupil and strikes at the position of 0.7 HOI on the image plane, is denoted as PSTA, the transverse aberration of the visible rays with the longest operation wavelength from negative-directional tangential fan, which passes through the edge of the entrance pupil and strikes at the position of 0.7 HOI on the image plane, is denoted as NLTA, the transverse aberration of the visible rays with the shortest operation wavelength from a negative-directional tangential fan, which passes through the edge of the entrance pupil and strikes at the position of 0.7 HOI on the image plane, is denoted as NSTA, the transverse aberration of the visible rays with the longest operation wavelength from a sagittal fan, which passes through the edge of the entrance pupil and strikes at the position of 0.7 HOI on the image plane, is denoted as SLTA, the transverse aberration of the visible rays with the shortest operation wavelength from the sagittal fan, which passes through the edge of the entrance pupil and strikes at the position of 0.7 HOI on the image plane, is denoted as SSTA.

The present invention provides an optical image capturing system, and a sixth lens of optical image capturing system is provided with an inflection point at the object-side surface or at the image-side surface to adjust the incident angle of each view field and modify the ODT and the TDT. In addition, the surfaces of the sixth lens are capable of modifying the optical path to improve the imaging quality.

The present invention provides an optical image capturing system, in order along an optical axis from an object side to an image side, includes a first lens element, a second lens element, a third lens element, a fourth lens element, a fifth lens element, a sixth lens element and an image plane. The first lens element has refractive power, and f1, f2, f3, f4, f5 and f6 are focal lengths of the first lens element to the sixth lens element, f is the focal length of the optical image capturing system, HEP is the entrance pupil diameter of the optical image capturing system, distance HOS is the distance from object-side surface of the first lens element to the image plane, distance InTL is the distance on the optical axis from object-side surface of the first lens element to image-side surface of the sixth lens element, PhiA6 is the maximum effective diameter of the image-side surface of the sixth lens element, the length of the outline curve of a half of an pupil diameter (HEP) of any surface of a signal lens element refers to the length of the outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE, and the optical image capturing system satisfies: $1.0 \leq f/HEP \leq 10$; $0.5 \leq HOS/f \leq 30$; $0 < PhiA6/InTL \leq 1.6$; and $0.1 \leq 2(ARE/HEP) \leq 2.0$.

The present invention provides an optical image capturing system, in order along an optical axis from an object side to an image side, includes a first lens element, a second lens element, a third lens element, a fourth lens element, a fifth lens element, a sixth lens element, an image plane and a first positioning element. The first positioning element comprises a holder which is in a hollow shape, is opaque and comprises a cylinder and a basement connected with each other. The cylinder is configured to accommodate the six lens elements, and the basement is between the sixth lens element and the image plane, an outer periphery of the basement is greater than an outer periphery of the cylinder, the maximum value of the minimum side length of the basement perpendicular to the optical axis denoted by PhiD, and f1, f2, f3, f4, f5 and f6 are focal lengths of the first lens element to the sixth lens element, and f is the focal length of the optical image capturing system, HEP is the entrance pupil diameter of the optical image capturing system, HOS is the distance from object-side surface of the first lens element to the image plane, InTL is the distance on the optical axis from object-side surface of the first lens element to image-side surface of the sixth lens element, the length of the outline curve of a half of an pupil diameter (HEP) of any surface of a signal lens element refers to a length of the outline curve of the half of the entrance pupil diameter (HEP) from an axial point on the surface of the lens element to a coordinate point of perpendicular height with the distance of the half of the entrance pupil diameter from the optical axis on the surface along the outline of the surface of the lens element and is denoted as ARE, and the optical image capturing system satisfies: $1.0 \leq f/HEP \leq 10$; $0.5 \leq HOS/f \leq 30$; $0 \text{ mm} < PhiD \leq 16 \text{ mm}$; and $0.1 \leq 2(ARE/HEP) \leq 2.0$.

The present invention provides an optical image capturing system, in order along an optical axis from the object side to the image side, comprise a first lens element, a second lens element, a third lens element, a fourth lens element, a fifth lens element, a sixth lens element, an image plane, a first positioning element and a second positioning element. The first positioning element comprises a holder which is in a hollow shape, opaque and comprises a cylinder and a basement connected with each other. The cylinder is configured to accommodate the six lens elements. The basement is between the sixth lens element and the image plane. An outer periphery of the basement is greater than the outer periphery of the cylinder. The maximum value of the minimum side length of the basement perpendicular to the optical axis is denoted by PhiD. The second positioning element is disposed in the holder, and comprises a positioning part and a connection part, the positioning part is in a hollow shape and directly contacts and accommodates any of the six lens elements, to arrange the six lens elements on the optical axis; and the connection part is disposed outside the positioning part and directly contacts an inner periphery of the cylinder; the maximum outer diameter of the connection part perpendicular to the surface of the optical axis is denoted by PhiC, and f1, f2, f3, f4, f5 and f6 are focal lengths of the first lens element to the sixth lens element, f is a focal length of the optical image capturing system, HEP is an entrance pupil diameter of the optical image capturing system, HOS is a distance from object-side surface of the first lens element to the image plane, InTL is a distance on the optical axis from object-side surface of the first lens element to image-side surface of the sixth lens element, PhiA6 is a maximum effective diameter of the image-side surface of the sixth lens element, a length of outline curve of a half of an pupil diameter (HEP) of any surface of a signal lens element refers to a length of the outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE, and the optical image capturing system satisfies: $1.0 \leq f/HEP \leq 10$; $0.5 \leq HOS/f \leq 30$; $PhiC < PhiD$; $0 \text{ mm} < PhiD \leq 16 \text{ mm}$; and $0.1 \leq 2(ARE/HEP) \leq 2.0$.

The length of the outline curve of any surface of single lens element within the range of maximum effective half diameter affects the performance in correcting the surface aberration and the optical path difference between the rays in each field of view. The longer outline curve may lead to a better performance in aberration correction, but the difficulty of the production may become higher. Hence, the length of the outline curve (ARS) of any surface of a single lens element within the range of the maximum effective half diameter has to be controlled, and especially, the proportional relationship (ARS/TP) between the length of the outline curve (ARS) of the surface within the range of the maximum effective half diameter and the central thickness (TP) of the lens element to which the surface belongs on the optical axis has to be controlled. For example, the length of the maximum effective half diameter outline curve of the object-side surface of the first lens element is denoted as ARS11, the central thickness of the first lens element on the optical axis is TP1, and the ratio between both of them is ARS11/TP1. The length of the maximum effective half diameter outline curve of the image-side surface of the first lens element is denoted as ARS12, and the ratio between ARS12 and TP1 is ARS12/TP1. The length of the maximum effective half diameter outline curve of the object-side surface of the second lens element is denoted as ARS21, the central thickness of the second lens element on the optical axis is TP2, and the ratio between both of them is ARS21/TP2. The length of the maximum effective half diameter outline curve of the image-side surface of the second lens element is denoted as ARS22, and the ratio between ARS22 and TP2 is ARS22/TP2. The proportional relationships between the lengths of the maximum effective half diameter outline curve of any surface of the other lens elements and the central thicknesses (TP) of the lens elements to which the surfaces belong on the optical axis are denoted in the similar way.

The length of ½ entrance pupil diameter outline curve of any surface of a single lens element particularly affects its performance in correcting the aberration in the shared region of each field of view and the optical path difference among each field of view. The longer outline curve may lead to a better function of aberration correction, but the difficulty in the production of such lens may become higher. Hence, the length of ½ entrance pupil diameter outline curve of any surface of a single lens element has to be controlled, and especially, the proportional relationship between the length of ½ entrance pupil diameter outline curve of any surface of a single lens element and the central thickness on the optical axis has to be controlled. For example, the length of the ½ entrance pupil diameter outline curve of the object-side surface of the first lens element is denoted as ARE11, and the central thickness of the first lens element on the optical axis is TP1, and the ratio thereof is ARE11/TP1. The length of the ½ entrance pupil diameter outline curve of the image-side surface of the first lens element is denoted as ARE12, and the central thickness of the first lens element on the optical axis is TP1, and the ratio thereof is ARE12/TP1. The length of the ½ entrance pupil diameter outline curve of the object-side surface of the first lens element is denoted as ARE21, and the central thickness of the second lens element on the optical axis is TP2, and the ratio thereof is ARE21/TP2. The length of the ½ entrance pupil diameter outline curve of the image-side surface of the second lens element is denoted as ARE22, and the central thickness of the second lens element on the optical axis is TP2, and the ratio thereof is ARE22/TP2. The ratios of the ½ HEP outline curves on any surface of the remaining lens elements of the optical image capturing system to the central thicknesses (TP) of that lens element can be computed in similar way.

In an embodiment, a height of the optical image capturing system (HOS) can be reduced while $|f1| > |f6|$.

In an embodiment, when the lenses satisfy $|f2|+|f3|+|f4|+|f5|$ and $|f1|+|f6|$, at least one lens among the second to the fifth lens elements could have weak positive refractive power or weak negative refractive power. Herein the weak refractive power means the absolute value of the focal length of one specific lens is greater than 10. When at least one lens among the second to the fifth lenses has weak positive refractive power, it may share the positive refractive power of the first lens, and on the contrary, when at least one lens among the second to the fifth lenses has weak negative refractive power, it may fine tune and correct the aberration of the system.

In an embodiment, the sixth lens could have negative refractive power, and an image-side surface thereof is concave, it may reduce back focal length and size. Besides, the sixth lens can have at least an inflection point on at least a surface thereof, which may reduce an incident angle of the light of an off-axis field of view and correct the aberration of the off-axis field of view.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

Figure 1A:
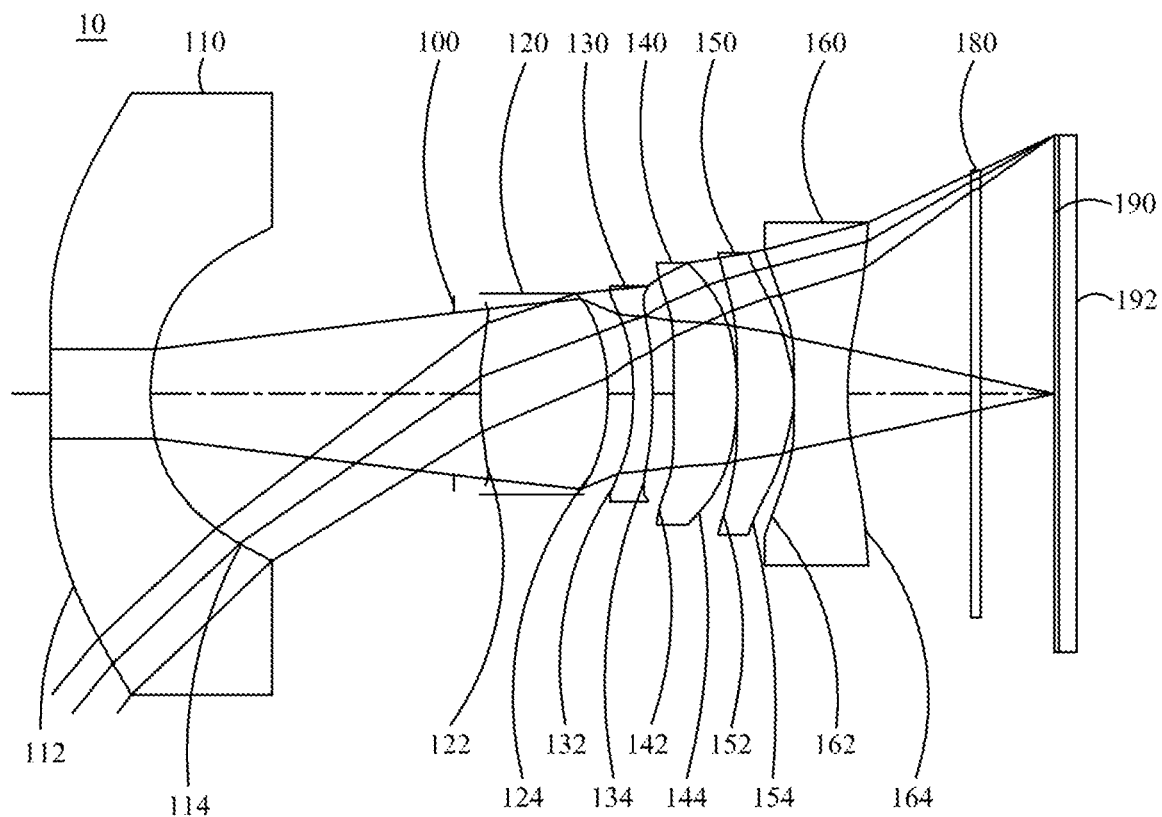
FIG. 1A is a schematic view of an optical image capturing system of a second embodiment of the present invention.

In this embodiment of the present invention, an optical image capturing system, in order along an optical axis from an object side to an image side, includes a first lens element, a second lens element, a third lens element, a fourth lens element, a fifth lens element, a sixth lens element with refractive powers, and an image plane. The optical image capturing system may further include an image-sensing device disposed in the image plane.

The optical image capturing system may use three sets of operation wavelengths, which are 486.1 nm, 587.5 nm and 656.2 nm, respectively, and 587.5 nm serves as the primary reference wavelength and a reference wavelength to obtain technical features of the optical system. The optical image capturing system may also use five sets of wavelengths, which are 470 nm, 510 nm, 555 nm, 610 nm and 650 nm, respectively, and 555 nm serves as the primary reference wavelength and a reference wavelength to obtain technical features of the optical system.

The ratio of the focal length f of theoptical image capturing system to a focal length fp of each lens element with positive refractive power is PPR. The ratio of the focal length f of the optical image capturing system to a focal length fn of each lens element with negative refractive power is NPR. The sum of the PPR of all lens elements with positive refractive powers is $\Sigma PPR$. The sum of the NPR of all lens elements with negative refractive powers is $\Sigma NPR$. The total refractive power and the total length of the optical image capturing system can be controlled easily when following conditions are satisfied: $0.5 \leq \Sigma PPR/|\Sigma NPR| \leq 15$; preferably, the optical image capturing system satisfies: $1 \leq \Sigma PPR/|\Sigma NPR| \leq 3.0$.

The optical image capturing system may include an image-sensing device disposed in the image plane. Half of the diagonal of an effective detection field of the image-sensing device (imaging height or the maximum image height of the optical image capturing system) is HOI, and the distance on the optical axis from the object-side surface of the first lens element to the image plane is HOS, and the optical image capturing system satisfies: HOS/HOI≤10; and 0.5≤HOS/f≤10. Preferably, the optical image capturing system satisfies: 1≤HOS/HOI≤5; and 1≤HOS/f≤7. With this configuration, the size of the optical image capturing system can be kept small, such that a lightweight electronic product is able to accommodate it.

Furthermore, in the optical image capturing system of the present invention, according to different requirements, at least one aperture stop may be arranged to reduce stray light and improve the imaging quality.

In the optical image capturing system of the present invention, the aperture stop may be a front or middle aperture. The front aperture is the aperture stop between a photographed object and the first lens element. The middle aperture is the aperture stop between the first lens element and the image plane. When the aperture stop is the front aperture, a longer distance between the exit pupil and the image plane of the optical image capturing system can be formed, such that more optical elements can be disposed in the optical image capturing system and the efficiency of the image-sensing device in receiving image can be improved. When the aperture stop is the middle aperture, the angle of view of the optical image capturing system can be expended, such that the optical image capturing system has the same advantage that is owned by wide-angle cameras. The distance from the aperture stop to the image plane is InS, and the optical image capturing system satisfies: 0.2≤InS/HOS≤1.1. With this configuration, the size of the optical image capturing system can be kept small without sacrificing the features of a wide angle of view.

In the optical image capturing system of the present invention, the distance from the object-side surface of the first lens element to the image-side surface of the sixth lens element is InTL. The sum of central thicknesses of all lens elements with refractive power on the optical axis is ΣTP, wherein the optical image capturing system satisfies: 0.1≤ΣTP/InTL≤0.9. Therefore, the contrast ratio for the image formation in the optical image capturing system can be improved without sacrificing the yield rate for manufacturing the lens element, and a proper back focal length is provided to accommodate other optical components in the optical image capturing system.

The curvature radius of the object-side surface of the first lens element is R1, and the curvature radius of the image-side surface of the first lens element is R2, and the optical image capturing system satisfies: 0.001≤|R1/R2|≤20. With this configuration, the first lens element may have a suitable magnitude of positive refractive power, to reduce the increase rate of the spherical aberration. Preferably, the optical image capturing system satisfies: 0.01≤|R1/R2|<10.

The curvature radius of the object-side surface of the sixth lens element is R11, and the curvature radius of the image-side surface of the sixth lens element is R12, and the optical image capturing system satisfies: −7<(R11−R12)/(R11+R12)<50. This configuration is beneficial to the correction of the astigmatism generated by the optical image capturing system.

The distance between the first lens element and the second lens element on the optical axis is IN12, and the optical image capturing system satisfies: IN12/f≤3.0. With this configuration, the chromatic aberration of the lens elements can be mitigated, such that their performance is improved.

The distance between the fifth lens element and the sixth lens element on the optical axis is IN56, and the optical image capturing system satisfies: IN56/f≤0.8. With this configuration, the chromatic aberration of the lens elements can be mitigated, such that their performance is improved.

The central thicknesses of the first lens element and the second lens element on the optical axis are TP1 and TP2, respectively, and the optical image capturing system satisfies: 0.1≤(TP1+IN12)/TP2≤10. With this configuration, the sensitivity of the optical image capturing system can be controlled, and its performance can be improved.

Central thicknesses of the fifth lens element and the sixth lens element on the optical axis are TP5 and TP6, respectively, and the distance between that two lens elements on the optical axis is IN56, and the optical image capturing system satisfies: 0.1≤(TP6+IN56)/TP5≤10. With this configuration, the sensitivity of the optical image capturing system can be controlled and the total height of the optical image capturing system can be reduced.

The central thicknesses of the second, third and fourth lens elements on the optical axis are TP2, TP3 and TP4, respectively. The distance between the second lens element and the third lens element on the optical axis is IN23. The distance between the third lens element and the fourth lens element on the optical axis is IN45. In the optical image capturing system of the present invention, the distance from the object-side surface of the first lens element to the image-side surface of the sixth lens element is InTL, and the optical image capturing system satisfies: 0.1≤TP4/(IN34+TP4+IN45)<1. With this configuration, the aberration generated when the incident light is travelling inside the optical system can be corrected slightly layer upon layer, and the total height of the optical image capturing system can be reduced.

In the optical image capturing system of the present invention, a distance perpendicular to the optical axis between a critical point C61 on an object-side surface of the sixth lens element and the optical axis is HVT61. A distance perpendicular to the optical axis between a critical point C62 on an image-side surface of the sixth lens element and the optical axis is HVT62. A distance parallel to the optical axis from an axial point on the object-side surface of the sixth lens element to the critical point C61 is SGC61. A distance parallel to the optical axis from an axial point on the image-side surface of the sixth lens element to the critical point C62 is SGC62, and the optical image capturing system satisfies: 0 mm≤HVT61≤3 mm; 0 mm<HVT62≤6 mm; 0≤HVT61/HVT62; 0 mm≤|SGC61|≤0.5 mm; 0 mm<|SGC62|≤2 mm; and 0<|SGC62|/(|SGC62|+TP6)≤0.9. With this configuration, the off-axis aberration can be corrected effectively.

The optical image capturing system of the present invention satisfies following condition: 0.2≤HVT62/HOI≤0.9. Preferably, the optical image capturing system satisfies: 0.3≤HVT62/HOI≤0.8. With this configuration, the aberration of surrounding field of view for the optical image capturing system can be corrected.

The optical image capturing system of the present invention satisfies following condition: 0≤HVT62/HOS≤0.5. Preferably, the optical image capturing system satisfies: 0.2≤HVT62/HOS≤0.45. With this configuration, the aberration of surrounding field of view for the optical image capturing system can be corrected.

In the optical image capturing system of the present invention, the distance parallel to an optical axis from an inflection point on the object-side surface of sixth lens element that is the first nearest to the optical axis to an axial point on the object-side surface of the sixth lens element is denoted by SGI611. The distance parallel to an optical axis from an inflection point on the image-side surface of the sixth lens element that is the first nearest to the optical axis to an axial point on the image-side surface of the sixth lens element is denoted by SGI621, and the optical image capturing system satisfies: 0<SGI611/(SGI611+TP6)≤0.9; 0<SGI621/(SGI621+TP6)≤0.9. Preferably, the optical image capturing system satisfies: 0.1≤SGI611/(SGI611+TP6)≤0.6; 0.1≤SGI621/(SGI621+TP6)≤0.6.

The distance parallel to the optical axis from the inflection point on the object-side surface of the sixth lens element that is second nearest to the optical axis to an axial point on the object-side surface of the sixth lens element is denoted by SGI612. The distance parallel to an optical axis from an inflection point on the image-side surface of the sixth lens element that is second nearest to the optical axis to an axial point on the image-side surface of the sixth lens element is denoted by SGI622. The optical image capturing system satisfies: 0<SGI621/(SGI621+TP6)≤0.9; 0<SGI622/(SGI622+TP6)≤0.9. Preferably, the optical image capturing system satisfies: 0.1≤SGI621/(SGI621+TP6)≤0.6; and 0.1≤SGI622/(SGI622+TP6)≤0.6.

The distance perpendicular to the optical axis between the inflection point on object-side surface of the sixth lens element that is the first nearest to the optical axis and the optical axis is denoted by HIF611. The distance perpendicular to the optical axis between an axial point on the image-side surface of the sixth lens element and an inflection point on the image-side surface of the sixth lens element that is the first nearest to the optical axis is denoted by HIF621, and the optical image capturing system satisfies: 0.001 mm≤|HIF611|≤5 mm; 0.001 mm≤|HIF621|≤5 mm. Preferably, the optical image capturing system satisfies: 0.1 mm≤|HIF611|≤3.5 mm; 1.5 mm≤|HIF621|≤3.5 mm.

The distance perpendicular to the optical axis between the inflection point on the object-side surface of the sixth lens element that is second nearest to the optical axis and the optical axis is denoted by HIF612. The distance perpendicular to the optical axis between an axial point on the image-side surface of the sixth lens element and an inflection point on the image-side surface of the sixth lens element that is second nearest to the optical axis is denoted by HIF622, and the optical image capturing system satisfies: 0.001 mm≤|HIF612|≤5 mm; 0.001 mm≤|HIF622|≤5 mm. Preferably, the optical image capturing system satisfies: 0.1 mm≤|HIF622|≤3.5 mm; 0.1 mm≤|HIF612|≤3.5 mm.

The distance perpendicular to the optical axis between the inflection point on the object-side surface of the sixth lens element that is third nearest to the optical axis and the optical axis is denoted by HIF613. The distance perpendicular to the optical axis between an axial point on the image-side surface of the sixth lens element and an inflection point on the image-side surface of the sixth lens element that is third nearest to the optical axis is denoted by HIF623, and the optical image capturing system satisfies: 0.001 mm≤|HIF613|≤5 mm; 0.001 mm≤|HIF623|≤5 mm. Preferably, wherein the optical image capturing system satisfies: 0.1 mm≤|HIF623|≤3.5 mm; and 0.1 mm≤|HIF613|≤3.5 mm.

The distance perpendicular to the optical axis between the inflection point on the object-side surface of the sixth lens element that is fourth nearest to the optical axis and the optical axis is denoted by HIF614. The distance perpendicular to the optical axis between an axial point on the image-side surface of the sixth lens element and an inflection point on the image-side surface of the sixth lens element that is fourth nearest to the optical axis is denoted by HIF624, and the optical image capturing system satisfies: 0.001 mm≤|HIF614|≤5 mm; 0.001 mm≤|HIF624|≤5 mm. Preferably, the optical image capturing system satisfies: 0.1 mm≤|HIF624|≤3.5 mm; and 0.1 mm≤|HIF614|≤3.5 mm.

In one embodiment of the optical image capturing system of the present disclosure, the chromatic aberration of the optical image capturing system can be corrected by alternatively arranging the lens elements with large Coefficient of dispersion and small Coefficient of dispersion, and the chromatic aberration of the optical image capturing system can be corrected.

The equation for the aforementioned aspheric surface is:

$$z = ch^2/[1+[1-(k+1)c^2h^2]0.5] + A4h^4 + A6h^6 + A8h^8 + A10h^{10} + A12h^{12} + A14h^{14} + A16h^{16} + A18h^{18} + A20h^{20} + \ldots \quad (1)$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

In the optical image capturing system provided by the present invention, the lens elements may be made of glass or plastic material. In a case that plastic material is adopted to produce the lens elements, the cost of manufacturing as well as the weight of the lens element can be reduced effectively. When the lens elements are made of glass, the heat effect can be controlled, and there will be more options to allocate the refractive powers of the lens elements in the optical image capturing system. Furthermore, the object-side surfaces and the image-side surfaces of the first through sixth lens elements may be aspheric for obtaining more control variables, such that the number of the lens elements used can be reduced in contrast to traditional glass lens element, and the aberration can be reduced too. Thus, the total height of the optical image capturing system can be reduced effectively.

Furthermore, in the optical image capturing system provided by the present invention, when the lens element has a convex surface, the surface of that lens element basically has a convex portion in the vicinity of the optical axis. When the lens element has a concave surface, the surface of that lens element basically has a concave portion in the vicinity of the optical axis.

The optical image capturing system of the present invention can be applied to the optical image capturing system with automatic focus upon demand. With the features of a good aberration correction and a high quality image formation, the optical image capturing system can be used in various applications.

In an embodiment, the optical image capturing system of the present invention may include a driving module upon demand, the driving module couples with the six lens elements to displace the lens elements. The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

At least one lens element among the first, second, third, fourth, fifth and sixth lens elements may be a light filtering element for light with wavelength of less than 500 nm, depending on the design requirements. The light filtering element may be made by coating film on at least one surface of that lens element with certain filtering function, or forming that lens element with material that can filter light with short wavelength.

The image plane of the optical image capturing system of the present invention may be a plane or a curved surface, upon the design requirement. When the image plane is a curved surface (e.g. a spherical surface with curvature radius), the incident angle required such that the rays are focused on the image plane can be reduced. As such, the length of the optical image capturing system (TTL) can be minimized, and the relative illumination may be improved as well.

According to the above embodiments, the specific embodiments with figures are presented in detail as below.

The First Embodiment

Figure 1B:
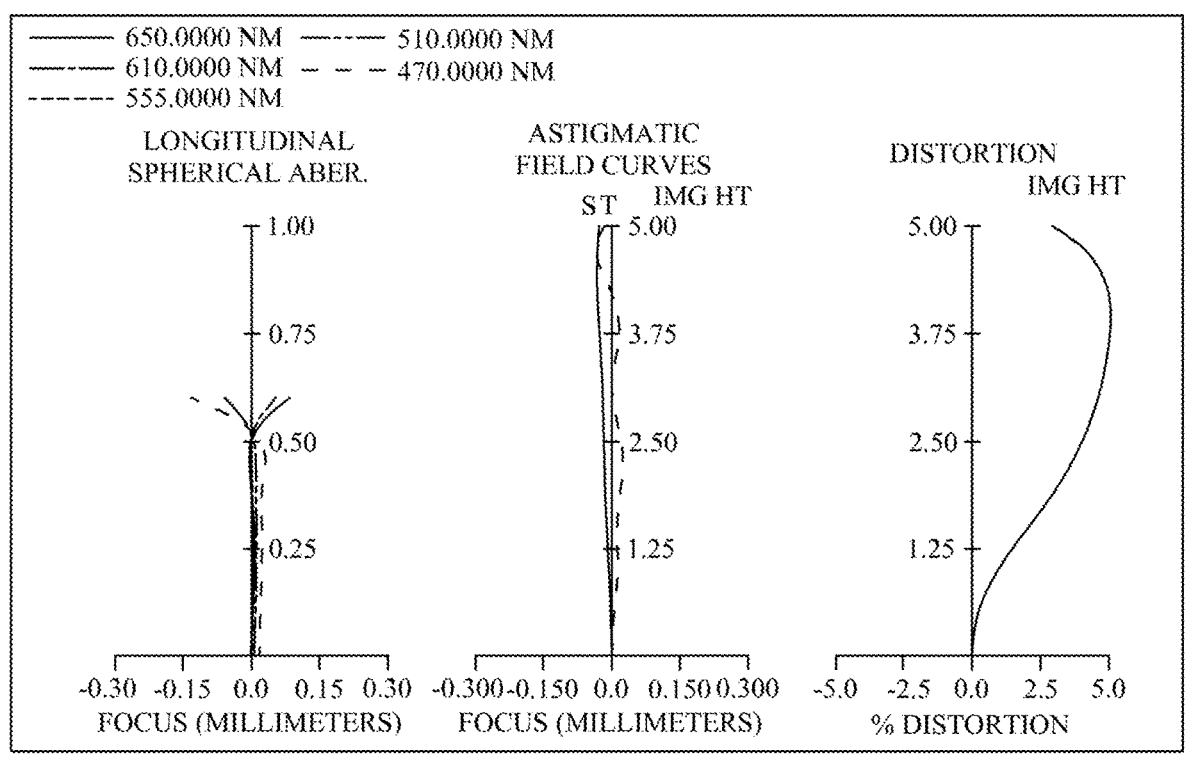
FIG. 1B shows curve diagrams of longitudinal spherical aberration, astigmatic field, and optical distortion of the optical image capturing system in the order from left to right of the first embodiment of the present invention.
Figure 1C:
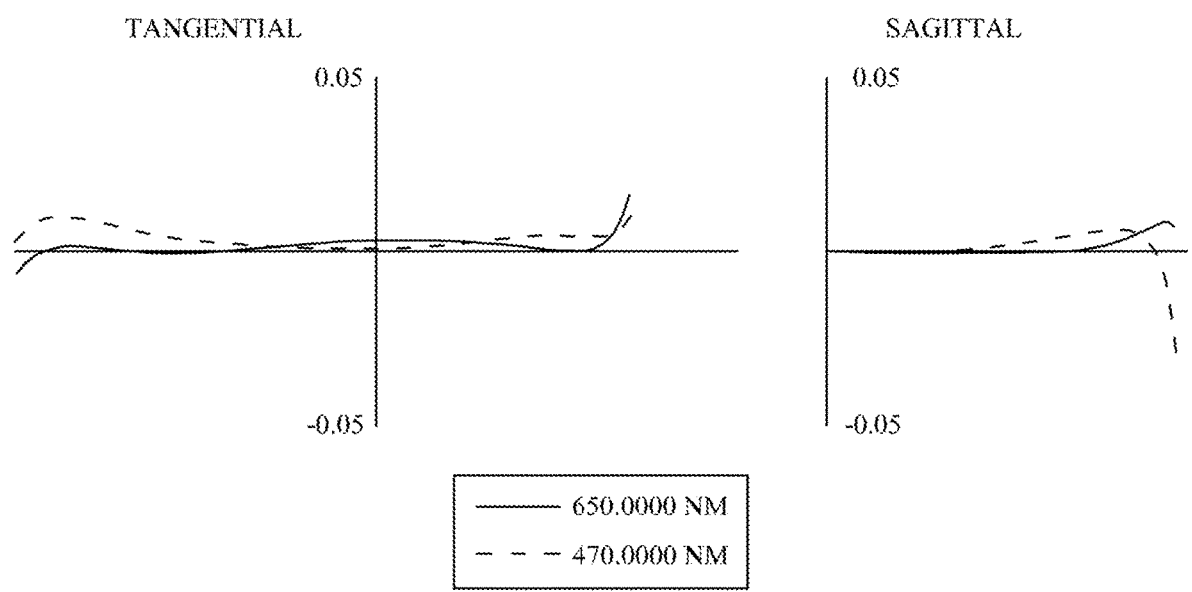
FIG. 1C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the first embodiment of the present invention.

Please refer to FIGS. 1A, 1B and 1C. FIG. 1A is a schematic view of an optical image capturing system of a first embodiment of the present invention, FIG. 1B shows the longitudinal spherical aberration curves, astigmatic field curves, and optical distortion curve of the optical image capturing system in the order from left to right according to the first embodiment of the present invention, and FIG. 1C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the first embodiment of the present invention. As shown in FIG. 1A, in order along an optical axis from an object side to an image side, the optical image capturing system 10 comprises a first lens element 110, an aperture stop 100, a second lens element 120, a third lens element 130, a fourth lens element 140, a fifth lens element 150, a sixth lens element 160, an IR-bandstop Filter 180, an image plane 190 and an image-sensing device 192.

The first lens element 110 has negative refractive power and is made of a plastic material. The first lens element 110 has a concave object-side surface 112, the first lens element 110 has a concave image-side surface 114, and both of the object-side surface 112 and the image-side surface 114 are aspheric. The object-side surface 112 has two inflection points. The length of the outline curve of the maximum effective half diameter of the object-side surface 112 of the first lens element 110 is denoted as ARS11. The length of the outline curve of the maximum effective half diameter of the image-side surface 114 of the first lens element 110 is denoted as ARS12. The length of the outline curve of ½ entrance pupil diameter (HEP) of the object-side surface 112 of the first lens element 110 is denoted as ARE11. The length of the outline curve of ½ entrance pupil diameter (HEP) of the image-side surface 114 of the first lens element 110 is denoted as ARE12. The central thickness of the first lens element 110 on the optical axis is TP1.

The distance parallel to parallel to an optical axis from an inflection point on the object-side surface 112 of the first lens element 110 which is the first nearest to the optical axis to an axial point on the object-side surface 112 of the first lens element 110 is denoted by SGI111. The distance parallel to an optical axis from an inflection point on the image-side surface 114 of the first lens element 110 which is the first nearest to the optical axis to an axial point on the image-side surface 114 of the first lens element 110 is denoted by SGI121. The optical image capturing system satisfies: SGI111=−0.0031 mm; and |SGI111|/(|SGI111|+TP1) =0.0016.

The distance parallel to an optical axis from an inflection point on the object-side surface 112 of the first lens element 110 that is the second nearest to the optical axis to an axial point on the object-side surface 112 of the first lens element 110 is denoted by SGI112. The distance parallel to an optical axis from an inflection point on the image-side surface 114 of the first lens element 110 that is the second nearest to the optical axis to an axial point on the image-side surface 114 of the first lens element 110 is denoted by SGI122. The optical image capturing system satisfies: SGI112=1.3178 mm; and |SGI112|/(|SGI112|+TP1)=0.4052.

The distance perpendicular to the optical axis from the inflection point on the object-side surface 112 of the first lens element 110 that is the first nearest to the optical axis to an axial point on the object-side surface 112 of the first lens element 110 is denoted by HIF111. The distance perpendicular to the optical axis from the inflection point on the image-side surface 114 of the first lens element 110 that is nearest to the optical axis to an axial point on the image-side surface 114 of the first lens element 110 is denoted by HIF121. The optical image capturing system satisfies: HIF111=0.5557 mm and HIF111/HOI=0.1111.

The distance perpendicular to the optical axis from the inflection point on the object-side surface 112 of the first lens element 110 that is the second nearest to the optical axis to an axial point on the object-side surface 112 of the first lens element 110 is denoted by HIF112. The distance perpendicular to the optical axis from the inflection point on the image-side surface 114 of the first lens element 110 that is the second nearest to the optical axis to an axial point on the image-side surface 114 of the first lens element 110 is denoted by HIF122. The optical image capturing system satisfies: HIF112=5.3732 mm and HIF112/HOI=1.0746.

The second lens element 120 has positive refractive power and is made of a plastic material, and has a convex object-side surface 122 and a convex image-side surface 124, and both of the object-side surface 122 and the image-side surface 124 are aspheric. The object-side surface 122 has an inflection point. The length of the outline curve of the maximum effective half diameter of the object-side surface 122 of the second lens element 120 is denoted as ARS21. The length of the outline curve of the maximum effective half diameter of the image-side surface 124 of the second lens element 120 is denoted as ARS22. The length of the outline curve of ½ entrance pupil diameter (HEP) of the object-side surface 122 of the second lens element 120 is denoted as ARE21. The length of the outline curve of ½ entrance pupil diameter (HEP) of the image-side surface 124 of the second lens element 120 is denoted as ARS22. The central thickness of the second lens element 120 on the optical axis is TP2.

The distance parallel to an optical axis from an inflection point on the object-side surface 122 of the second lens element 120 which is the first nearest to the optical axis to an axial point on the object-side surface 122 of the second lens element 120 is denoted by SGI211, the distance parallel to an optical axis from an inflection point on the image-side surface 124 of the second lens element 120 that is the first nearest to the optical axis to the axial point on the image-side surface 124 of the second lens element 120 is denoted by SGI221, and the optical image capturing system satisfies: SGI211=0.1069 mm; |SGI211|/(|SGI211|+TP2)=0.0412; SGI221=0 mm; and |SGI221|/(|SGI221|+TP2)=0.

The distance perpendicular to the optical axis from the inflection point on the object-side surface 122 of the second lens element 120 that is nearest to the optical axis to the axial point on the object-side surface 122 of the second lens element 120 is denoted by HIF211. The distance perpendicular to the optical axis from the inflection point on the image-side surface 124 of the second lens element 120 that is nearest to the optical axis to the axial point on the image-side surface 124 of the second lens element 120 is denoted by HIF221. The optical image capturing system satisfies: HIF211=1.1264 mm; HIF211/HOI=0.2253; HIF221=0 mm; and HIF221/HOI=0.

The third lens element 130 has negative refractive power and is made of a plastic material. The third lens element 130 has a concave object-side surface 132 and a convex image-side surface 134, and both of the object-side surface 132 and the image-side surface 134 are aspheric. Each of the object-side surface 132 and the image-side surface 134 has an inflection point. The length of the outline curve of the maximum effective half diameter of the object-side surface 132 of the third lens element 130 is denoted as ARS31. The length of the outline curve of the maximum effective half diameter of the image-side surface 134 of the third lens element 130 is denoted as ARS32. The length of the outline curve of ½ entrance pupil diameter (HEP) of the object-side surface 132 of the third lens element 130 is denoted as ARE31. The length of the outline curve of ½ entrance pupil diameter (HEP) of the image-side surface 134 of the third lens element 130 is denoted as ARE32. The central thickness of the third lens element on the optical axis is TP3.

The distance parallel to an optical axis from an inflection point on the object-side surface 132 of the third lens element 130 that is the first nearest to the optical axis to an axial point on the object-side surface 132 of the third lens element 130 is denoted by SGI311. The distance parallel to an optical axis from an inflection point on the image-side surface 134 of the third lens element 130 that is the first nearest to the optical axis to an axial point on the image-side surface 134 of the third lens element 130 is denoted by SGI321. The optical image capturing system satisfies: SGI311=−0.3041 mm; |SGI311|/(|SGI311|+TP3)=0.4445; SGI321=−0.1172 mm; |SGI321|/(|SGI321|+TP3)=0.2357.

The distance perpendicular to the optical axis between the inflection point on the object-side surface 132 of the third lens element 130 that is the first nearest to the optical axis and the axial point on the object-side surface 132 of the third lens element 130 is denoted by HIF311. The distance perpendicular to the optical axis between the inflection point on the image-side surface 134 of the third lens element 130 that is the first nearest to the optical axis and the axial point on the image-side surface 134 of the third lens element 130 is denoted by HIF321. The optical image capturing system satisfies: HIF311=1.5907 mm; HIF311/HOI=0.3181; HIF321=1.3380 mm; HIF321/HOI=0.2676.

The fourth lens element 140 has positive refractive power and is made of a plastic material, and has a convex object-side surface 142 and a concave image-side surface 144, and both of the object-side surface 142 and the image-side surface 144 are aspheric. The object-side surface 142 has two inflection points and the image-side surface 144 has an1 inflection point. The length of the outline curve of the maximum effective half diameter of the object-side surface 142 of the fourth lens element 140 is denoted as ARS41. The length of the outline curve of the maximum effective half diameter of the image-side surface 144 of the fourth lens element 140 is denoted as ARS42. The length of the outline curve of ½ entrance pupil diameter (HEP) of the object-side surface 142 of the fourth lens element 140 is denoted as ARE41, and the length of the outline curve of ½ entrance pupil diameter (HEP) of the image-side surface 144 of the fourth lens element 140 is denoted as ARS42. The central thickness of the fourth lens element on the optical axis is TP4.

The distance parallel to the optical axis from an inflection point on the object-side surface 142 of the fourth lens element 140 that is the first nearest to the optical axis to the axial point on the object-side surface 142 of the fourth lens element 140 is denoted by SGI411. The distance parallel to the optical axis from an inflection point on the image-side surface 144 of the fourth lens element 140 that is the first nearest to the optical axis to the axial point on the image-side surface 144 of the fourth lens element 140 is denoted by SGI421. The optical image capturing system satisfies: SGI411=0.0070 mm; |SGI411|/(|SGI411|+TP4)=0.0056; SGI421=0.0006 mm; |SGI421|/(|SGI421|+TP4)=0.0005.

The distance parallel to an optical axis from an inflection point on the object-side surface 142 of the fourth lens element 140 that is the second nearest to the optical axis to the axial point on the object-side surface 142 of the fourth lens element 140 is denoted by SGI412. The distance parallel to an optical axis from an inflection point on the image-side surface 144 of the fourth lens element 140 that is the second nearest to the optical axis to the axial point on the image-side surface 144 of the fourth lens element 140 is denoted by SGI422. The optical image capturing system satisfies: SGI412=−0.2078 mm; |SGI412|/(|SGI412|+TP4)=0.1439.

The perpendicular distance between the inflection point on the object-side surface 142 of the fourth lens element 140 that is nearest to the optical axis and the optical axis is denoted by HIF411. The perpendicular distance between the inflection point on the image-side surface 144 of the fourth lens element 140 that is nearest to the optical axis and the optical axis is denoted by HIF421, and the optical image capturing system satisfies: HIF411=0.4706 mm; HIF411/HOI=0.0941; HIF421=0.1721 mm; HIF421/HOI=0.0344.

The distance perpendicular to the optical axis between the inflection point on the object-side surface 142 of the fourth lens element 140 that is second nearest to the optical axis and the optical axis is denoted by HIF412. The distance perpendicular to the optical axis between the inflection point on the image-side surface 144 of the fourth lens element 140 that is second nearest to the optical axis and the optical axis is denoted by HIF422, and the optical image capturing system satisfies: HIF412=2.0421 mm; HIF412/HOI=0.4084.

The fifth lens element 150 has positive refractive power and is made of a plastic material, and has a convex object-side surface 152 and a convex image-side surface 154, and both of the object-side surface 152 and the image-side surface 154 are aspheric. The object-side surface 152 has two inflection points and the image-side surface 154 has an inflection point. The length of the outline curve of the maximum effective half diameter of the object-side surface 152 of the fifth lens element 150 is denoted as ARS51. The length of the outline curve of the maximum effective half diameter of the image-side surface 154 of the fifth lens element 150 is denoted as ARS52. The length of the outline curve of ½ entrance pupil diameter (HEP) of the object-side surface 152 of the fifth lens element 150 is denoted as ARE51. The length of the outline curve of ½ entrance pupil diameter (HEP) of the image-side surface 154 of the fifth lens element 150 is denoted as ARE52. The central thickness of the fifth lens element is TP5.

The distance parallel to an optical axis from an inflection point on the object-side surface 152 of the fifth lens element 150 that is nearest to the optical axis to the axial point on the object-side surface 152 of the fifth lens element 150 is denoted by SGI511. The distance parallel to an optical axis from an inflection point on the image-side surface 154 of the fifth lens element 150 that is nearest to the optical axis to the axial point on the image-side surface 154 of the fifth lens element 150 is denoted by SGI521, and the optical image capturing system satisfies: SGI511=0.00364 mm; |SGI511|/(|SGI511|+TP5)=0.00338; SGI521=−0.63365 mm; |SGI521|/(|SGI521|+TP5)=0.37154.

The distance parallel to an optical axis from an inflection point on the object-side surface 152 of the fifth lens element 150 that is the second nearest to the optical axis to the axial point on the object-side surface 152 of the fifth lens element 150 is denoted by SGI512. The distance parallel to an optical axis from an inflection point on the image-side surface 154 of the fifth lens element 150 that is the second nearest to the optical axis to the axial point on the image-side surface 154 of the fifth lens element 150 is denoted by SGI522. The optical image capturing system satisfies: SGI512=−0.32032 mm; |SGI512|/(|SGI512|+TP5)=0.23009.

The distance parallel to an optical axis from an inflection point on the object-side surface 152 of the fifth lens element 150 that is the third nearest to the optical axis to the axial point on the object-side surface 152 of the fifth lens element 150 is denoted by SGI513. The distance parallel to an optical axis from an inflection point on the image-side surface 154 of the fifth lens element 150 that is the third nearest to the optical axis to the axial point on the image-side surface 154 of the fifth lens element 150 is denoted by SGI523. The optical image capturing system satisfies: SGI513=0 mm; |SGI513|/(|SGI513|+TP5)=0; SGI523=0 mm; |SGI523|/(|SGI523|+TP5)=0.

The distance parallel to an optical axis from an inflection point on the object-side surface 152 of the fifth lens element 150 that is the fourth nearest to the optical axis to the axial point on the object-side surface 152 of the fifth lens element 150 is denoted by SGI514. The distance parallel to an optical axis from an inflection point on the image-side surface 154 of the fifth lens element 150 that is the fourth nearest to the optical axis to the axial point on the image-side surface 154 of the fifth lens element 150 is denoted by SGI524, and the optical image capturing system satisfies: SGI514=0 mm; |SGI514|/(|SGI514|+TP5)=0; SGI524=0 mm; |SGI524|/(|SGI524|+TP5)=0.

The perpendicular distance between the optical axis and the inflection point on the object-side surface 152 of the fifth lens element 150 that is the nearest to the optical axis is denoted by HIF511. The perpendicular distance between the optical axis and the inflection point on the image-side surface 154 of the fifth lens element 150 that is the nearest to the optical axis is denoted by HIF521, and the optical image capturing system satisfies: HIF511=0.28212 mm; HIF511/HOI=0.05642; HIF521=2.13850 mm; HIF521/HOI=0.42770.

The distance perpendicular to the optical axis between the inflection point on the object-side surface 152 of the fifth lens element 150 that is the second nearest to the optical axis and the optical axis is denoted by HIF512. The distance perpendicular to the optical axis between the inflection point on the image-side surface 154 of the fifth lens element 150 that is the second nearest to the optical axis and the optical axis is denoted by HIF522, and the optical image capturing system satisfies: HIF512=2.51384 mm; HIF512/HOI=0.50277.

The distance perpendicular to the optical axis between the inflection point on the object-side surface 152 of the fifth lens element 150 that is the third nearest to the optical axis and the optical axis is denoted by HIF513. The distance perpendicular to the optical axis between the inflection point on the image-side surface 154 of the fifth lens element 150 that is the third nearest to the optical axis and the optical axis is denoted by HIF523, and the optical image capturing system satisfies: HIF513=0 mm; HIF513/HOI=0; HIF523=0 mm; HIF523/HOI=0.

The distance perpendicular to the optical axis between the inflection point on the object-side surface 152 of the fifth lens element 150 that is the fourth nearest to the optical axis and the optical axis is denoted by HIF514. The distance perpendicular to the optical axis between the inflection point on the image-side surface 154 of the fifth lens element 150 that is the fourth nearest to the optical axis and the optical axis is denoted by HIF524, and the optical image capturing system satisfies: HIF514=0 mm; HIF514/HOI=0; HIF524=0 mm; HIF524/HOI=0.

The sixth lens element 160 has negative refractive power and is made of a plastic material, and has a concave object-side surface 162 and a concave image-side surface 164. The object-side surface 162 has two inflection points and the image-side surface 164 has an inflection point. Therefore, the incident angle of each field of view on the sixth lens element 160 can be effectively adjusted and the spherical aberration can thus be mitigated. The length of the outline curve of the maximum effective half diameter of the object-side surface 162 of the sixth lens element 160 is denoted as ARS61. The length of the outline curve of the maximum effective half diameter of the image-side surface 164 of the sixth lens element 160 is denoted as ARS62. The length of the outline curve of ½ entrance pupil diameter (HEP) of the object-side surface 162 of the sixth lens element 160 is denoted as ARE61, and the length of the outline curve of ½ entrance pupil diameter (HEP) of the image-side surface 164 of the sixth lens element 160 is denoted as ARE62. The central thickness of the sixth lens element on the optical axis is TP6.

The distance parallel to an optical axis from an inflection point on the object-side surface 162 of sixth lens element 160 that is the nearest to the optical axis to an axial point on the object-side surface 162 of the sixth lens element 160 is denoted by SGI611. The distance parallel to an optical axis from an inflection point on the image-side surface of 164 the sixth lens element 160 that is the nearest to the optical axis to an axial point on the image-side surface 164 of the sixth lens element 160 is denoted by SGI621. The optical image capturing system satisfies: SGI611=−0.38558 mm; |SGI611|/(|SGI611|+TP6)=0.27212; SGI621=0.12386 mm; |SGI621|/(|SGI621|+TP6)=0.10722.

The distance parallel to the optical axis from the inflection point on the object-side surface 162 of the sixth lens element 160 that is the second nearest to the optical axis to an axial point on the object-side surface 162 of the sixth lens element 160 is denoted by SGI612. The distance parallel to the optical axis from the inflection point on the image-side surface 164 of the sixth lens element 160 that is the second nearest to the optical axis to an axial point on the image-side surface 164 of the sixth lens element 160 is denoted by SGI622. The optical image capturing system satisfies: SGI612=−0.47400 mm; |SGI612|/(|SGI612|+TP6)=0.31488; SGI622=0 mm; |SGI622|/(|SGI622|+TP6)=0.

The distance perpendicular to the optical axis between the inflection point on object-side surface 162 of the sixth lens element 160 that is the nearest to the optical axis and the optical axis is denoted by HIF611. The distance perpendicular to the optical axis between the inflection point on the image-side surface 164 of the sixth lens element 160 that is the nearest to the optical axis and the optical axis is denoted by HIF621. The optical image capturing system satisfies: HIF611=2.24283 mm; HIF611/HOI=0.44857; HIF621=1.07376 mm; HIF621/HOI=0.21475.

The distance perpendicular to the optical axis between the inflection point on the object-side surface 162 of the sixth lens element 160 that is the second nearest to the optical axis and the optical axis is denoted by HIF612, The distance perpendicular to the optical axis between the inflection point on the image-side surface 164 of the sixth lens element 160 that is the second nearest to the optical axis and the optical axis is denoted by HIF622. The optical image capturing system satisfies: HIF612=2.48895 mm and HIF612/HOI=0.49779.

The distance perpendicular to the optical axis between the inflection point on the object-side surface 162 of the sixth lens element 160 that is the third nearest to the optical axis and the optical axis is denoted by HIF613. The distance perpendicular to the optical axis between the inflection point on the image-side surface 164 of the sixth lens element 160 that is the third nearest to the optical axis and the optical axis is denoted by HIF623, and the optical image capturing system satisfies: HIF613=0 mm; HIF613/HOI=0; HIF623=0 mm; HIF623/HOI=0.

The distance perpendicular to the optical axis between the inflection point on the object-side surface 162 of the sixth lens element 160 that is the fourth nearest to the optical axis and the optical axis is denoted by HIF614. The distance perpendicular to the optical axis between the inflection point on the image-side surface 164 of the sixth lens element 160 that is the fourth nearest to the optical axis and the optical axis is denoted by HIF624, and the optical image capturing system satisfies: HIF614=0 mm; HIF614/HOI=0; HIF624=0 mm; HIF624/HOI=0.

The IR-bandstop Filter 180 is made of glass and disposed between the sixth lens element 160 and the image plane 190, and it does not affect the focal length of the optical image capturing system.

In the optical image capturing system of this embodiment, f is a focal length of the optical image capturing system, HEP is an entrance pupil diameter of the optical image capturing system, HAF is a half of the maximum field angle of the optical image capturing system. The detailed parameters are shown as below: f=4.075 mm; f/HEP=1.4; and HAF=50.001 degrees, and tan(HAF)=1.1918.

In the optical image capturing system of this embodiment, f1 is a focal length of the first lens element 110, f6 is a focal length of the sixth lens element 160, and the optical image capturing system satisfies: f1=−7.828 mm; |f/f1|=0.52060; f6=−4.886; and |f1|>|f6|.

In the optical image capturing system of this embodiment, f2, f3, f4 and f5 are focus lengths of the second lens element 120 to the fifth lens element 150, respectively, and the optical image capturing system satisfies: |f2|+|f3|+|f4|+|f5|=95.50815 mm; |f1|+|f6|=12.71352 mm and |f2|+|f3|+|f4|+|f5|>|f1|+|f6|.

The ratio of the focal length f of the optical image capturing system to a focal length fp of each lens element with positive refractive power is PPR, and the ratio of the focal length f of the optical image capturing system to a focal length fn of each lens element with negative refractive power is NPR. In the optical image capturing system of this embodiment, a sum of the PPR of all lens elements with positive refractive powers is ΣPPR=f/f2+f/f4+f/f5=1.63290, and a sum of the PPR of all lens elements with negative refractive powers is ΣNPR=|f/f1|+|f/f3|+|f/f6|=1.51305, and ΣPPR/|ΣNPR|=1.07921. The following conditions are also satisfied: |f/f2|=0.69101; |f/f3|=0.15834; |f/f4|=0.06883; |f/f5|=0.87305; |f/f6|=0.83412.

In the optical image capturing system of this embodiment, the distance from the object-side surface 112 of the first lens element 110 to the image-side surface 164 of the sixth lens element 160 is InTL. The distance from the object-side surface 112 of the first lens element 110 to the image plane 190 is HOS. The distance from the aperture stop 100 to image plane 190 is InS. A half of a diagonal of an effective sensing area of the image-sensing device 192 is HOI. The distance from the image-side surface 164 of the sixth lens element to the image plane 190 is BFL. The optical image capturing system satisfies: InTL+BFL=HOS; HOS=19.54120 mm; HOI=5.0 mm; HOS/HOI=3.90824; HOS/f=4.7952; InS=11.685 mm; and InS/HOS=0.59794.

In the optical image capturing system of this embodiment, the sum of central thicknesses of all lens elements with refractive powers on the optical axis is ΣTP, and the optical image capturing system satisfies: ΣTP=8.13899 mm; and ΣTP/InTL=0.52477. Therefore, the contrast ratio for the image formation in the optical image capturing system can be improved without sacrificing the yield rate for manufacturing the lens element, and a proper back focal length is provided to accommodate other optical components in the optical image capturing system.

In the optical image capturing system of this embodiment, the curvature radius of the object-side surface 112 of the first lens element 110 is R1, and the curvature radius of the image-side surface 114 of the first lens element 120 is R2, and the optical image capturing system satisfies: |R1/R2|=8.99987. Therefore, the first lens element 110 may have a suitable magnitude of positive refractive power, to reduce the increase rate of the spherical aberration.

In the optical image capturing system of this embodiment, a radius of curvature of the object-side surface 162 of the sixth lens element 160 is R11, the curvature radius of the image-side surface 164 of the sixth lens element 160 is R2, and the optical image capturing system satisfies: (R11−R12)/(R11+R12)=1.27780. This configuration is beneficial to the correction of the astigmatism generated by the optical image capturing system.

In the optical image capturing system of this embodiment, a sum of focal lengths of all lens elements with positive refractive power is ΣPP, and the optical image capturing system satisfies: ΣPP=f2+f4+f5=69.770 mm; and f5/(f2+f4+f5)=0.067. With this configuration, the positive refractive power of a single lens element can be distributed to other lens elements with positive refractive powers in an appropriate way, to suppress the generation of noticeable aberrations when the incident light is propagating in the optical system.

In the optical image capturing system of this embodiment, a sum of focal lengths of all lens elements with negative refractive power is ΣNP, and the optical image capturing system satisfies: ΣNP=f1+f3+f6=−38.451 mm; and f6/(f1+f3+f6)=0.127. With this configuration, the negative refractive power of the sixth lens element 160 may be distributed to other lens elements with negative refractive power in an appropriate way, to suppress the generation of noticeable aberrations when the incident light is propagating in the optical system.

In the optical image capturing system of this embodiment, the distance between the first lens element 110 and the second lens element 120 on the optical axis is IN12, and the optical image capturing system satisfies: IN12=6.418 mm; IN12/f=1.57491. With this configuration, the chromatic aberration of the lens elements can be mitigated, such that their performance is improved.

In the optical image capturing system of this embodiment, the distance between the fifth lens element 150 and the sixth lens element 160 on the optical axis is IN56, and the optical image capturing system satisfies: IN56=0.025 mm; IN56/f=0.00613. With this configuration, the chromatic aberration of the lens elements can be mitigated, such that their performance is improved.

In the optical image capturing system of this embodiment, the central thicknesses of the first lens element 110 and the second lens element 120 on the optical axis are TP1 and TP2, respectively. The optical image capturing system satisfies: TP1=1.934 mm; TP2=2.486 mm; and (TP1+IN12)/TP2=3.36005.1 With this configuration, the sensitivity of the optical image capturing system can be controlled, and its performance can be improved.

In the optical image capturing system of this embodiment, the central thicknesses of the fifth lens element 150 and the sixth lens element 160 on the optical axis are TP5 and TP6, respectively. The distance between that two lens elements on the optical axis is IN56, and the optical image capturing system satisfies: TP5=1.072 mm; TP6=1.031 mm; and (TP6+IN56)/TP5=0.98555. Therefore, the sensitivity of the optical image capturing system can be controlled and the total height of the optical image capturing system can be reduced.

In the optical image capturing system of this embodiment, a distance between the third lens element 130 and the fourth lens element 140 on the optical axis is IN34. The distance between the fourth lens element 140 and the fifth lens element 150 on the optical axis is IN45, and the optical image capturing system satisfies: IN34=0.401 mm; IN45=0.025 mm; and TP4/(IN34+TP4+IN45)=0.74376. Therefore, the aberration generated when the incident light is propagating inside the optical system can be corrected slightly layer upon layer, and the total height of the optical image capturing system can be reduced.

In the optical image capturing system of this embodiment, a distance parallel to an optical axis from a maximum effective half diameter position to an axial point on the object-side surface 152 of the fifth lens element 150 is InRS51. The distance parallel to an optical axis from a maximum effective half diameter position to an axial point on the image-side surface 154 of the fifth lens element 150 is InRS52. The central thickness of the fifth lens element 150 is TP5. The optical image capturing system satisfies: InRS51=−0.34789 mm; InRS52=−0.88185 mm; |InRS51|/TP5=0.32458 and |InRS52|/TP5=0.82276. This configuration is favorable to the manufacturing and forming of lens elements, as well as the minimization of the optical image capturing system.

In the optical image capturing system of this embodiment, the distance perpendicular to the optical axis between a critical point on the object-side surface 152 of the fifth lens element 150 and the optical axis is HVT51. The distance perpendicular to the optical axis between a critical point on the image-side surface 154 of the fifth lens element 150 and the optical axis is HVT52, and the optical image capturing system satisfies: HVT51=0.515349 mm; HVT52=0 mm.

In the optical image capturing system of this embodiment, a distance parallel to an optical axis from a maximum effective half diameter position to an axial point on the object-side surface 162 of the sixth lens element 160 is InRS61, a distance parallel to an optical axis from a maximum effective half diameter position to an axial point on the image-side surface 164 of the sixth lens element 160 is InRS62, and the central thickness of the sixth lens element 160 is TP6, and the optical image capturing system satisfies: InRS61=−0.58390 mm; InRS62=0.41976 mm; |InRS61|/TP6=0.56616 and |InRS62|/TP6=0.40700. This configuration is favorable to the manufacturing and forming of lens elements, as well as the minimization of the optical image capturing system.

In the optical image capturing system of this embodiment, the distance perpendicular to the optical axis between a critical point on the object-side surface 162 of the sixth lens element 160 and the optical axis is HVT61. The distance perpendicular to the optical axis between a critical point C62 on the image-side surface 164 of the sixth lens element 160 and the optical axis is HVT62, and the optical image capturing system satisfies: HVT61=0 mm; HVT62=0 mm.

In the optical image capturing system of this embodiment, the optical image capturing system satisfies: HVT51/HOI=0.1031. Therefore, the aberration for the surrounding field of view for the optical image capturing system can be corrected.

In the optical image capturing system of this embodiment, the optical image capturing system satisfies: HVT51/HOS=0.02634. Therefore, the aberration for the surrounding field of view for the optical image capturing system can be corrected.

In the optical image capturing system of this embodiment, the second lens element 120, the third lens element 130 and the sixth lens element 160 have negative refractive powers, and the Coefficient of dispersion of the second lens element is NA2, the Coefficient of dispersion of the third lens element is NA3, the Coefficient of dispersion of the sixth lens element is NA6, and the optical image capturing system satisfies: NA6/NA2≤1. With this configuration, the chromatic aberration of the optical image capturing system can be corrected.

In the optical image capturing system of this embodiment, TV distortion for image formation in the optical image capturing system is denoted by TDT, the optical distortion for image formation in the optical image capturing system is ODT, and the optical image capturing system satisfies: TDT=2.124%; ODT=5.076%.

In the optical image capturing system of this embodiment, the transverse aberration of the visible rays with the longest operation wavelength from a positive-directional tangential fan, which passes through the edge of the entrance pupil and strikes at the position of 0.7 field of view on the image plane, is denoted as PLTA, and PLTA=0.006 mm. The transverse aberration of the visible rays with the shortest operation wavelength from a positive-directional tangential fan, which passes through the edge of the entrance pupil and strikes at the position of 0.7 field of view on the image plane, is denoted as PSTA, and PSTA=0.005 mm. The transverse aberration of the visible rays with the longest operation wavelength from the negative-directional tangential fan, which passes through the edge of the entrance pupil and strike at the position of 0.7 field of view on the image plane, is denoted as NLTA, and NLTA=0.004 mm. The transverse aberration of the visible rays with the shortest operation wavelength from the negative-directional tangential fan, which passes through the edge of the entrance pupil and strikes at the position of 0.7 field of view on the image plane, is denoted as NSTA, and NSTA=−0.007 mm. The transverse aberration of the visible rays with the longest operation wavelength from the sagittal fan, which passes through the edge of the entrance pupil and strikes at the position of 0.7 field of view on the image plane, is denoted as SLTA, and SLTA=−0.003 mm. The transverse aberration of the visible rays with the shortest operation wavelength from the sagittal fan, which passes through the edge of the entrance pupil and strikes at the position of 0.7 field of view on the image plane, is denoted as SSTA, and SSTA=0.008 mm.

Figure 7:
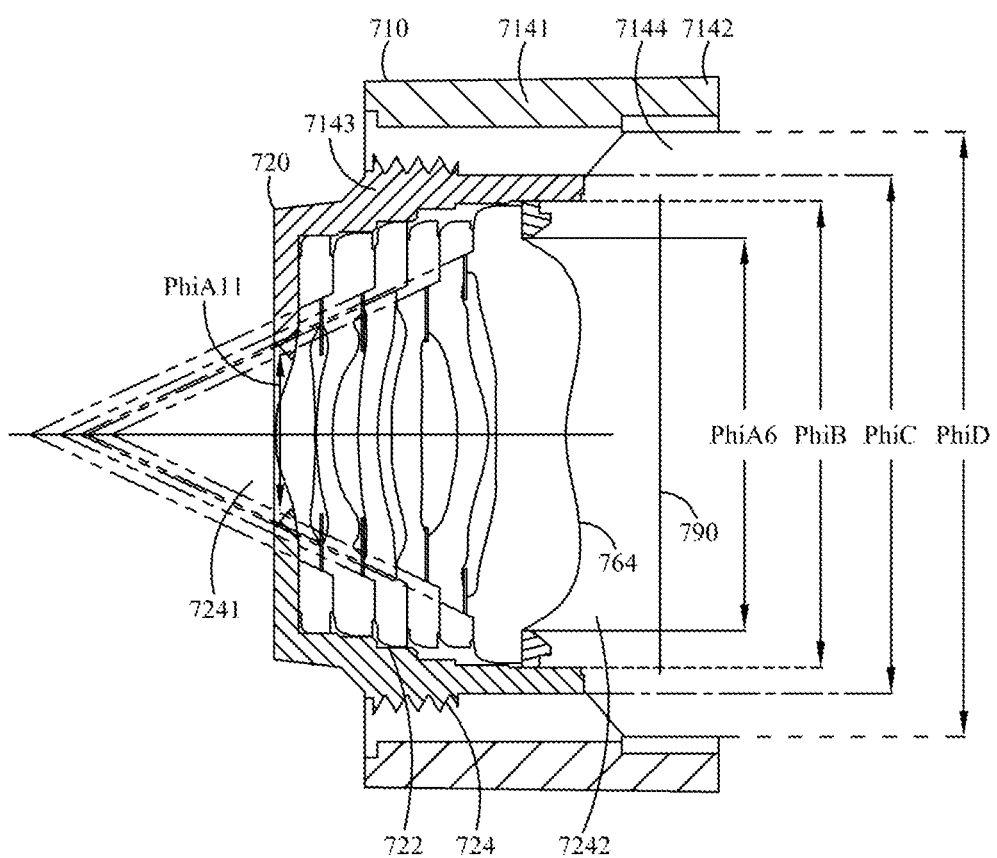
FIG. 7 is schematic view showing maximum effective diameter PhiA6 of image-side surface of sixth lens element, maximum diameter PhiB of the image-side surface of the sixth lens element, a maximum value PhiD of the minimum side length of the basement of the first positioning element perpendicular to the optical axis, and the maximum outer diameter PhiC of the connection part of the second positioning element perpendicular to the surface of the optical axis.

Please refer to FIG. 7. The optical image capturing system of this embodiment may include an image sensing module (not shown in FIG. 7), and the image sensing module includes a substrate and a photosensitive element disposed on the substrate. The optical image capturing system may include a first positioning element 710 which comprises a base 712 and a holder 714. The base has an open accommodation space formed on the substrate to accommodate the photosensitive element. The holder is in a hollow shape and opaque. Optionally, the holder can be formed integrally. The holder 714 has a cylinder 7141 and a basement 7142. The holder 714 has a first through hole 7143 and a second through hole 7144 formed on two opposite ends thereof, respectively. The first through hole 7143 is connected with the cylinder 7141, and the second through hole 7144 is connected with the basement 7142. A maximum value of the minimum side length of the basement perpendicular to the optical axis is denoted by PhiD, and PhiD=6.838 millimeter.

The optical image capturing system of this embodiment includes a second positioning element 720 which is accommodated in the holder 714 of the first positioning element 710, and comprises a positioning part 722 and a connection part 724. The positioning part 722 is in a hollow shape and has a third through hole 7241 and a fourth through hole 7242 formed on two opposite ends thereof on the optical axis. The third through hole 7241 is connected with the positioning part 722, and the fourth through hole 7242 is connected with the basement 7142. The positioning part 722 is in direct contact with any of the lens elements, and configured to accommodate, arrange and position the lens elements on the optical axis. The connection part 724 is disposed outside the positioning part 722 and can be directly combined with the cylinder 7141, so that the second positioning element 720 can be accommodated in the holder 714 of the first positioning element 710, and the optical image capturing system can adjust and position the focal length in optical axis direction. The maximum outer diameter of the connection part perpendicular to the surface of the optical axis is denoted by PhiC, and PhiC=6.638 mm. The maximum inner hole diameter of the fourth through hole 7242 is denoted as Phi4. The connection part 724 is threaded and the second positioning element 720 can be screwed into the holder 714 of the first positioning element 710.

Any of lens elements of this embodiment can be indirectly disposed in the first positioning element 710 by the second positioning element 720, and disposed closer to the third through hole 7241 than the image-sensing device, and face the image-sensing device.

In this embodiment, the lens element which is nearest to the image plane is sixth lens element 160, a maximum effective diameter of the image-side surface 164 of the sixth lens element 160 is denoted as PhiA6 which satisfies condition as follows: PhiA6=a double of EHD62=6.438 mm. The image-side surface is aspheric, and cutoff points of the maximum effective diameter include cutoff points of the aspheric surface. The ineffective half diameter (IHD) of the image-side surface 164 of sixth lens element 160 is a surface section extended from the cutoff points of the maximum effective half diameter of the same surface in a direction away from the optical axis. In this embodiment, the lens element which is nearest to the image plane is sixth lens element 160, The maximum diameter of the image-side surface is denoted as PhiB, which satisfies the following condition: PhiB=a double of (a maximum EHD 62+a maximum IHD)=PhiA6+a double of a (maximum IHD)=6.5 mm.

In this embodiment, the maximum effective diameter of the image-side surface of the lens element which is nearest to the image plane (that is, the image space) is also called optical exit pupil and denoted as PhiA6. The pupil magnification ratio of the optical image capturing system is denoted by PMR, which satisfies the following condition: PMR=PhiA6/HEP=3.3888. A ratio to pupil and image is denoted by PMMR, which satisfies the following condition: PMMR=PhiA6/2HOI=0.8607. A condensed ratio is denoted by PSMR, and relationship is satisfied: PSMR=PhiA6/InTL=0.6535.

In this embodiment, the maximum effective diameter of the object-side surface 112 of the first lens element 110, is denoted as PhiA11, and the maximum effective diameter of the image-side surface 114 of the first lens element 110 is denoted as PhiA12, which satisfies the following condition: PhiA11=6.932 mm; PhiA12=4.644 mm.

In this embodiment, a ratio of the maximum effective diameter PhiA11 of the object-side surface 112 of the first lens element 110 to the maximum effective diameter PhiA6 of the image-side surface 164 of the sixth lens element 160 is denoted as a slim frame ratio (SFR), which satisfies the following condition: SFR=PhiA11/PhiA6=1.079.

The parameters of the lens elements of the first embodiment are listed in Table 1 and Table 2.

TABLE 1

Lens Parameters for the First Embodiment
f (focus length) = 5.709 mm; f/HEP = 1.9; HAF (half angle of view) = 52.5 deg

| Surface No. | | Curvature Radius | Thickness (mm) | Material |
| --- | --- | --- | --- | --- |
| 0 | Object | Plate | Plate | |
| 1 | First lens | −40.99625704 | 1.934 | Plastic |
| 2 | | 4.555209289 | 5.923 | |
| 3 | Aperture stop | Plate | 0.495 | |
| 4 | Second lens | 5.333427366 | 2.486 | Plastic |
| 5 | | −6.781659971 | 0.502 | |
| 6 | Third lens | −5.697794287 | 0.380 | Plastic |
| 7 | | −8.883957518 | 0.401 | |
| 8 | Fourth lens | 13.19225664 | 1.236 | Plastic |
| 9 | | 21.55681832 | 0.025 | |
| 10 | Fifth lens | 8.987806345 | 1.072 | Plastic |
| 11 | | −3.158875374 | 0.025 | |
| 12 | Sixth lens | −29.46491425 | 1.031 | Plastic |
| 13 | | 3.593484273 | 2.412 | |
| 14 | IR-bandstop Filter | Plate | 0.200 | |
| 15 | | Plate | 1.420 | |
| 16 | Image plate | Plate | | |

| Surface No. | Refractive Index | Coefficient of Dispersion | Focus length |
| --- | --- | --- | --- |
| 0 | | | |
| 1 | 1.515 | 56.55 | −7.828 |
| 2 | | | |
| 3 | | | |
| 4 | 1.544 | 55.96 | 5.897 |
| 5 | | | |
| 6 | 1.642 | 22.46 | −25.738 |
| 7 | | | |
| 8 | 1.544 | 55.96 | 59.205 |
| 9 | | | |
| 10 | 1.515 | 56.55 | 4.668 |
| 11 | | | |
| 12 | 1.642 | 22.46 | −4.886 |
| 13 | | | |

TABLE 1-continued

Lens Parameters for the First Embodiment
f (focus length) = 5.709 mm; f/HEP = 1.9; HAF (half angle of view) = 52.5 deg

| | | |
|---|---|---|
| 14 | 1.517 | 64.13 |
| 15 | | |
| 16 | | |

Reference wavelength = 555 nm; shield position: the clear aperture of the first surface is 5.800 mm; the clear aperture of the third surface is 1.570 mm; the clear aperture of the fifth surface is 1.950 mm

TABLE 2

Aspheric Coefficients of the first embodiment
Table 2: Aspheric Coefficients

| | Surface No | | | |
|---|---|---|---|---|
| | 1 | 2 | 4 | 5 |
| k | 4.310876E+01 | −4.707622E+00 | 2.616025E+00 | 2.445397E+00 |
| A4 | 7.054243E−03 | 1.714312E−02 | −8.377541E−03 | −1.789549E−02 |
| A6 | −5.233264E−04 | −1.502232E−04 | −1.838068E−03 | −3.657520E−03 |
| A8 | 3.077890E−05 | −1.359611E−04 | 1.233332E−03 | −1.131622E−03 |
| A10 | −1.260650E−06 | 2.680747E−05 | −2.390895E−03 | 1.390351E−03 |
| A12 | 3.319093E−08 | −2.017491E−06 | 1.998555E−03 | −4.152857E−04 |
| A14 | −5.051600E−10 | 6.604615E−08 | −9.734019E−04 | 5.487286E−05 |
| A16 | 3.380000E−12 | −1.301630E−09 | 2.478373E−04 | −2.919339E−06 |

| | Surface No | | | |
|---|---|---|---|---|
| | 6 | 7 | 8 | 9 |
| k | 5.645686E+00 | −2.117147E+01 | −5.287220E+00 | 6.200000E+01 |
| A4 | −3.379055E−03 | −1.370959E−02 | −2.937377E−02 | −1.359965E−01 |
| A6 | −1.225453E−03 | 6.250200E−03 | 2.743532E−03 | 6.628518E−02 |
| A8 | −5.979572E−03 | −5.854426E−03 | −2.457574E−03 | −2.129167E−02 |
| A10 | 4.556449E−03 | 4.049451E−03 | 1.874319E−03 | 4.396344E−03 |
| A12 | −1.177175E−03 | −1.314592E−03 | −6.013661E−04 | −5.542899E−04 |
| A14 | 1.370522E−04 | 2.143097E−04 | 8.792480E−05 | 3.768879E−05 |
| A16 | −5.974015E−06 | −1.399894E−05 | −4.770527E−06 | −1.052467E−06 |

| | Surface No | | | |
|---|---|---|---|---|
| | 10 | 11 | 12 | 13 |
| k | −2.114008E+01 | −7.699904E+00 | −6.155476E+01 | −3.120467E−01 |
| A4 | −1.263831E−01 | −1.927804E−02 | −2.492467E−02 | −3.521844E−02 |
| A6 | 6.965399E−02 | 2.478376E−03 | −1.835360E−03 | 5.629654E−03 |
| A8 | −2.116027E−02 | 1.438785E−03 | 3.201343E−03 | −5.466925E−04 |
| A10 | 3.819371E−03 | −7.013749E−04 | −8.990757E−04 | 2.231154E−05 |
| A12 | −4.040283E−04 | 1.253214E−04 | 1.245343E−04 | 5.548990E−07 |
| A14 | 2.280473E−05 | −9.943196E−06 | −8.788363E−06 | −9.396920E−08 |
| A16 | −5.165452E−07 | 2.898397E−07 | 2.494302E−07 | 2.728360E−09 |

The values associated with the outline curve length may be deduced from Table 1 and Table 2.

The first embodiment (Primary reference wavelength: 555 nm)

| ARE | 1/2(HEP) | ARE value | ARE − 1/2(HEP) | 2(ARE/HEP)% | TP | ARE/TP(%) |
|---|---|---|---|---|---|---|
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/EHD)% | TP | ARS/TP(%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first embodiment in FIG. 1A, wherein the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, wherein k is the conic coefficient in the aspheric surface formula, and A1-A20 are the first to the twentieth order aspheric surface coefficient. Furthermore, the tables in the following embodiments are referenced to the schematic view and the aberration graphs, respectively, and definitions of parameters in the tables are equal to those in the Table 1 and the Table 2, so the repetitious details will not be given here.

The Second Embodiment

Figure 2A:
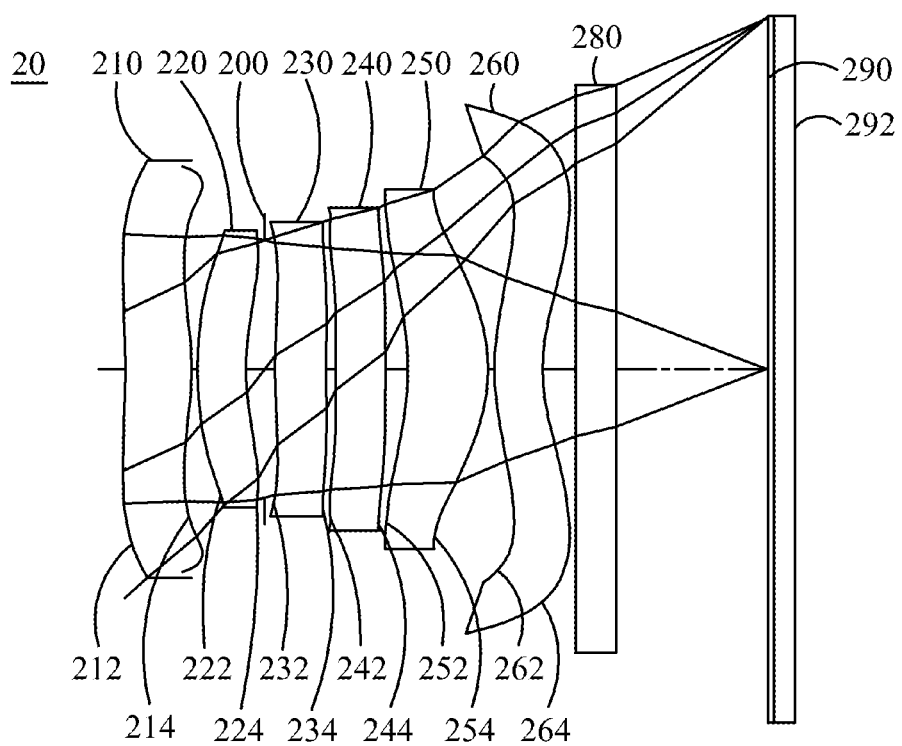
FIG. 2A is a schematic view of an optical image capturing system of a second embodiment of the present invention.
Figure 2B:
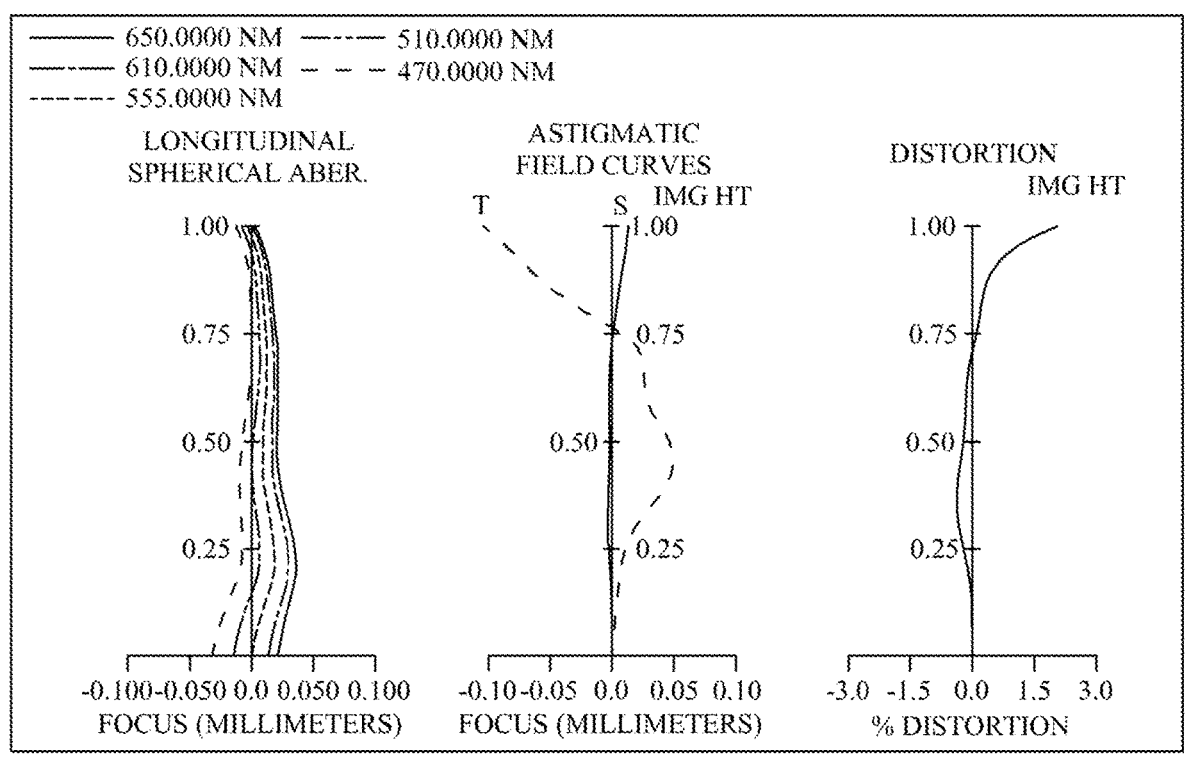
FIG. 2B shows curve diagrams of longitudinal spherical aberration, astigmatic field, and optical distortion of the optical image capturing system in the order from left to right of the second embodiment of the present invention.
Figure 2C:
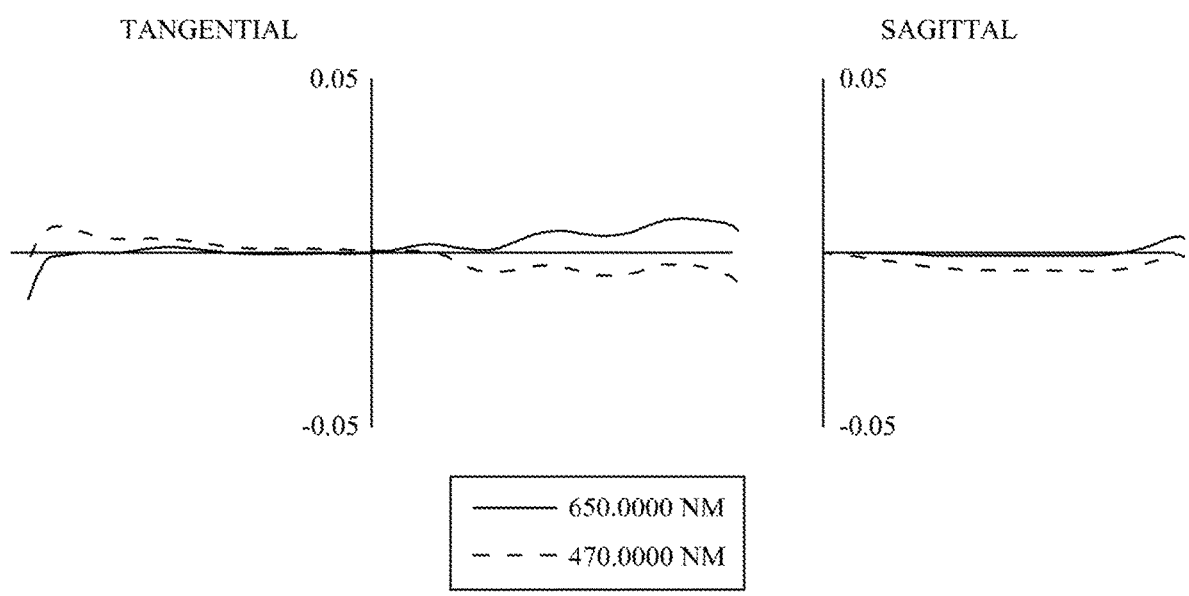
FIG. 2C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the second embodiment of the present invention.

Please refer to FIGS. 2A and 2B. FIG. 2A is a schematic view of an optical image capturing system of a second embodiment of the present invention. FIG. 2B shows curve diagrams of longitudinal spherical aberration, astigmatic field, and optical distortion of the optical image capturing system in the order from left to right of the second embodiment of the present invention. FIG. 2C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the second embodiment of the present invention. As shown in FIG. 2A, in order along an optical axis from an object side to an image side, the optical image capturing system comprises a first lens element 210, a second lens element 220, an aperture stop 200, a third lens element 230, a fourth lens element 240, a fifth lens element 250, a sixth lens element 260, an IR-bandstop Filter 280, an image plane 290 and an image-sensing device 292.

The first lens element 210 has positive refractive power, and is made of a plastic material. The first lens element 210 has a concave object-side surface 212 and a convex image-side surface 214, and both of the object-side surface 212 and the image-side surface 214 are aspheric. Each of the object-side surface 212 and the image-side surface 214 has an inflection point.

The second lens element 220 has negative refractive power and is made of a plastic material, and has a convex object-side surface 222 and a concave image-side surface 224, and both of the object-side surface 222 and the image-side surface 224 are aspheric. Each of the object-side surface 222 and the image-side surface 224 has an inflection point.

The third lens element 230 has positive refractive power and is made of a plastic material, and has a convex object-side surface 232 and a concave image-side surface 234, and both of the object-side surface 232 and the image-side surface 234 are aspheric. The object-side surface 232 has an inflection point and the image-side surface 234 has three inflection points.

The fourth lens element 240 has positive refractive power and is made of a plastic material, and has a convex object-side surface 242 and a convex image-side surface 244, and both of the object-side surface 242 and the image-side surface 244 are aspheric. The object-side surface 242 has three inflection points and the image-side surface 244 has an inflection points.

The fifth lens element 250 has positive refractive power and is made of a plastic material, and has a concave object-side surface 252 and a convex image-side surface 254, and both of the object-side surface 252 and the image-side surface 254 are aspheric. Each of the object-side surface 252 and the image-side surface 254 has an inflection point.

The sixth lens element 260 has negative refractive power and is made of a plastic material, and has a convex object-side surface 262 and a concave image-side surface 264. With this configuration, the back focal length can be shortened to keep small in size. Furthermore, each of the object-side surface 262 and the image-side surface 264 of the sixth lens element 260 has an inflection point, so that the angle of incident with incoming light from an off-axis view field can be suppressed effectively and, the aberration in the off-axis view field can be corrected.

The IR-bandstop Filter 280 is made of glass and disposed between the sixth lens element 260 and the image plane 290, and it does not affect the focal length of the optical image capturing system.

The parameters of the lens elements of the second embodiment are listed in Table 3 and Table 4.

TABLE 3

Lens Parameters for the Second Embodiment
f (focus length) = 1.162 mm; f/HEP = 1.5; HAF (half angle of view) = 40.053 deg

| Surface No. | Curvature Radius | Thickness (mm) | Material |
|---|---|---|---|
| 0 | Object | 1E+18 | 1E+18 | |
| 1 | First lens | −2.792987005 | 0.205 | Plastic |
| 2 | | −0.753742795 | 0.020 | |
| 3 | Second lens | 1.469594288 | 0.150 | Plastic |
| 4 | | 0.642041338 | 0.058 | |
| 5 | Aperture stop | 1E+18 | 0.033 | |
| 6 | Third lens | 2.059448777 | 0.159 | Plastic |
| 7 | | 7.302982065 | 0.029 | |
| 8 | Fourth lens | 11.19212701 | 0.155 | Plastic |
| 9 | | −22.98655342 | 0.069 | |
| 10 | Fifth lens | −0.795625279 | 0.250 | Plastic |
| 11 | | −0.434552592 | 0.020 | |
| 12 | Sixth lens | 0.675244759 | 0.150 | Plastic |
| 13 | | 0.48384088 | 0.103 | |
| 14 | IR-bandstop Filter | 1E+18 | 0.125 | BK_7 |
| 15 | | 1E+18 | 0.469 | |
| 16 | Image plate | 1E+18 | 0.005 | |

| Surface No. | Refractive Index | Coefficient of Dispersion | Focus length |
|---|---|---|---|
| 0 | | | |
| 1 | 1.661 | 20.381 | 1.488 |
| 2 | | | |
| 3 | 1.515 | 56.524 | −2.354 |
| 4 | | | |
| 5 | | | |
| 6 | 1.544 | 55.938 | 5.200 |
| 7 | | | |
| 8 | 1.515 | 56.524 | 14.603 |
| 9 | | | |
| 10 | 1.544 | 55.938 | 1.410 |
| 11 | | | |
| 12 | 1.661 | 20.381 | −3.729 |
| 13 | | | |
| 14 | NBK7 | | |
| 15 | | | |
| 16 | | | |

Reference wavelength = 555 nm; shield position: the clear aperture of the second surface is 0.475 mm; the clear aperture of the eleventh surface is 0.510 mm

TABLE 4

Aspheric Coefficients of the second embodiment
Table 4: Aspheric Coefficients

| | Surface No. | | | |
|---|---|---|---|---|
| | 1 | 2 | 3 | 4 |
| k | −8.995291E+01 | −3.526302E+01 | −8.996924E+01 | −2.208683E+01 |
| A4 | 5.736383E−01 | 1.626704E+00 | 1.085437E+01 | 2.596467E+00 |
| A6 | 1.717325E+00 | −8.056542E+00 | −1.761758E+02 | −8.494902E+01 |
| A8 | −1.035287E−01 | 1.181387E+02 | 1.918411E+03 | 1.051682E+03 |
| A10 | −3.047870E+01 | −8.383392E+02 | −1.278141E+04 | −8.089801E+03 |
| A12 | 1.160266E+02 | 3.272753E+03 | 4.655210E+04 | 3.357582E+04 |
| A14 | −1.357954E+02 | −5.879604E+03 | −7.351965E+04 | −5.884031E+04 |
| A16 | 0.000000E+00 | 2.301784E+03 | 0.000000E+00 | 0.000000E+00 |
| A18 | 0.000000E+00 | 0.000000E+00 | 0.000000E+00 | 0.000000E+00 |

| | Surface No. | | | |
|---|---|---|---|---|
| | 6 | 7 | 8 | 9 |
| k | −8.992203E+01 | 4.540475E+01 | 4.927686E+01 | 2.153130E+01 |
| A4 | −5.189507E−01 | −2.761175E+00 | −3.638066E+00 | −1.302246E+00 |
| A6 | −9.354087E+00 | 3.664304E+01 | 4.192016E+01 | 8.346437E−01 |
| A8 | 2.638863E+01 | −4.873162E+02 | −5.269614E+02 | 3.746631E+01 |
| A10 | 0.000000E+00 | 3.415468E+03 | 3.853466E+03 | 1.599286E+02 |
| A12 | 0.000000E+00 | −8.324341E+03 | −1.068333E+04 | −2.771492E+03 |
| A14 | 0.000000E+00 | 0.000000E+00 | 5.968039E+03 | 7.339780E+03 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| | Surface No. | | | |
|---|---|---|---|---|
| | 10 | 11 | 12 | 13 |
| k | −1.710630E+01 | −4.065411E+00 | −1.222839E+01 | −5.528939E+00 |
| A4 | −1.506772E+00 | −1.974008E+00 | 1.340310E+00 | −2.062785E+00 |
| A6 | 5.084961E+00 | 1.022419E+01 | −4.089058E+01 | 1.055378E+01 |
| A8 | 7.788008E+01 | −2.236604E+01 | 4.398729E+02 | −4.980789E+01 |
| A10 | −2.374820E+02 | 1.487360E+02 | −2.814976E+03 | 1.319004E+02 |
| A12 | −1.244603E+03 | −5.511090E+02 | 1.045372E+04 | −1.954825E+02 |
| A14 | 4.332921E+03 | 8.007279E+02 | −2.142963E+04 | 1.405996E+02 |
| A16 | 0.000000E+00 | 0.000000E+00 | 2.058896E+04 | −4.791298E+01 |
| A18 | 0.000000E+00 | 0.000000E+00 | −5.516082E+03 | 0.000000E+00 |

The second embodiment, the presentation of the aspheric surface formula is similar to that in the first embodiment. Furthermore, the definitions of parameters in following tables are equal to those in the first embodiment, so the repetitious details will not be given here.

The following contents may be deduced from Table 3 and Table 4.

The second embodiment (Primary reference wavelength: 555 nm)

| |f/f1| | |f/f2| | |f/f3| | |f/f4| | |f/f5| | |f/f6| |
|---|---|---|---|---|---|
| 0.78083 | 0.49372 | 0.22349 | 0.07958 | 0.82446 | 0.31164 |
| ΣPPR | ΣNPR | |ΣNPR|/ΣPPR | IN12/f | IN56/f | TP4/(IN34 + TP4 + IN45) |
| 1.90837 | 0.80536 | 2.36958 | 0.01721 | 0.01721 | 0.61233 |
| |f1/f2| | |f2/f3| | (TP1 + IN12)/TP2 | | (TP6 + IN56)/TP5 | |
| 0.63230 | 0.45267 | 1.50157 | | 0.67927 | |
| HOS | InTL | HOS/HOI | InS/HOS | ODT % | TDT % |
| 1.99999 | 1.29814 | 1.99999 | 0.78343 | 2.05963 | 2.20228 |
| HVT51 | HVT52 | HVT61 | HVT62 | HVT62/HOI | HVT62/HOS |
| 0 | 0.49337 | 0.42921 | 0.46776 | 0.46776 | 0.23388 |
| HVT21 | HVT22 | HVT31 | HVT32 | HVT41 | HVT42 |
| 0.000 | 0.328 | 0.255 | 0.129 | 0.083 | 0.447 |
| TP2/TP3 | TP3/TP4 | InRS61 | InRS62 | |InRS61|/TP6 | |InRS62|/TP6 |
| 0.94233 | 1.02790 | −0.03458 | −0.07591 | 0.23051 | 0.50604 |
| PLTA | PSTA | NLTA | NSTA | SLTA | SSTA |
| −0.008 mm | 0.006 mm | −0.001 mm | −0.014 mm | −0.002 mm | 0.004 mm |

The second embodiment (Primary reference wavelength: 555 nm)

| IN12 + IN23 | IN34 + IN45 | IN12 | IN23 | IN34 | IN45 |
|---|---|---|---|---|---|
| 0.111 | 0.098 | 0.020 | 0.091 | 0.029 | 0.069 |
| PhiA11 | PhiA12 | PhiA6 | PhiB | PhiC | PhiD |
| 1.182 mm | 0.95 mm | 1.50 mm | 1.515 mm | 1.715 mm | 1.915 mm |
| PhiA6/InTL | PhiA6/2HOI | PhiA11/2HOI | SFR (PhiA11/PhiA6) | | |
| 1.1628 | 0.75 | 0.591 | 0.788 | | |

The value associated with the outline curve length may be deduced from Table 3 and Table 4.

The second embodiment (Primary reference wavelength: 555 nm)

| ARE | ½(HEP) | ARE value | ARE − ½(HEP) | 2 (ARE/HEP) % | TP | ARE/TP (%) |
|---|---|---|---|---|---|---|
| 11 | 0.382 | 0.382 | −0.00001 | 100.00% | 0.205 | 186.25% |
| 12 | 0.382 | 0.383 | 0.00111 | 100.29% | 0.205 | 186.80% |
| 21 | 0.382 | 0.394 | 0.01127 | 102.95% | 0.150 | 262.36% |
| 22 | 0.382 | 0.385 | 0.00279 | 100.73% | 0.150 | 256.70% |
| 31 | 0.374 | 0.375 | 0.00057 | 100.15% | 0.159 | 235.52% |
| 32 | 0.382 | 0.382 | 0.00004 | 100.01% | 0.159 | 240.17% |
| 41 | 0.382 | 0.383 | 0.00067 | 100.17% | 0.155 | 247.28% |
| 42 | 0.382 | 0.383 | 0.00036 | 100.09% | 0.155 | 247.08% |
| 51 | 0.382 | 0.388 | 0.00533 | 101.39% | 0.250 | 154.87% |

-continued

| The second embodiment (Primary reference wavelength: 555 nm) | | | | | | |
|---|---|---|---|---|---|---|
| 52 | 0.382 | 0.409 | 0.02684 | 107.02% | 0.250 | 163.47% |
| 61 | 0.382 | 0.387 | 0.00477 | 101.25% | 0.150 | 258.02% |
| 62 | 0.382 | 0.390 | 0.00799 | 102.09% | 0.150 | 260.17% |

| ARS | EHD | ARS value | ARS − EHD | (ARS/EHD) % | TP | ARS/TP (%) |
|---|---|---|---|---|---|---|
| 11 | 0.591 | 0.606 | 0.01463 | 102.47% | 0.205 | 295.21% |
| 12 | 0.475 | 0.481 | 0.00586 | 101.23% | 0.205 | 234.30% |
| 21 | 0.419 | 0.430 | 0.01170 | 102.79% | 0.150 | 286.92% |
| 22 | 0.387 | 0.390 | 0.00278 | 100.72% | 0.150 | 260.15% |
| 31 | 0.374 | 0.375 | 0.00057 | 100.15% | 0.159 | 235.52% |
| 32 | 0.416 | 0.416 | 0.00000 | 100.00% | 0.159 | 261.55% |
| 41 | 0.425 | 0.426 | 0.00082 | 100.19% | 0.155 | 275.09% |
| 42 | 0.459 | 0.459 | −0.00002 | 100.00% | 0.155 | 296.29% |
| 51 | 0.468 | 0.473 | 0.00541 | 101.16% | 0.250 | 189.20% |
| 52 | 0.510 | 0.543 | 0.03292 | 106.46% | 0.250 | 216.84% |
| 61 | 0.604 | 0.644 | 0.04000 | 106.62% | 0.150 | 429.39% |
| 62 | 0.750 | 0.950 | 0.20032 | 126.71% | 0.150 | 633.55% |

The following contents may be deduced from Table 3 and Table 4.

| Values associated with inflection point of the second embodiment (Primary reference wavelength: 555 nm) | | | | | | |
|---|---|---|---|---|---|---|
| HIF111 | 0.1685 | HIF111/HOI | 0.1685 | SGI111 | −0.0042 | \| SGI111 \|/ (\| SGI111 \| + TP1) 0.0202 |
| HIF121 | 0.1491 | HIF121/HOI | 0.1491 | SGI121 | −0.0109 | \| SGI121 \|/ (\| SGI121 \| + TP1) 0.0505 |
| HIF211 | 0.3384 | HIF211/HOI | 0.3384 | SGI211 | 0.0650 | \| SGI211 \|/ (\| SGI211 \| + TP2) 0.3022 |
| HIF221 | 0.1831 | HIF221/HOI | 0.1831 | SGI221 | 0.0205 | \| SGI221 \|/ (\| SGI221 \| + TP2) 0.1201 |
| HIF311 | 0.1510 | HIF311/HOI | 0.1510 | SGI311 | 0.0046 | \| SGI311 \|/ (\| SGI311 \| + TP3) 0.0282 |
| HIF321 | 0.0696 | HIF321/HOI | 0.0696 | SGI321 | 0.0003 | \| SGI321 \|/ (\| SGI321 \| + TP3) 0.0017 |
| HIF322 | 0.3057 | HIF322/HOI | 0.3057 | SGI322 | −0.0060 | \| SGI322 \|/ (\| SGI322 \| + TP3) 0.0366 |
| HIF323 | 0.3873 | HIF323/HOI | 0.3873 | SGI323 | −0.0100 | \| SGI323 \|/ (\| SGI323 \| + TP3) 0.0590 |
| HIF411 | 0.0467 | HIF411/HOI | 0.0467 | SGI411 | 0.0001 | \| SGI411 \|/ (\| SGI411 \| + TP4) 0.0005 |
| HIF412 | 0.3047 | HIF412/HOI | 0.3047 | SGI412 | −0.0127 | \| SGI412 \|/ (\| SGI412 \| + TP4) 0.0757 |
| HIF413 | 0.4111 | HIF413/HOI | 0.4111 | SGI413 | −0.0179 | \| SGI413 \|/ (\| SGI413 \| + TP4) 0.1037 |
| HIF421 | 0.3896 | HIF421/HOI | 0.3896 | SGI421 | −0.0179 | \| SGI421 \|/ (\| SGI421 \| + TP4) 0.1036 |
| HIF511 | 0.2639 | HIF511/HOI | 0.2639 | SGI511 | −0.0371 | \| SGI511 \|/ (\| SGI511 \| + TP5) 0.1291 |
| HIF521 | 0.3321 | HIF521/HOI | 0.3321 | SGI521 | −0.1070 | \| SGI521 \|/ (\| SGI521 \| + TP5) 0.2996 |
| HIF611 | 0.2295 | HIF611/HOI | 0.2295 | SGI611 | 0.0312 | \| SGI611 \|/ (\| SGI611 \| + TP6) 0.1722 |
| HIF621 | 0.2260 | HIF621/HOI | 0.2260 | SGI621 | 0.0395 | \| SGI621 \|/ (\| SGI621 \| + TP6) 0.2085 |

The Third Embodiment

Figure 3A:
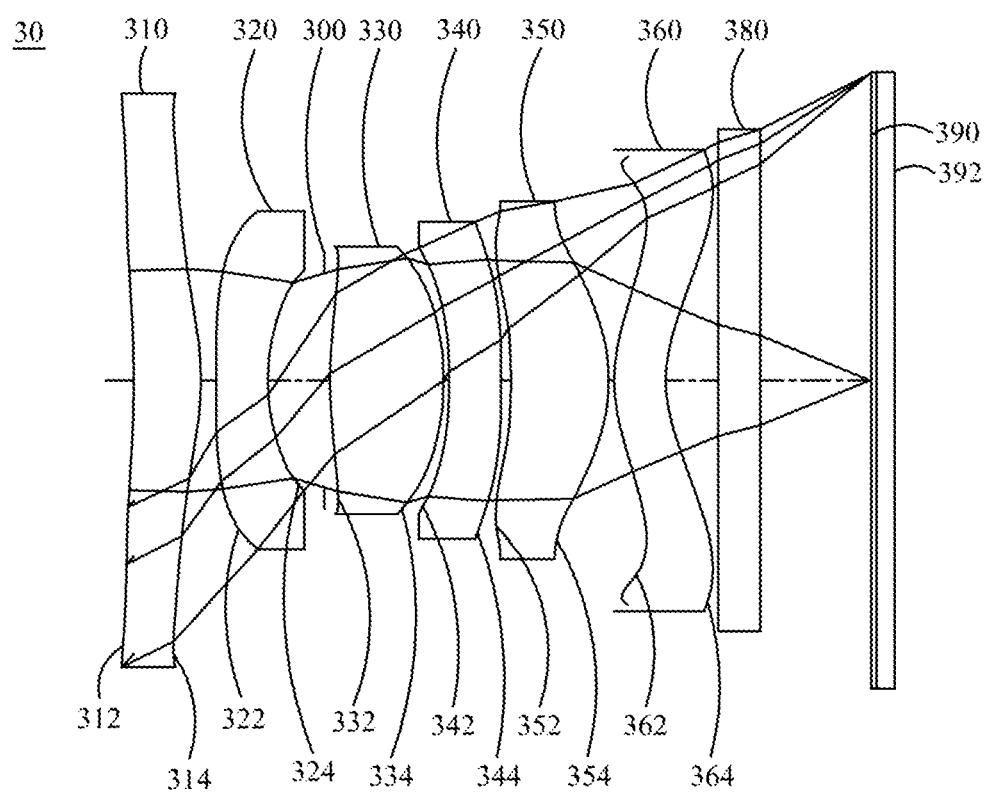
FIG. 3A is a schematic view of an optical image capturing system of a third embodiment of the present invention.
Figure 3B:
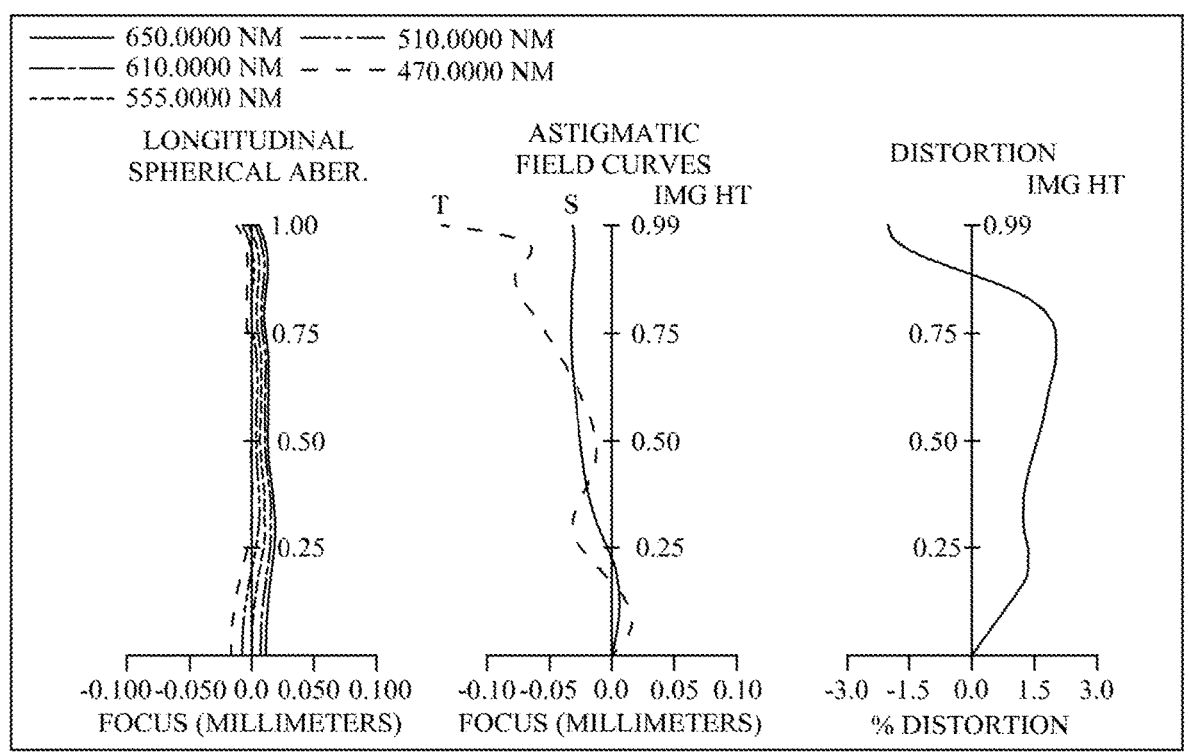
FIG. 3B shows curve diagrams of longitudinal spherical aberration, astigmatic field, and optical distortion of the optical image capturing system in the order from left to right of the third embodiment of the present invention.
Figure 3C:
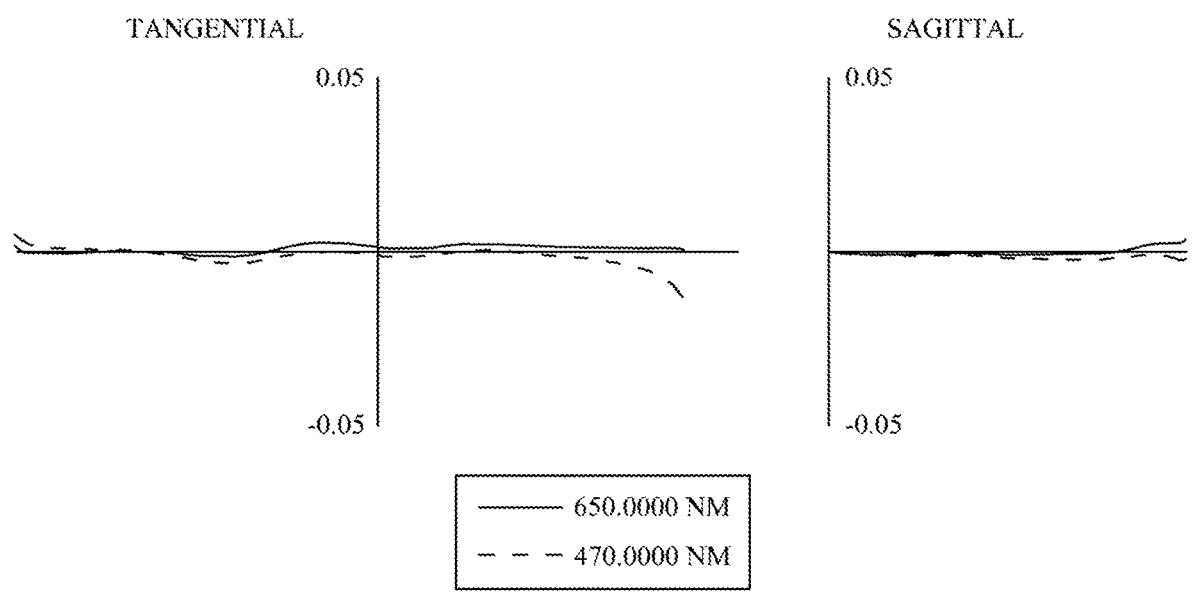
FIG. 3C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the third embodiment of the present invention.

Please refer to FIGS. 3A, 3B and 3C. FIG. 3A is a schematic view of an optical image capturing system of a third embodiment of the present invention. FIG. 3B shows curve diagrams of longitudinal spherical aberration, astigmatic field, and optical distortion of the optical image capturing system in the order from left to right of the third embodiment of the present invention. FIG. 3C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the third embodiment of the present invention. As shown in FIG. 3A, in order along an optical axis from an object side to an image side, the optical image capturing system comprises a first lens element 310, a second lens element 320, an aperture stop 300, a third lens element 330, a fourth lens element 340, a fifth lens element 350, a sixth lens element 360, an IR-bandstop Filter 380, an image plane 390 and an image-sensing device 392.

The first lens element 310 has positive refractive power and is made of a plastic material, and has a concave object-side surface 312 and a convex image-side surface 314, and both of the object-side surface 312 and the image-side surface 314 are aspheric. Each of the object-side surface 312 and the image-side surface 314 has three inflection points.

The second lens element 320 has negative refractive power and is made of a plastic material, and has a convex object-side surface 322 and a concave image-side surface 324. Both of the object-side surface 322 and the image-side surface 324 are aspheric.

The third lens element 330 has positive refractive power and is made of a plastic material, and has a convex object-side surface 332 and a convex image-side surface 334, and both of the object-side surface 332 and the image-side surface 334 are aspheric. The object-side surface 332 has an inflection point.

The fourth lens element 340 has negative refractive power and is made of a plastic material, and has a concave object-side surface 342 and a concave image-side surface 344, and both of the object-side surface 342 and the image-side surface 344 are aspheric. Each of the object-side surface 342 and the image-side surface 344 has an inflection point.

The fifth lens element 350 has positive refractive power and is made of a plastic material, and has a concave object-side surface 352 and a convex image-side surface 354, and both of the object-side surface 352 and the image-side surface 354 are aspheric. The object-side surface 352 has two inflection points and the image-side surface 354 has an inflection point.

The sixth lens element 360 has positive refractive power and is made of a plastic material, and has a convex object-side surface 362 and a concave image-side surface 364, and both of the object-side surface 362 and the image-side surface 364 are aspheric. Each of the object-side surface 362 and the image-side surface 364 has an inflection point. With this configuration, the back focal length can be shortened to keep small in size. Furthermore, the angle of incident with incoming light from an off-axis view field can be suppressed effectively and the aberration in the off-axis view field can be corrected.

The IR-bandstop Filter 380 is made of glass and disposed between the sixth lens element 360 and the image plane 390, and it does not affect the focal length of the optical image capturing system.

The parameters of the lens elements of the third embodiment are listed in Table 5 and Table 6.

TABLE 5

Lens Parameters for the Third Embodiment
f(focus length) = 1.017 mm;
f/HEP = 1.4; HAF(half angle of view) = 45.009 deg

| Surface No. | | Curvature Radius | Thickness (mm) | Material |
|---|---|---|---|---|
| 0 | Object | 1E+18 | 1E+18 | |
| 1 | First lens | −3.476100696 | 0.241 | Plastic |
| 2 | | −0.863395996 | 0.055 | |
| 3 | Second lens | 257.384575 | 0.186 | Plastic |
| 4 | | 0.592222378 | 0.202 | |
| 5 | Aperture stop | 1E+18 | 0.020 | |
| 6 | Third lens | 1.297948912 | 0.407 | Plastic |
| 7 | | −1.226825853 | 0.022 | |
| 8 | Fourth lens | −3.075467447 | 0.185 | Plastic |
| 9 | | 47.60909736 | 0.037 | |
| 10 | Fifth lens | −1.341198755 | 0.350 | Plastic |
| 11 | | −0.56921777 | 0.020 | |
| 12 | Sixth lens | 0.485206815 | 0.185 | Plastic |
| 13 | | 0.414073501 | 0.190 | |
| 14 | IR-bandstop Filter | 1E+18 | 0.150 | BK_7 |
| 15 | | 1E+18 | 0.395 | |
| 16 | Image plate | 1E+18 | 0.005 | |

| Surface No. | Refractive Index | Coefficient of Dispersion | Focus length |
|---|---|---|---|
| 0 | | | |
| 1 | 1.661 | 20.381 | 1.661 |
| 2 | | | |
| 3 | 1.584 | 29.878 | −1.011 |
| 4 | | | |
| 5 | | | |
| 6 | 1.544 | 55.938 | 1.225 |
| 7 | | | |
| 8 | 1.661 | 20.381 | −4.326 |
| 9 | | | |
| 10 | 1.544 | 55.938 | 1.562 |
| 11 | | | |
| 12 | 1.661 | 20.381 | 104.773 |
| 13 | | | |
| 14 | | | |
| 15 | | | |
| 16 | | | |

Reference wavelength = 555 nm; shield position: the clear aperture of the second surface is 0.850 mm; the clear aperture of the ninth surface is 0.515 mm

TABLE 6

Aspheric Coefficients of the third embodiment
Table 6: Aspheric Coefficients of the third embodiment

| | Surface No. | | | |
|---|---|---|---|---|
| | 1 | 2 | 3 | 4 |
| k | −4.977113E+01 | −6.567919E+00 | −8.999999E+01 | −2.861315E+01 |
| A4 | −1.678318E−01 | 1.036535E+00 | 1.360925E+00 | 1.245348E+01 |
| A6 | 2.417070E+00 | −2.106796E+00 | 5.693199E+00 | −3.040975E+02 |
| A8 | −7.646294E+00 | 2.511739E+00 | −7.236362E+01 | 6.341631E+03 |
| A10 | 1.150067E+01 | −3.937516E+00 | 3.528179E+02 | −8.526836E+04 |
| A12 | −9.419136E+00 | 6.785445E+00 | −6.666468E+02 | 7.027732E+05 |
| A14 | 4.110164E+00 | −6.359719E+00 | 1.177212E+01 | −3.182538E+06 |
| A16 | −7.478021E−01 | 2.319654E+00 | 1.223794E+03 | 6.138992E+06 |
| A18 | 0.000000E+00 | 0.000000E+00 | 0.000000E+00 | 0.000000E+00 |

| | Surface No. | | | |
|---|---|---|---|---|
| | 6 | 7 | 8 | 9 |
| k | −8.152817E+01 | −1.816395E+01 | −4.467561E+00 | −3.994209E−03 |
| A4 | 1.198155E+00 | −1.252057E+01 | −1.191745E+01 | −4.837410E+00 |
| A6 | 1.977210E+01 | 2.277544E+02 | 2.130459E+02 | 3.296242E+01 |
| A8 | −1.179030E+03 | −2.576487E+03 | −2.121596E+03 | −1.300114E+02 |
| A10 | 2.024273E+04 | 1.661361E+04 | 1.148748E+04 | 3.093259E+02 |
| A12 | −1.781960E+05 | −6.139831E+04 | −3.489714E+04 | −6.869086E+02 |
| A14 | 7.913767E+05 | 1.181457E+05 | 5.944278E+04 | 1.739283E+03 |
| A16 | −1.391543E+06 | −8.468796E+04 | −4.708726E+04 | −2.207115E+03 |
| A18 | 0.000000E+00 | 0.000000E+00 | 0.000000E+00 | 0.000000E+00 |

TABLE 6-continued

Aspheric Coefficients of the third embodiment
Table 6: Aspheric Coefficients of the third embodiment

| | Surface No. | | | |
|---|---|---|---|---|
| | 10 | 11 | 12 | 13 |
| k | −7.657432E+01 | −2.525005E+00 | −7.925748E+00 | −1.070967E+00 |
| A4 | −2.077259E+00 | −2.061383E+00 | 2.007289E+00 | 6.011291E−02 |
| A6 | −1.509801E+01 | 2.096091E+01 | −3.127256E+01 | 6.000253E−03 |
| A8 | 3.364584E+02 | −1.525468E+02 | 2.327985E+02 | 4.094310E−04 |
| A10 | −1.814220E+03 | 7.388767E+02 | −1.145201E+03 | 0.000000E+00 |
| A12 | 4.513449E+03 | −1.778585E+03 | 3.612383E+03 | 0.000000E+00 |
| A14 | −5.124662E+03 | 1.900441E+03 | −6.953666E+03 | 0.000000E+00 |
| A16 | 1.777545E+03 | −6.730478E+02 | 7.193443E+03 | 0.000000E+00 |
| A18 | 0.000000E+00 | 0.000000E+00 | −2.944863E+03 | 0.000000E+00 |

In the third embodiment, the presentation of the aspheric surface formula is similar to that in the first embodiment. Furthermore, the definitions of parameters in following tables are equal to those in the first embodiment, so the repetitious details will not be given here.

The following content may be deduced from Table 5 and Table 6.

| The third embodiment (Primary reference wavelength: 555 nm) | | | | | |
|---|---|---|---|---|---|
| |f/f1| | |f/f2| | |f/f3| | |f/f4| | |f/f5| | |f/f6| |
| 0.61226 | 1.00638 | 0.83012 | 0.23513 | 0.65119 | 0.00971 |
| ΣPPR | ΣNPR | |ΣNPR| | IN12/f | IN56/f | ΣPPR/|ΣNPR| TP4/(IN34 + TP4 + IN45) |
| 2.32871 | 1.01609 | 2.29183 | 0.05407 | 0.01966 | 0.75892 |
| |f1/f2| | |f2/f3| | | | (TP1 + IN12)/TP2 | (TP6 + IN56)/TP5 |
| 1.64372 | 0.82486 | | 1.59038 | | 0.58608 |
| HOS | InTL | HOS/HOI | InS/HOS | ODT % | TDT % |
| 2.65000 | 1.91026 | 2.65000 | 0.74169 | 2.03494 | 4.03482 |
| HVT51 | HVT52 | HVT61 | HVT62 | HVT62/HOI | HVT62/HOS |
| 0.434142 | 0 | 0.51989 | 0.61229 | 0.61229 | 0.23105 |
| HVT21 | HVT22 | HVT31 | HVT32 | HVT41 | HVT42 |
| 0.000 | 0.000 | 0.000 | 0.000 | 0.000 | 0.033 |
| TP2/TP3 | TP3/TP4 | InRS61 | InRS62 | |InRS61|/TP6 | |InRS62|/TP6 |
| 0.45707 | 2.20107 | 0.07165 | 0.13796 | 0.38731 | 0.74571 |
| PLTA | PSTA | NLTA | NSTA | SLTA | SSTA |
| −0.013 mm | 0.001 mm | 0.005 mm | 0.002 mm | −0.001 mm | 0.006 mm |
| IN12 + IN23 | IN34 + IN45 | IN12 | IN23 | IN34 | IN45 |
| 0.277 | 0.059 | 0.055 | 0.222 | 0.022 | 0.037 |
| PhiA11 | PhiA12 | PhiA6 | PhiB | PhiC | PhiD |
| 1.868 mm | 1.7 mm | 1.5 mm | 1.515 mm | 1.715 mm | 1.915 mm |
| PhiA6/InTL | PhiA6/2HOI | PhiA11/2HOI | SFR (PhiA11/PhiA6) | | |
| 0.7852 | 0.750 | 0.934 | 1.2453 | | |

The values associated with outline curve length may be deduced from Table 5 and Table 6.

| The third embodiment (Primary reference wavelength: 555 nm) | | | | | |
|---|---|---|---|---|---|
| ARE | 1/2(HEP) | ARE value | ARE − 1/2(HEP) | 2(ARE/HEP)% | TP | ARE/TP(%) |
| 11 | 0.357 | 0.356 | −0.00048 | 99.86% | 0.241 | 147.90% |
| 12 | 0.357 | 0.360 | 0.00290 | 100.81% | 0.241 | 149.30% |
| 21 | 0.357 | 0.358 | 0.00085 | 100.24% | 0.186 | 192.23% |
| 22 | 0.357 | 0.389 | 0.03189 | 108.93% | 0.186 | 208.90% |
| 31 | 0.357 | 0.357 | 0.00042 | 100.12% | 0.407 | 87.76% |
| 32 | 0.357 | 0.375 | 0.01800 | 105.04% | 0.407 | 92.07% |
| 41 | 0.357 | 0.365 | 0.00844 | 102.37% | 0.185 | 197.49% |
| 42 | 0.357 | 0.359 | 0.00215 | 100.60% | 0.185 | 194.09% |
| 51 | 0.357 | 0.360 | 0.00321 | 100.90% | 0.350 | 102.96% |
| 52 | 0.357 | 0.377 | 0.02042 | 105.72% | 0.350 | 107.88% |
| 61 | 0.357 | 0.368 | 0.01078 | 103.02% | 0.185 | 198.76% |
| 62 | 0.357 | 0.395 | 0.03849 | 110.78% | 0.185 | 213.73% |

| ARS | EHD | ARS value | ARS − EHD | (ARS/EHD)% | TP | ARS/TP(%) |
|---|---|---|---|---|---|---|
| 11 | 0.934 | 0.934 | 0.00058 | 100.06% | 0.241 | 387.62% |
| 12 | 0.850 | 0.855 | 0.00547 | 100.64% | 0.241 | 354.96% |
| 21 | 0.570 | 0.634 | 0.06331 | 111.10% | 0.186 | 340.40% |
| 22 | 0.379 | 0.430 | 0.05153 | 113.61% | 0.186 | 231.14% |
| 31 | 0.378 | 0.379 | 0.00130 | 100.34% | 0.407 | 93.16% |
| 32 | 0.453 | 0.503 | 0.05000 | 111.05% | 0.407 | 123.45% |
| 41 | 0.463 | 0.486 | 0.02320 | 105.01% | 0.185 | 262.97% |
| 42 | 0.515 | 0.528 | 0.01342 | 102.61% | 0.185 | 285.63% |
| 51 | 0.551 | 0.557 | 0.00608 | 101.10% | 0.350 | 159.26% |
| 52 | 0.581 | 0.620 | 0.03910 | 106.73% | 0.350 | 177.38% |
| 61 | 0.641 | 0.666 | 0.02559 | 103.99% | 0.185 | 360.24% |
| 62 | 0.750 | 1.044 | 0.29390 | 139.16% | 0.185 | 564.50% |

The following content may be deduced from Table 5 and Table 6.

| Value associated with inflection point of the third embodiment (Primary reference wavelength: 555 nm) | | | | | | |
|---|---|---|---|---|---|---|
| HIF111 | 0.3105 | HIF111/HOI | 0.3105 | SGI111 | −0.0127 | \| SGI111 \|/(\| SGI111 \| + TP1) | 0.0500 |
| HIF112 | 0.5928 | HIF112/HOI | 0.5928 | SGI112 | −0.0256 | \| SGI112 \|/(\| SGI112 \| + TP1) | 0.0959 |
| HIF113 | 0.8378 | HIF113/HOI | 0.8378 | SGI113 | −0.0371 | \| SGI113 \|/(\| SGI113 \| + TP1) | 0.1335 |
| HIF121 | 0.2673 | HIF121/HOI | 0.2673 | SGI121 | −0.0324 | \| SGI121 \|/(\| SGI121 \| + TP1) | 0.1185 |
| HIF122 | 0.6273 | HIF122/HOI | 0.6273 | SGI122 | −0.0803 | \| SGI122 \|/(\| SGI122 \| + TP1) | 0.2498 |
| HIF123 | 0.7100 | HIF123/HOI | 0.7100 | SGI123 | −0.0875 | \| SGI123 \|/(\| SGI123 \| + TP1) | 0.2663 |

-continued

Value associated with inflection point of the third embodiment
(Primary reference wavelength: 555 nm)

| | | | | | | | |
|---|---|---|---|---|---|---|---|
| HIF311 | 0.2376 | HIF311/HOI | 0.2376 | SGI311 | 0.0174 | \| SGI311 \|/ (\| SGI311 \| + TP3) | 0.0410 |
| HIF411 | 0.4058 | HIF411/HOI | 0.4058 | SGI411 | −0.0934 | \| SGI411 \|/ (\| SGI411 \| + TP4) | 0.3355 |
| HIF421 | 0.0191 | HIF421/HOI | 0.0191 | SGI421 | 0.0000 | \| SGI421 \|/ (\| SGI421 \| + TP4) | 0.0000 |
| HIF511 | 0.2966 | HIF511/HOI | 0.2966 | SGI511 | −0.0346 | \| SGI511 \|/ (\| SGI511 \| + TP5) | 0.0900 |
| HIF512 | 0.5400 | HIF512/HOI | 0.5400 | SGI512 | −0.0411 | \| SGI512 \|/ (\| SGI512 \| + TP5) | 0.1052 |
| HIF521 | 0.3760 | HIF521/HOI | 0.3760 | SGI521 | −0.1218 | \| SGI521 \|/ (\| SGI521 \| + TP5) | 0.2582 |
| HIF611 | 0.2802 | HIF611/HOI | 0.2802 | SGI611 | 0.0608 | \| SGI611 \|/ (\| SGI611 \| + TP6) | 0.2473 |
| HIF621 | 0.3004 | HIF621/HOI | 0.3004 | SGI621 | 0.0816 | \| SGI621 \|/ (\| SGI621 \| + TP6) | 0.3062 |

The Fourth Embodiment

Figure 4A:
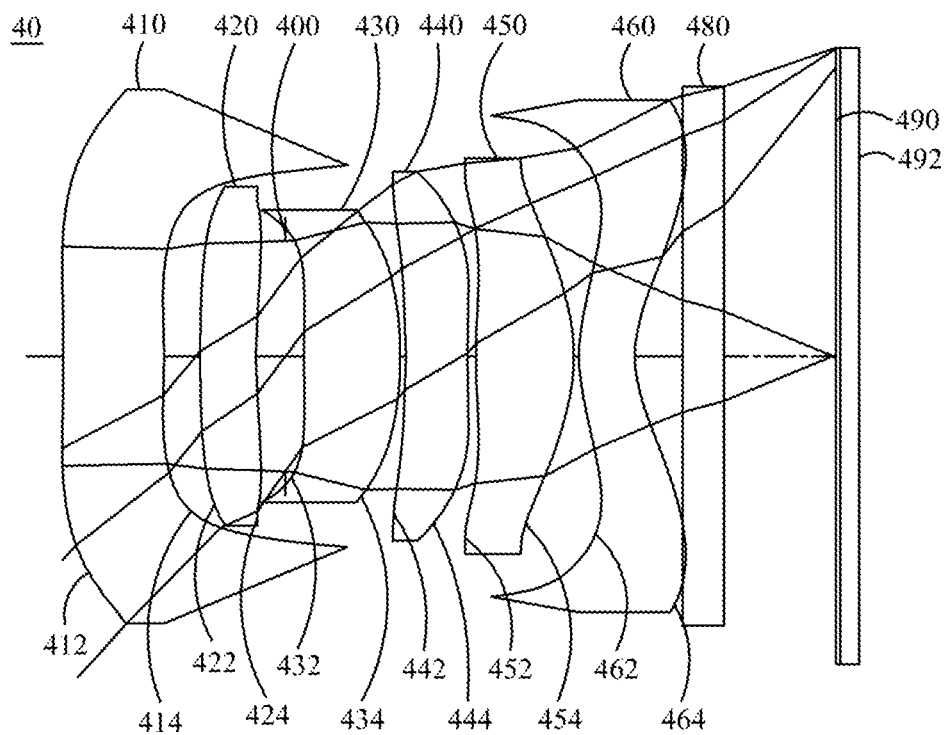
FIG. 4A is a schematic view of an optical image capturing system of a fourth embodiment of the present invention.
Figure 4B:
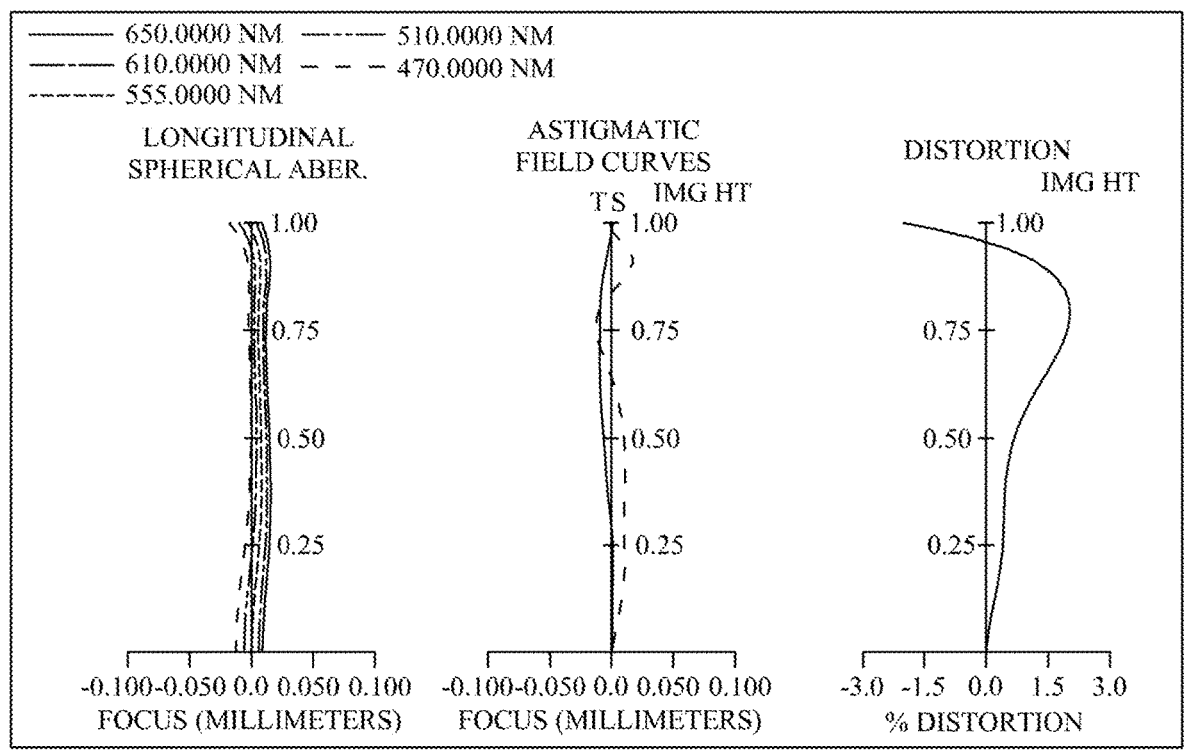
FIG. 4B shows curve diagrams of longitudinal spherical aberration, astigmatic field, and optical distortion of the optical image capturing system in the order from left to right of the fourth embodiment of the present invention.
Figure 4C:
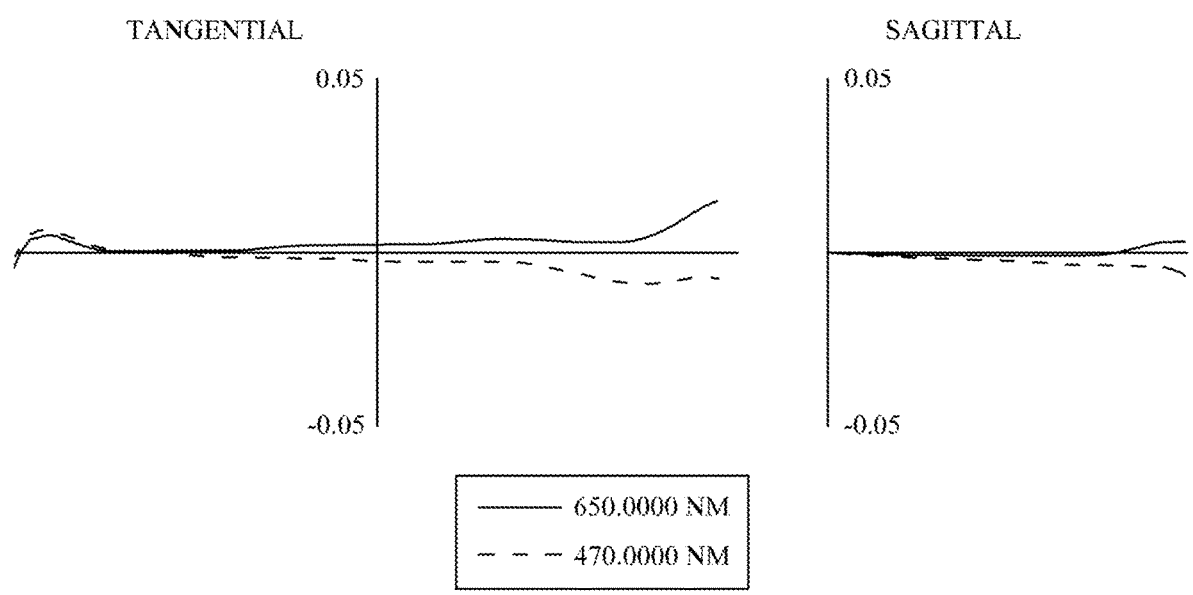
FIG. 4C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the fourth embodiment of the present invention.

Please refer to FIGS. 4A, 4B and 4C. FIG. 4A is a schematic view of an optical image capturing system of a fourth embodiment of the present invention. FIG. 4B shows curve diagrams of longitudinal spherical aberration, astigmatic field, and optical distortion of the optical image capturing system in the order from left to right of the fourth embodiment of the present invention. FIG. 4C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the fourth embodiment of the present invention. As shown in FIG. 4A, in order along an optical axis from an object side to an image side, the optical image capturing system comprises a first lens element 410, a second lens element 420, an aperture stop 400, a third lens element 430, a fourth lens element 440, a fifth lens element 450, a sixth lens element 460, an IR-bandstop Filter 480, an image plane 490 and an image-sensing device 492.

The first lens element 410 has positive refractive power and is made of a plastic material, and has a concave object-side surface 412 and a convex image-side surface 414, and both of the object-side surface 412 and the image-side surface 414 are aspheric. The object-side surface 412 has two inflection points and the image-side surface 414 has an inflection point.

The second lens element 420 has negative refractive power and is made of a plastic material, has a convex object-side surface 422 and a concave image-side surface 424, and both of the object-side surface 422 and the image-side surface 424 are aspheric. Each of the object-side surface 422 and the image-side surface 424 has an inflection point.

The third lens element 430 has positive refractive power and is made of a plastic material, and has convex object-side surface 432 and a convex image-side surface 434, and both of the object-side surface 432 and the image-side surface 434 are aspheric. The object-side surface 432 has an inflection point.

The fourth lens element 440 has negative refractive power and is made of a plastic material, and has a concave object-side surface 442 and a concave image-side surface 444, and both of the object-side surface 442 and the image-side surface 444 are aspheric. The object-side surface 442 has three inflection points and the image-side surface 414 has an inflection point.

The fifth lens element 450 has positive refractive power and is made of a plastic material, has a convex object-side surface 452 and a convex image-side surface 454, and both of the object-side surface 452 and the image-side surface 454 are aspheric. The object-side surface 452 has two inflection points and the image-side surface 454 has an inflection point.

The sixth lens element 460 has negative refractive power and is made of a plastic material, has a convex object-side surface 462 and a concave image-side surface 464, and both of the object-side surface 462 and the image-side surface 464 are aspheric. With this configuration, the back focal length can be shortened to maintain the characteristics of small size. Furthermore, each of the object-side surface 462 and the image-side surface 464 has an inflection point, so that the angle of incident with incoming light from an off-axis view field can be suppressed effectively and the aberration in the off-axis view field can be corrected.

The IR-bandstop Filter 480 is made of glass and disposed between the sixth lens element 460 and the image plane 490, and it does not affect the focal length of the optical image capturing system.

The parameters of the lens elements of the fourth embodiment are listed in Table 7 and Table 8.

TABLE 7

Lens Parameters for the Fourth Embodiment
f(focus length) = 1.017 mm; f/HEP = 1.4;
HAF(half angle of view) = 45.006 deg

| Surface No. | | Curvature Radius | Thickness (mm) | Material |
|---|---|---|---|---|
| 0 | Object | 1E+18 | 1E+18 | |
| 1 | First lens | −3.625044528 | 0.362 | Plastic |
| 2 | | −2.718860066 | 0.130 | |
| 3 | Second lens | 134.430314 | 0.200 | Plastic |
| 4 | | 2.351658337 | 0.104 | |
| 5 | Aperture stop | 1E+18 | 0.067 | |
| 6 | Third lens | 4.785114474 | 0.345 | Plastic |
| 7 | | −0.966283592 | 0.020 | |
| 8 | Fourth lens | −1.907858536 | 0.221 | Plastic |
| 9 | | 2.98528572 | 0.031 | |
| 10 | Fifth lens | 3.010323546 | 0.350 | Plastic |
| 11 | | −0.605423735 | 0.020 | |
| 12 | Sixth lens | 0.602377291 | 0.200 | Plastic |

TABLE 7-continued

Lens Parameters for the Fourth Embodiment
f(focus length) = 1.017 mm; f/HEP = 1.4;
HAF(half angle of view) = 45.006 deg

| | | | | |
|---|---|---|---|---|
| 13 | | 0.377208633 | 0.170 | |
| 14 | IR-bandstop Filter | 1E+18 | 0.150 | BK_7 |
| 15 | | 1E+18 | 0.395 | |
| 16 | Image plate | 1E+18 | 0.005 | |

| Surface No. | Refractive Index | Coefficient of Dispersion | Focus length |
|---|---|---|---|
| 0 | | | |
| 1 | 1.661 | 20.381 | 14.066 |
| 2 | | | |
| 3 | 1.515 | 56.524 | −4.639 |
| 4 | | | |
| 5 | | | |
| 6 | 1.544 | 55.938 | 1.505 |
| 7 | | | |
| 8 | 1.515 | 56.524 | −2.220 |
| 9 | | | |
| 10 | 1.544 | 55.938 | 0.956 |
| 11 | | | |
| 12 | 1.661 | 20.381 | −2.348 |
| 13 | | | |
| 14 | 1.517 | 64.13 | |
| 15 | | | |
| 16 | | | |

Reference wavelength = 555 nm; shield position: the clear aperture of the ninth surface is 0.600 mm

TABLE 8

Aspheric Coefficients of the fourth embodiment
Table 8: Aspheric Coefficients of the fourth embodiment

| | Surface No. | | | |
|---|---|---|---|---|
| | 1 | 2 | 3 | 4 |
| k | −8.995291E+01 | −3.526302E+01 | −8.996924E+01 | −2.770009E+01 |
| A4 | 8.197867E−01 | 2.568078E+00 | 2.410564E+00 | 3.912478E−01 |
| A6 | −1.320924E+00 | −7.816481E+00 | −1.851310E+01 | −1.113121E+01 |
| A8 | 3.468328E+00 | 4.237641E+01 | 1.063917E+02 | 5.000711E+01 |
| A10 | −7.219342E+00 | −1.557546E+02 | −4.531759E+02 | −1.712927E+01 |
| A12 | 9.188553E+00 | 4.638692E+02 | 1.316128E+03 | −5.671244E+02 |
| A14 | −4.788620E+00 | −1.171796E+03 | −1.607631E+03 | 1.178987E+03 |
| A16 | 0.000000E+00 | 2.301784E+03 | 0.000000E+00 | 0.000000E+00 |
| A18 | 0.000000E+00 | 0.000000E+00 | 0.000000E+00 | 0.000000E+00 |

| | Surface No. | | | |
|---|---|---|---|---|
| | 6 | 7 | 8 | 9 |
| k | −8.992203E+01 | −1.922929E+01 | 5.150714E+00 | −7.983493E+01 |
| A4 | −1.167987E+00 | 6.157493E−01 | 4.170307E+00 | −5.684710E−01 |
| A6 | −6.150285E+00 | −4.017951E+01 | −5.964905E+01 | −2.079934E+01 |
| A8 | −1.430469E+01 | 2.632315E+02 | 3.922115E+02 | 1.064761E+02 |
| A10 | 0.000000E+00 | −7.816862E+02 | −1.278602E+03 | −2.068066E+02 |
| A12 | 0.000000E+00 | 9.131473E+02 | 2.048323E+03 | 1.069396E+02 |
| A14 | 0.000000E+00 | 0.000000E+00 | −1.285256E+03 | 6.796981E+01 |
| A16 | 0.000000E+00 | 0.000000E+00 | 0.000000E+00 | 0.000000E+00 |
| A18 | 0.000000E+00 | 0.000000E+00 | 0.000000E+00 | 0.000000E+00 |

| | Surface No. | | | |
|---|---|---|---|---|
| | 10 | 11 | 12 | 13 |
| k | 9.951116E+00 | −3.302455E+00 | −7.212155E+00 | −1.741467E+00 |
| A4 | 6.309831E−01 | 2.505403E−01 | 8.224832E−01 | −3.791986E+00 |
| A6 | −2.668438E+01 | −4.202638E+00 | −2.554004E+01 | 1.808468E+01 |
| A8 | 1.502083E+02 | 3.698104E+01 | 2.113530E+02 | −6.379416E+01 |
| A10 | −4.134883E+02 | −1.606155E+02 | −1.072030E+03 | 1.446105E+02 |
| A12 | 6.127097E+02 | 3.476316E+02 | 3.344795E+03 | −1.994023E+02 |
| A14 | −3.852027E+02 | −2.793116E+02 | −6.307215E+03 | 1.508503E+02 |
| A16 | 0.000000E+00 | 0.000000E+00 | 6.602534E+03 | −4.791298E+01 |
| A18 | 0.000000E+00 | 0.000000E+00 | −2.944863E+03 | 0.000000E+00 |

In the fourth embodiment, the presentation of the aspheric surface formula is similar to that in the first embodiment. Furthermore, the definitions of parameters in following tables are equal to those in the first embodiment, so the repetitious details will not be given here.

The following content may be deduced from Table 7 and Table 8.

| The fourth embodiment (Primary reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.07233 | 0.21933 | 0.67606 | 0.45821 | 1.06399 | 0.43340 |
| ΣPPR | ΣNPR | \|ΣNPR\|/ΣPPR | IN12/f | IN56/f | TP4/(IN34 + TP4 + IN45) |
| 2.27059 | 0.65274 | 3.47857 | 0.12791 | 0.01966 | 0.81234 |
| \|f1/f2\| | \|f2/f3\| | (TP1 + IN12)/TP2 | | (TP6 + IN56)/TP5 | |
| 3.03234 | 3.08233 | 2.45851 | | 0.62857 | |
| HOS | InTL | HOS/HOI | InS/HOS | ODT % | TDT % |
| 2.76997 | 2.05033 | 2.76997 | 0.71258 | 2.03974 | 4.05132 |
| HVT51 | HVT52 | HVT61 | HVT62 | HVT62/HOI | HVT62/HOS |
| 0.28162 | 0.6322 | 0.46499 | 0.64675 | 0.64675 | 0.23349 |
| HVT21 | HVT22 | HVT31 | HVT32 | HVT41 | HVT42 |
| 0.000 | 0.384 | 0.181 | 0.000 | 0.000 | 0.212 |
| TP2/TP3 | TP3/TP4 | InRS61 | InRS62 | \|InRS61\|/TP6 | \|InRS62\|/TP6 |
| 0.57928 | 1.56056 | −0.01257 | 0.12468 | 0.06284 | 0.62342 |
| PLTA | PSTA | NLTA | NSTA | SLTA | SSTA |
| −0.007 mm | 0.015 mm | −0.001 mm | −0.004 mm | −0.008 mm | 0.003 mm |
| IN12 + IN23 | IN34 + IN45 | IN12 | IN23 | IN34 | IN45 |
| 0.301 | 0.051 | 0.130 | 0.171 | 0.020 | 0.031 |
| PhiA11 | PhiA12 | PhiA6 | PhiB | PhiC | PhiD |
| 1.738 mm | 1.114 mm | 1.666 mm | 1.681 mm | 1.881 mm | 2.081 mm |
| PhiA6/InTL | PhiA6/2HOI | PhiA11/2HOI | | SFR (PhiA11/PhiA6) | |
| 0.8125 | 0.833 | 0.869 | | 1.0432 | |

The values associated with outline curve length may be deduced from Table 7 and Table 8.

| The fourth embodiment (Primary reference wavelength: 555 nm) | | | | | | |
|---|---|---|---|---|---|---|
| ARE | 1/2(HEP) | ARE value | ARE − 1/2(HEP) | 2(ARE/HEP)% | TP | ARE/TP(%) |
| 11 | 0.357 | 0.356 | −0.00091 | 99.74% | 0.362 | 98.48% |
| 12 | 0.357 | 0.357 | 0.00016 | 100.04% | 0.362 | 98.78% |
| 21 | 0.357 | 0.357 | −0.00009 | 99.97% | 0.200 | 178.45% |
| 22 | 0.357 | 0.357 | −0.00045 | 99.87% | 0.200 | 178.27% |
| 31 | 0.357 | 0.359 | 0.00208 | 100.58% | 0.345 | 104.00% |
| 32 | 0.357 | 0.367 | 0.00951 | 102.66% | 0.345 | 106.15% |
| 41 | 0.357 | 0.357 | −0.00001 | 100.00% | 0.221 | 161.35% |
| 42 | 0.357 | 0.358 | 0.00060 | 100.17% | 0.221 | 161.63% |
| 51 | 0.357 | 0.356 | −0.00069 | 99.81% | 0.350 | 101.80% |
| 52 | 0.357 | 0.369 | 0.01243 | 103.48% | 0.350 | 105.55% |
| 61 | 0.357 | 0.363 | 0.00630 | 101.77% | 0.200 | 181.65% |
| 62 | 0.357 | 0.375 | 0.01828 | 105.12% | 0.200 | 187.64% |
| ARS | EHD | ARS value | ARS − EHD | (ARS/EHD)% | TP | ARS/TP(%) |
| 11 | 0.869 | 0.935 | 0.06565 | 107.55% | 0.362 | 258.63% |
| 12 | 0.557 | 0.649 | 0.09161 | 116.44% | 0.362 | 179.44% |
| 21 | 0.552 | 0.566 | 0.01437 | 102.60% | 0.200 | 283.09% |
| 22 | 0.505 | 0.507 | 0.00154 | 100.30% | 0.200 | 253.40% |
| 31 | 0.388 | 0.396 | 0.00750 | 101.93% | 0.345 | 114.62% |
| 32 | 0.503 | 0.550 | 0.04655 | 109.25% | 0.345 | 159.17% |
| 41 | 0.571 | 0.574 | 0.00240 | 100.42% | 0.221 | 259.23% |
| 42 | 0.600 | 0.656 | 0.05619 | 109.37% | 0.221 | 296.60% |
| 51 | 0.628 | 0.632 | 0.00400 | 100.64% | 0.350 | 180.54% |
| 52 | 0.645 | 0.678 | 0.03288 | 105.10% | 0.350 | 193.59% |
| 61 | 0.677 | 0.710 | 0.03365 | 104.97% | 0.200 | 355.11% |
| 62 | 0.833 | 0.875 | 0.04163 | 105.00% | 0.200 | 437.47% |

The following content may be deduced from Table 7 and Table 8.

| Value associated with inflection point of the fourth embodiment (Primary reference wavelength: 555 nm) | | | | | | |
|---|---|---|---|---|---|---|
| HIF111 | 0.1563 | HIF111/HOI | 0.1563 | SGI111 | −0.0028 | \| SGI111 \|/(\| SGI111 \| + TP1) 0.0076 |
| HIF112 | 0.8313 | HIF112/HOI | 0.8313 | SGI112 | 0.1928 | \| SGI112 \|/(\| SGI112 \| + TP1) 0.3478 |
| HIF121 | 0.1094 | HIF121/HOI | 0.1094 | SGI121 | −0.0018 | \| SGI121 \|/(\| SGI121 \| + TP1) 0.0050 |
| HIF211 | 0.5417 | HIF211/HOI | 0.5417 | SGI211 | 0.0828 | \| SGI211 \|/(\| SGI211 \| + TP2) 0.2928 |
| HIF221 | 0.2286 | HIF221/HOI | 0.2286 | SGI221 | 0.0103 | \| SGI221 \|/(\| SGI221 \| + TP2) 0.0491 |
| HIF311 | 0.1093 | HIF311/HOI | 0.1093 | SGI311 | 0.0011 | \| SGI311 \|/(\| SGI311 \| + TP3) 0.0031 |
| HIF411 | 0.3750 | HIF411/HOI | 0.3750 | SGI411 | −0.0252 | \| SGI411 \|/(\| SGI411 \| + TP4) 0.1024 |
| HIF412 | 0.5064 | HIF412/HOI | 0.5064 | SGI412 | −0.0414 | \| SGI412 \|/(\| SGI412 \| + TP4) 0.1575 |
| HIF413 | 0.5563 | HIF413/HOI | 0.5563 | SGI413 | −0.0464 | \| SGI413 \|/(\| SGI413 \| + TP4) 0.1734 |
| HIF421 | 0.1308 | HIF421/HOI | 0.1308 | SGI421 | 0.0025 | \| SGI421 \|/(\| SGI421 \| + TP4) 0.0112 |
| HIF511 | 0.1807 | HIF511/HOI | 0.1807 | SGI511 | 0.0054 | \| SGI511 \|/(\| SGI511 \| + TP5) 0.0151 |
| HIF512 | 0.4869 | HIF512/HOI | 0.4869 | SGI512 | −0.0200 | \| SGI512 \|/(\| SGI512 \| + TP5) 0.0540 |
| HIF521 | 0.4535 | HIF521/HOI | 0.4535 | SGI521 | −0.1321 | \| SGI521 \|/(\| SGI521 \| + TP5) 0.2739 |
| HIF611 | 0.2458 | HIF611/HOI | 0.2458 | SGI611 | 0.0408 | \| SGI611 \|/(\| SGI611 \| + TP6) 0.1695 |
| HIF621 | 0.2864 | HIF621/HOI | 0.2864 | SGI621 | 0.0811 | \| SGI621 \|/(\| SGI621 \| + TP6) 0.2886 |

The Fifth Embodiment

Figure 5A:
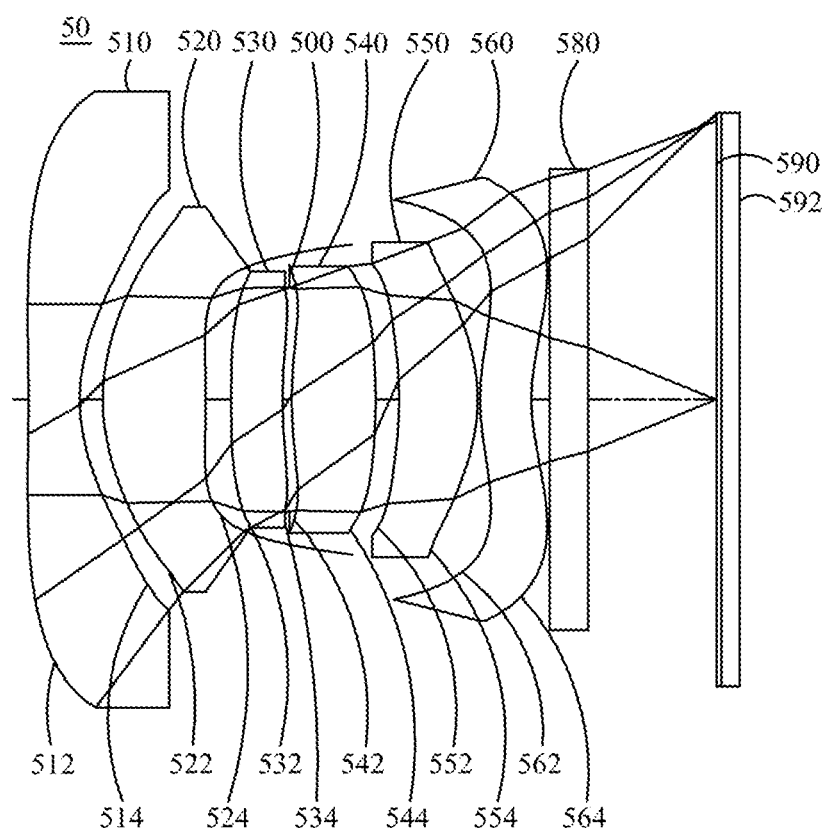
FIG. 5A is a schematic view of an optical image capturing system of a fifth embodiment of the present invention.
Figure 5B:
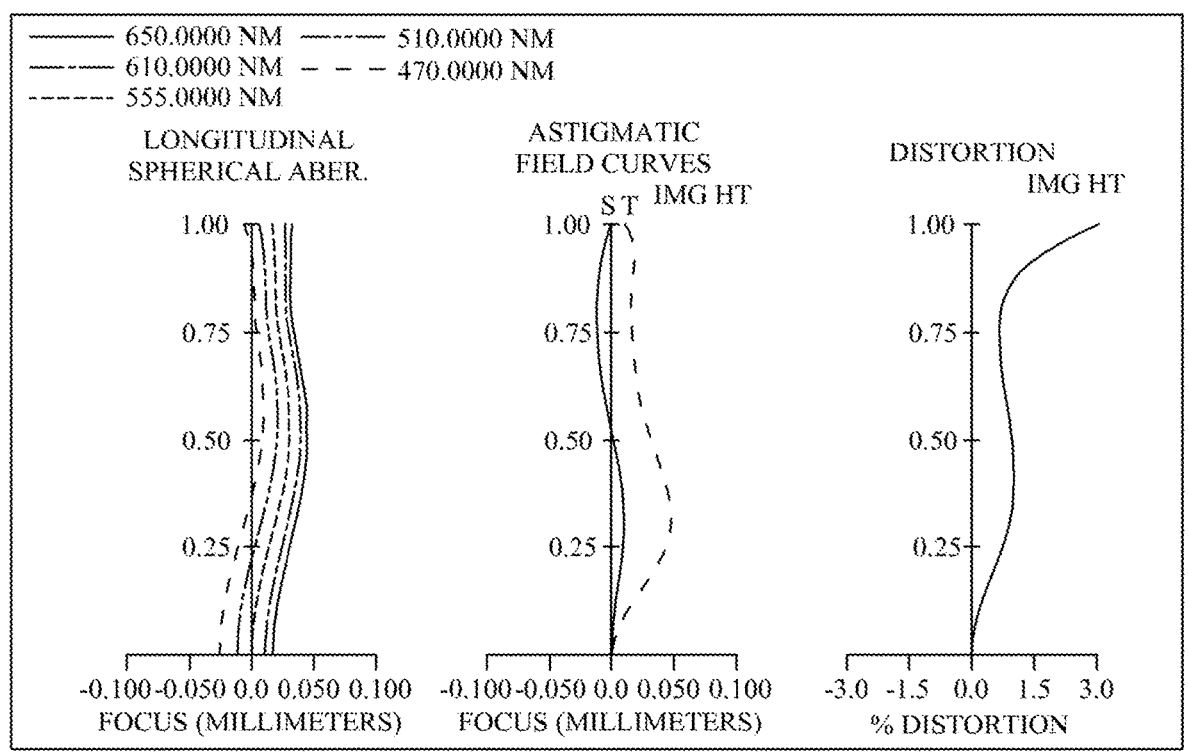
FIG. 5B shows curve diagrams of longitudinal spherical aberration, astigmatic field, and optical distortion of the optical image capturing system in the order from left to right of the fifth embodiment of the present invention.
Figure 5C:
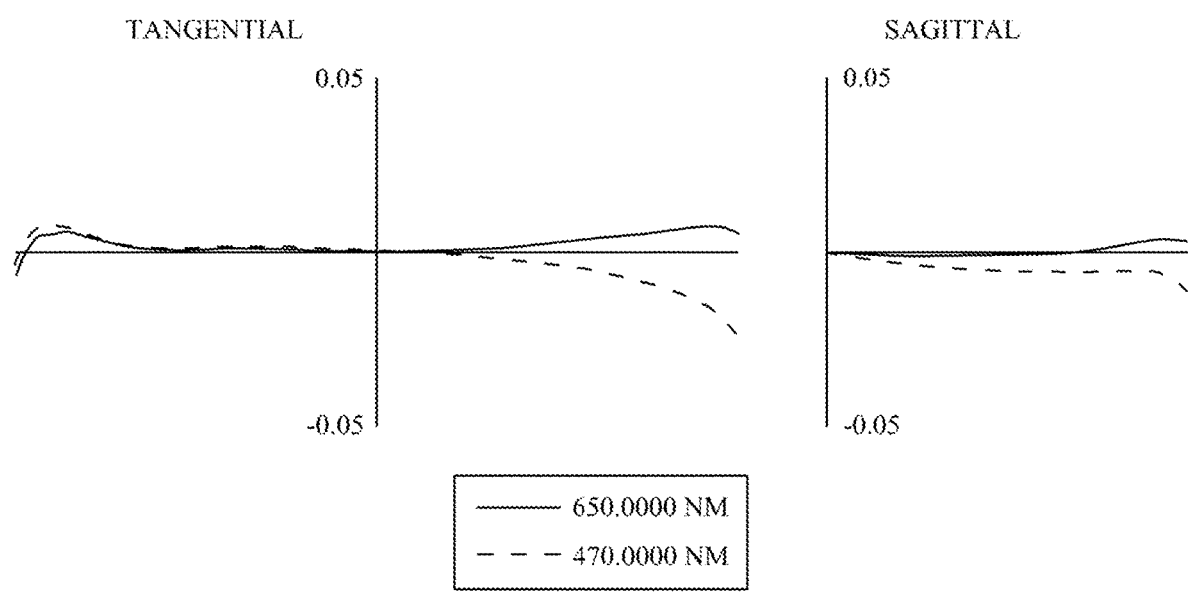
FIG. 5C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the fifth embodiment of the present invention.

Please refer to FIGS. 5A, 5B and 5C. FIG. 5A is a schematic view of an optical image capturing system of a fifth embodiment of the present invention. FIG. 5B shows curve diagrams of longitudinal spherical aberration, astigmatic field, and optical distortion of the optical image capturing system in the order from left to right of the fifth embodiment of the present invention. FIG. 5C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the fourth embodiment of the present invention. As shown in FIG. 5A, in order along an optical axis from an object side to an image side, the optical image capturing system comprises a first lens element 510, a second lens element 520, a third lens element 530, an aperture stop 500, a fourth lens element 540, a fifth lens element 550, a sixth lens element 560, an IR-bandstop Filter 580, an image plane 590 and an image-sensing device 592.

The first lens element 510 has negative refractive power and is made of a plastic material, and has a concave object-side surface 512 and a concave image-side surface 514, and both of the object-side surface 512 and the image-side surface 514 are aspheric. The object-side surface 512 has an inflection point.

The second lens element 520 has positive refractive power and is made of a plastic material, has a convex object-side surface 522 and a concave image-side surface 524, and both of the object-side surface 522 and the image-side surface 524 are aspheric. Each of the object-side surface 522 and the image-side surface 524 has an inflection point.

The third lens element 530 has negative refractive power and is made of a plastic material, has a convex object-side surface 532 and a concave image-side surface 534, and both of the object-side surface 532 and the image-side surface 534 are aspheric. The image-side surface 534 has an inflection point.

The fourth lens element 540 has positive refractive power and is made of a plastic material, and has a convex object-side surface 542 and a convex image-side surface 544, and both of the object-side surface 542 and the image-side surface 544 are aspheric. The object-side surface 542 has an inflection point.

The fifth lens element 550 has positive refractive power and is made of a plastic material, and has a concave object-side surface 552 and a convex image-side surface 554, and both of the object-side surface 552 and the image-side surface 554 are aspheric. The image-side surface 554 has an inflection point.

The sixth lens element 560 has negative refractive power and is made of a plastic material, has a convex object-side surface 562 and a concave image-side surface 564, and both of the object-side surface 562 and the image-side surface 564 are aspheric. With this configuration, the back focal length can be shortened to maintain the characteristics of small size. Furthermore, each of the object-side surface 562 and the image-side surface 564 has an inflection point, so that the angle of incident with incoming light from an off-axis view field can be suppressed effectively and, and correct the off-axis view field aberration.

The IR-bandstop Filter 580 is made of glass and disposed between the sixth lens element 560 and the image plane 590, and it does not affect the focal length of the optical image capturing system.

The parameters of the lens elements of the fifth embodiment are listed in Table 9 and Table 10.

TABLE 9

Lens Parameters for the fifth Embodiment f(focus length) = 0.960 mm; f/HEP = 1.4;
HAF(half angle of view) = 45 deg

| Surface No. | | Curvature Radius | Thickness (mm) | Material |
|---|---|---|---|---|
| 0 | object | 1E+18 | 1E+18 | |
| 1 | first lens | −7.989454959 | 0.200 | Plastic |
| 2 | | 0.593976285 | 0.090 | |
| 3 | second lens | 0.640084603 | 0.399 | Plastic |
| 4 | | −4.132649636 | 0.101 | |
| 5 | third lens | 8.299654456 | 0.200 | Plastic |
| 6 | | 1.638902178 | 0.025 | |
| 7 | aperture stop | 1E+18 | 0.010 | |
| 8 | fourth lens | 1.376144554 | 0.327 | Plastic |
| 9 | | −1.616292278 | 0.091 | |
| 10 | fifth lens | −1.072884538 | 0.305 | Plastic |
| 11 | | −0.611079961 | 0.010 | |
| 12 | sixth lens | 0.789046714 | 0.200 | Plastic |
| 13 | | 0.672689503 | 0.071 | |
| 14 | IR-bandstop Filter | 1E+18 | 0.150 | BK_7 |
| 15 | | 1E+18 | 0.482 | |
| 16 | image plate | 1E+18 | 0.018 | |

| Surface No. | Refractive Index | Coefficient of Dispersion | Focus length |
|---|---|---|---|
| 0 | | | |
| 1 | 1.544 | 55.938 | −1.005 |
| 2 | | | |
| 3 | 1.584 | 29.878 | 0.974 |
| 4 | | | |
| 5 | 1.544 | 55.938 | −3.782 |
| 6 | | | |
| 7 | | | |
| 8 | 1.544 | 55.938 | 1.417 |
| 9 | | | |
| 10 | 1.544 | 55.938 | 2.109 |
| 11 | | | |
| 12 | 1.661 | 20.381 | −21.900 |
| 13 | | | |
| 14 | 1.517 | 64.13 | |
| 15 | | | |
| 16 | | | |

Reference wavelength = 555 nm; shield position: the clear aperture of the second surface is 0.740 mm; the clear aperture of the thirteenth surface is 0.780 mm

TABLE 10

Aspheric Coefficients
Table 10: Aspheric Coefficients

| | Surface No | | | |
|---|---|---|---|---|
| | 1 | 2 | 3 | 4 |
| k | 1.539415E+00 | −7.410275E−01 | −2.823332E−01 | −1.037773E+01 |
| A4 | 3.464255E−01 | −8.798470E−01 | −1.088592E+00 | 1.960048E+00 |

TABLE 10-continued

Aspheric Coefficients
Table 10: Aspheric Coefficients

| | | | | |
|---|---|---|---|---|
| A6 | −3.530986E−01 | 1.053553E+00 | 7.305237E−01 | 2.067445E+00 |
| A8 | 2.532080E−01 | −3.698164E+00 | 4.929539E+00 | −1.018669E+01 |
| A10 | 3.932359E−02 | 5.116612E+00 | −1.196981E+01 | 1.937507E+02 |
| A12 | −8.273924E−02 | −3.776401E−03 | 4.916071E−06 | −1.196322E−09 |
| A14 | −2.988790E−02 | 1.120346E−06 | 4.222492E−08 | 6.754613E−08 |
| A16 | 4.592611E−02 | 3.112732E−07 | 6.197903E−08 | 3.706575E−06 |
| A18 | 0.000000E+00 | 0.000000E+00 | 0.000000E+00 | 0.000000E+00 |

| | Surface No. | | | |
|---|---|---|---|---|
| | 5 | 6 | 8 | 9 |
| k | 8.961631E+01 | 3.540613E+00 | −1.780304E+01 | −5.203743E+01 |
| A4 | 2.008111E+00 | −3.952721E−01 | 2.811343E−01 | −4.183688E−01 |
| A6 | −7.393846E+00 | −1.420559E+01 | −1.014129E+01 | 7.138832E−01 |
| A8 | 4.384359E+01 | 4.236166E+01 | −4.102864E+00 | −5.646386E+01 |
| A10 | −9.876909E+01 | −3.389526E+01 | 6.785009E+01 | 1.523894E+02 |
| A12 | −1.395557E−09 | −8.473100E−02 | −3.361810E−01 | −8.943685E−08 |
| A14 | 8.021138E−07 | 8.200171E−07 | 7.880327E−08 | 3.895432E−07 |
| A16 | 2.050991E−06 | 2.638084E−06 | −3.998272E−07 | 2.145229E−05 |
| A18 | 0.000000E+00 | 0.000000E+00 | 0.000000E+00 | 0.000000E+00 |

| | Surface No. | | | |
|---|---|---|---|---|
| | 10 | 11 | 12 | 13 |
| k | −1.305945E+01 | −8.830356E−01 | −1.241568E+01 | −6.333512E+00 |
| A4 | 1.380535E+00 | 2.246278E−01 | −8.687447E−01 | −1.285787E+00 |
| A6 | −7.508992E+00 | 5.296272E+00 | −1.400701E+00 | 1.421114E+00 |
| A8 | −1.196673E+01 | −2.435680E+01 | 3.804008E−01 | −2.454796E+00 |
| A10 | 3.454552E+01 | 3.906452E+01 | 6.175762E+00 | 9.320276E−01 |
| A12 | −1.245373E−07 | −1.725054E−07 | −2.768799E+01 | 2.318191E+00 |
| A14 | 1.137649E−06 | 1.010185E−07 | 3.090607E+01 | −3.753056E+00 |
| A16 | 2.599693E−06 | −4.072616E−05 | −3.438554E+01 | −5.141225E−03 |
| A18 | 0.000000E+00 | 0.000000E+00 | 0.000000E+00 | 0.000000E+00 |

In the fifth embodiment, the presentation of the aspheric surface formula is similar to that in the first embodiment. furthermore, the definitions of parameters in following tables are equal to those in the first embodiment, so the repetitious details will not be given here.

The following contents may be deduced from Table 9 and Table 10.

The fifth embodiment (Primary reference wavelength: 555 nm)

| |f/f1| | |f/f2| | |f/f3| | |f/f4| | |f/f5| | |f/f6| |
|---|---|---|---|---|---|
| 0.95567 | 0.98622 | 0.25390 | 0.67780 | 0.45529 | 0.04384 |
| ΣPPR | ΣNPR | ΣPPR/ |ΣNPR| | IN12/f | IN56/f | TP4/(IN34 + TP4 + IN45) |
| 2.08875 | 1.28396 | 1.62681 | 0.09332 | 0.01041 | 0.72133 |
| |f1/f2| | |f2/f3| | (TP1 + IN12)/TP2 | | (TP6 + IN56)/TP5 | |
| 1.03196 | 0.25744 | 0.72606 | | 0.68792 | |
| HOS | InTL | HOS/HOI | InS/HOS | ODT % | TDT % |
| 2.68000 | 1.95899 | 2.68000 | 0.62125 | 3.01613 | 2.36215 |
| HVT51 | HVT52 | HVT61 | HVT62 | HVT62/HOI | HVT62/HOS |
| 0 | 0 | 0.38090 | 0.44437 | 0.44437 | 0.16581 |
| HVT21 | HVT22 | HVT31 | HVT32 | HVT41 | HVT42 |
| 0.000 | 0.171 | 0.000 | 0.310 | 0.326 | 0.000 |
| TP2/TP3 | TP3/TP4 | InRS61 | InRS62 | |InRS61|/TP6 | |InRS62|/TP6 |
| 1.99439 | 0.61072 | −0.06410 | −0.08278 | 0.32048 | 0.41390 |
| PLTA | PSTA | NLTA | NSTA | SLTA | SSTA |
| −0.023 mm | 0.005 mm | −0.003 mm | −0.007 mm | −0.011 mm | 0.003 mm |
| IN12 + IN23 | IN34 + IN45 | IN12 | IN23 | IN34 | IN45 |
| 0.191 | 0.126 | 0.090 | 0.101 | 0.035 | 0.091 |
| PhiA11 | PhiA12 | PhiA6 | PhiB | PhiC | PhiD |
| 2.170 mm | 1.480 mm | 1.560 mm | 1.575 mm | 1.775 mm | 1.975 mm |
| | | | | | SFR |

-continued

The fifth embodiment (Primary reference wavelength: 555 nm)

| PhiA6/InTL | PhiA6/2HOI | PhiA11/2HOI | (PhiA11/PhiA6) |
|---|---|---|---|
| 0.7963 | 0.780 | 1.085 | 1.3910 |

The values associated with outline curve length may be deduced from Table 9 and Table 10.

The fifth embodiment (Primary reference wavelength: 555 nm)

| | ARE | 1/2(HEP) | ARE value | ARE − 1/2(HEP) | 2(ARE/HEP)% | TP | ARE/TP (%) |
|---|---|---|---|---|---|---|---|
| 11 | 0.337 | 0.336 | −0.00089 | 99.73% | 0.200 | 168.01% |
| 12 | 0.337 | 0.350 | 0.01309 | 103.88% | 0.200 | 175.00% |
| 21 | 0.337 | 0.348 | 0.01129 | 103.35% | 0.399 | 87.29% |
| 22 | 0.337 | 0.338 | 0.00080 | 100.24% | 0.399 | 84.67% |
| 31 | 0.337 | 0.338 | 0.00119 | 100.35% | 0.200 | 169.05% |
| 32 | 0.337 | 0.337 | −0.00028 | 99.92% | 0.200 | 168.32% |
| 41 | 0.337 | 0.337 | 0.00015 | 100.04% | 0.327 | 102.93% |
| 42 | 0.337 | 0.339 | 0.00185 | 100.55% | 0.327 | 103.44% |
| 51 | 0.337 | 0.338 | 0.00158 | 100.47% | 0.305 | 110.88% |
| 52 | 0.337 | 0.350 | 0.01281 | 103.80% | 0.305 | 114.56% |
| 61 | 0.337 | 0.339 | 0.00168 | 100.50% | 0.200 | 169.29% |
| 62 | 0.337 | 0.341 | 0.00364 | 101.08% | 0.200 | 170.28% |

| | ARS | EHD | ARS value | ARS − EHD | (ARS/EHD)% | TP | ARS/TP (%) |
|---|---|---|---|---|---|---|---|
| 11 | 1.085 | 1.168 | 0.08237 | 107.59% | 0.200 | 583.93% |
| 12 | 0.740 | 0.833 | 0.09341 | 112.62% | 0.200 | 416.70% |
| 21 | 0.679 | 0.763 | 0.08481 | 112.50% | 0.399 | 191.40% |
| 22 | 0.467 | 0.538 | 0.07124 | 115.27% | 0.399 | 134.84% |

-continued

The fifth embodiment (Primary reference wavelength: 555 nm)

| 31 | 0.461 | 0.474 | 0.01314 | 102.85% | 0.200 | 237.09% |
| 32 | 0.416 | 0.418 | 0.00167 | 100.40% | 0.200 | 208.88% |
| 41 | 0.403 | 0.404 | 0.00094 | 100.23% | 0.327 | 123.29% |
| 42 | 0.469 | 0.491 | 0.02166 | 104.61% | 0.327 | 149.92% |
| 51 | 0.479 | 0.498 | 0.01910 | 103.99% | 0.305 | 163.25% |
| 52 | 0.555 | 0.593 | 0.03789 | 106.83% | 0.305 | 194.15% |
| 61 | 0.604 | 0.641 | 0.03667 | 106.07% | 0.200 | 320.37% |
| 62 | 0.780 | 0.890 | 0.11050 | 114.17% | 0.200 | 445.25% |

The following contents may be deduced from Table 9 and Table 10

Value associated with inflection point of the fifth embodiment
(Primary reference wavelength: 555 nm)

| HIF111 | 0.1811 | HIF111/HOI | 0.1811 | SGI111 | −0.0017 | \| SGI111 \|/(\| SGI111 \| + TP1) | 0.0084 |
| HIF211 | 0.5976 | HIF211/HOI | 0.5976 | SGI211 | 0.2512 | \| SGI211 \|/(\| SGI211 \| + TP2) | 0.3864 |
| HIF221 | 0.0998 | HIF221/HOI | 0.0998 | SGI221 | −0.0010 | \| SGI221 \|/(\| SGI221 \| + TP2) | 0.0025 |
| HIF321 | 0.1952 | HIF321/HOI | 0.1952 | SGI321 | 0.0105 | \| SGI321 \|/(\| SGI321 \| + TP3) | 0.0501 |
| HIF411 | 0.2103 | HIF411/HOI | 0.2103 | SGI411 | 0.0144 | \| SGI411 \|/(\| SGI411 \| + TP4) | 0.0421 |
| HIF521 | 0.4602 | HIF521/HOI | 0.4602 | SGI521 | −0.1482 | \| SGI521 \|/(\| SGI521 \| + TP5) | 0.3269 |
| HIF611 | 0.2081 | HIF611/HOI | 0.2081 | SGI611 | 0.0217 | \| SGI611 \|/(\| SGI611 \| + TP6) | 0.0980 |
| HIF621 | 0.2302 | HIF621/HOI | 0.2302 | SGI621 | 0.0312 | \| SGI621 \|/(\| SGI621 \| + TP6) | 0.1350 |

The Sixth Embodiment

Figure 6A:
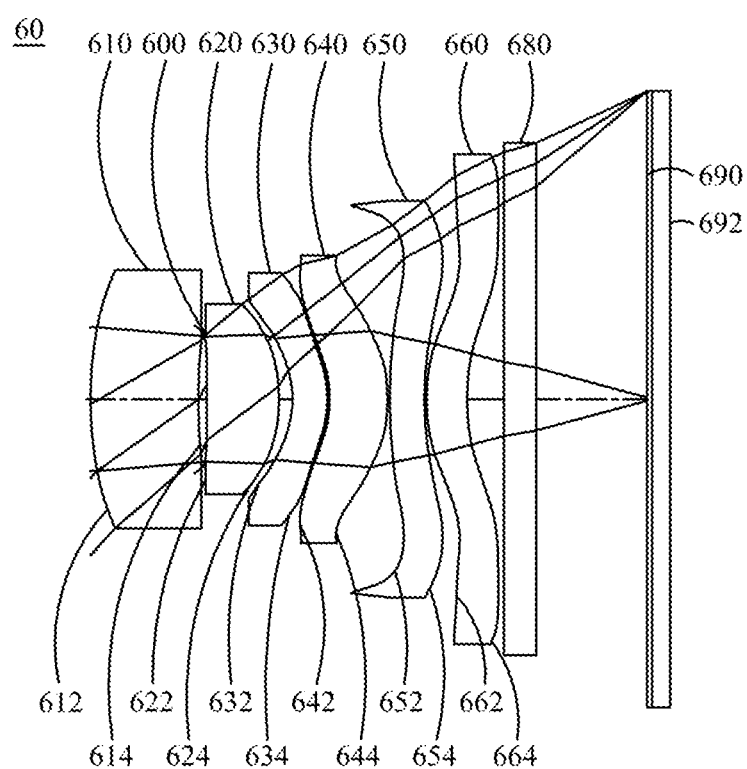
FIG. 6A is a schematic view of an optical image capturing system of a sixth embodiment of the present invention.
Figure 6B:
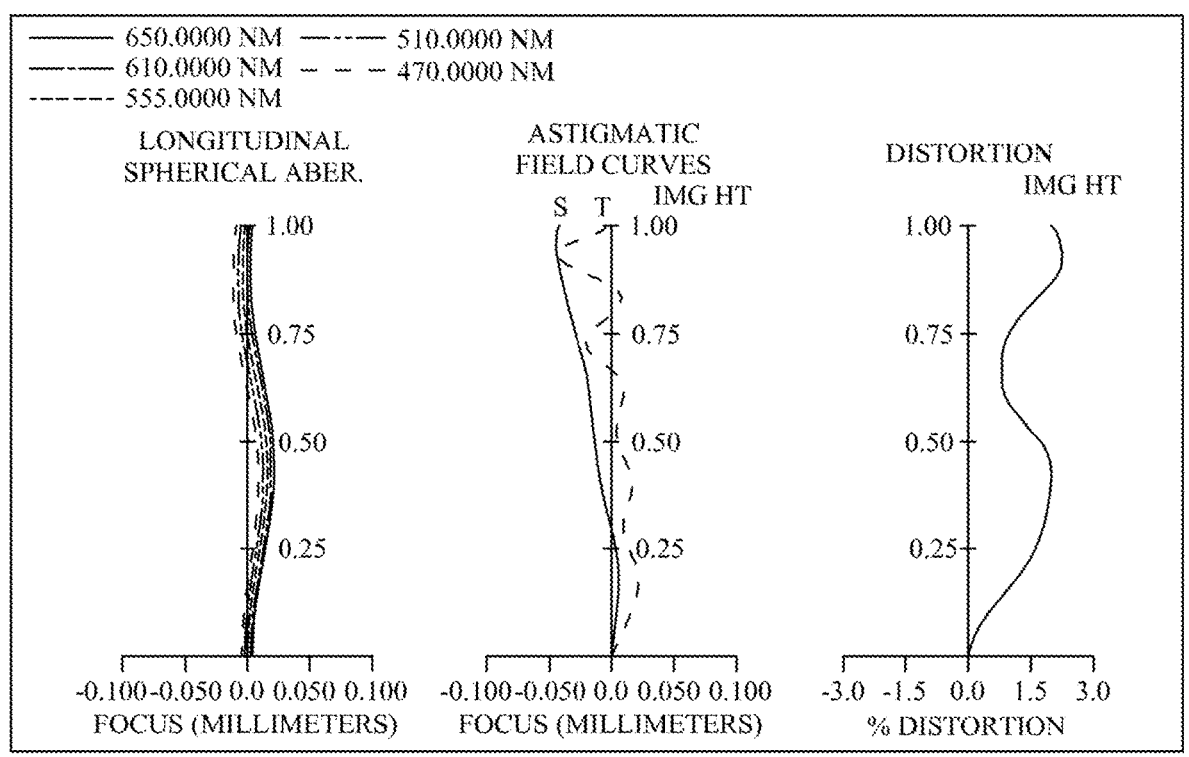
FIG. 6B shows curve diagrams of longitudinal spherical aberration, astigmatic field, and optical distortion of the optical image capturing system in the order from left to right of the sixth embodiment of the present invention.
Figure 6C:
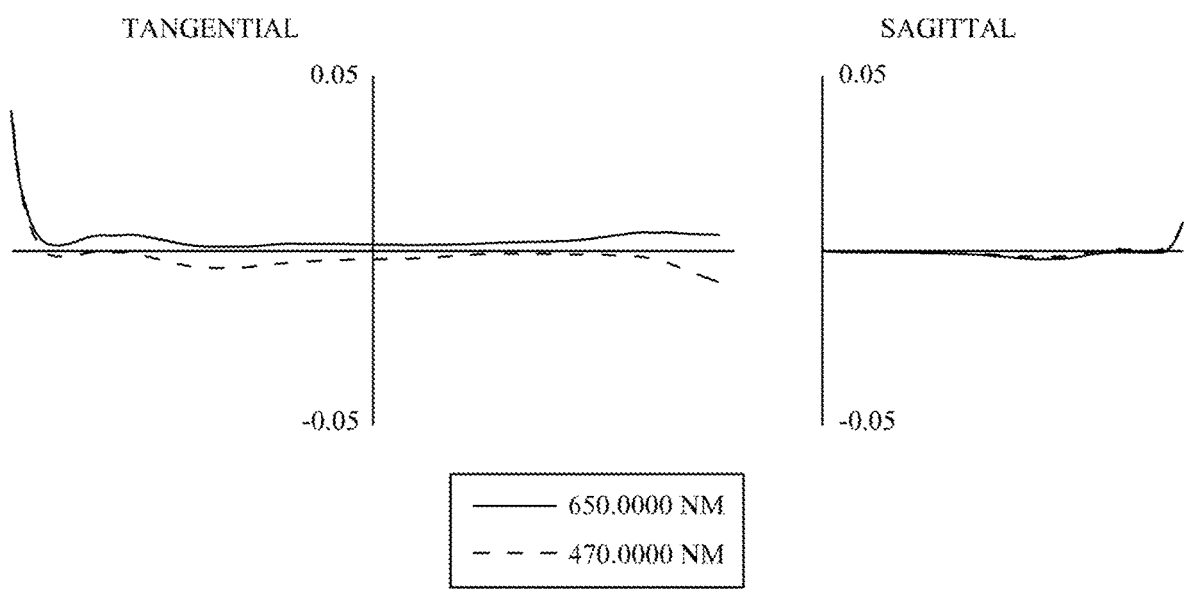
FIG. 6C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the sixth embodiment of the present invention.

Please refer to FIGS. 6A, 6B and 6C. FIG. 6A is a schematic view of an optical image capturing system of a sixth embodiment of the present invention. FIG. 6B shows curve diagrams of longitudinal spherical aberration, astigmatic field, and optical distortion of the optical image capturing system in the order from left to right of the sixth embodiment of the present invention. FIG. 6C is a transverse aberration diagram of the longest operation wavelength and the shortest operation wavelength for tangential fan and sagittal fan, in which the longest operation wavelength and the shortest operation wavelength pass through an edge of the entrance pupil and strike at the position of 0.7 field of view on the image plane, according to the sixth embodiment of the present invention. As shown in FIG. 6A, in order along an optical axis from an object side to an image side, the optical image capturing system comprises a first lens element 610, an aperture stop 600, a second lens element 620, a third lens element 630, a fourth lens element 640, a fifth lens element 650, a sixth lens element 660, an IR-bandstop Filter 680, an image plane 690 and an image-sensing device 692.

The first lens element 610 has positive refractive power and is made of a plastic material, has a convex object-side surface 612 and a concave image-side surface 614, and both of the object-side surface 612 and the image-side surface 614 are aspheric. The image-side surface 614 has an inflection point.

The second lens element 620 has positive refractive power and is made of a plastic material, has a convex object-side surface 622 and a convex image-side surface 624, and both of the object-side surface 622 and the image-side surface 624 are aspheric. The object-side surface 622 has two inflection points and the image-side surface 624 has an inflection point.

The third lens element 630 has negative refractive power and is made of a plastic material, and has a concave object-side surface 632 and a convex image-side surface 634, and both of the object-side surface 632 and the image-side surface 634 are aspheric. The object-side surface 632 has an inflection point and the image-side surface 634 has two inflection points.

The fourth lens element 640 has positive refractive power and is made of a plastic material, has a convex object-side surface 642 and a convex image-side surface 644, and both of the object-side surface 642 and the image-side surface 644 are aspheric. The object-side surface 642 has four inflection points and the image-side surface 644 has an inflection point.

The fifth lens element 650 has negative refractive power and is made of a plastic material, and has a concave object-side surface 652 and a convex image-side surface 654, and both of the object-side surface 652 and the image-side surface 654 are aspheric. The object-side surface 652 has an inflection point and the image-side surface 654 has two inflection points.

The sixth lens element 660 has positive refractive power and is made of a plastic material, has a convex object-side surface 662 and a concave image-side surface 664, and both of the object-side surface 112 and the image-side surface 114 are aspheric. Each of the object-side surface 662 and the image-side surface 664 has three inflection points. With this configuration, is useful to shorten the back focal length to maintain the characteristics of small size, the angle of incident with incoming light from an off-axis view field can be suppressed effectively, the off-axis view field aberration can be corrected.

The IR-bandstop Filter 680 is made of glass and disposed between the sixth lens element 660 and the image plane 690, and it does not affect the focal length of the optical image capturing system.

The parameters of the lens elements of the sixth embodiment are listed in Table 11 and Table 12.

TABLE 11

Lens Parameters for the Third Embodiment
f(Focus length) = 0.960 mm; f/HEP = 2.0;
HAF(half angle of view) = 45.007 deg

| Surface No. | | Curvature Radius | Thickness (mm) | Material |
|---|---|---|---|---|
| 0 | Object | 1E+18 | 1E+18 | |
| 1 | First lens | 1.233314315 | 0.387 | Plastic |
| 2 | | 2.078212821 | 0.005 | |

TABLE 11-continued

| | | | | |
|---|---|---|---|---|
| 3 | Aperture stop | 1E+18 | 0.026 | |
| 4 | Second lens | 429.1110516 | 0.259 | Plastic |
| 5 | | −0.494252587 | 0.049 | |
| 6 | Third lens | −0.289731115 | 0.125 | Plastic |
| 7 | | −0.404603609 | 0.008 | |
| 8 | Fourth lens | −0.477602131 | 0.209 | Plastic |
| 9 | | −0.436666405 | 0.008 | |
| 10 | Fifth lens | 1.282357856 | 0.125 | Plastic |
| 11 | | 0.969178281 | 0.008 | |
| 12 | Sixth lens | 0.628565522 | 0.146 | Plastic |
| 13 | | 0.829148193 | 0.132 | |
| 14 | IR-bandstop Filter | 1E+18 | 0.115 | BK_7 |
| 15 | | 1E+18 | 0.399 | |
| 16 | Image plate | 1E+18 | 0.000 | |

TABLE 11-continued

| Surface No. | Refractive Index | Coefficient of Dispersion | Focus length |
|---|---|---|---|
| 0 | | | |
| 1 | 1.544 | 56.064 | 4.783 |
| 2 | | | |
| 3 | | | |
| 4 | 1.544 | 56.064 | 0.905 |
| 5 | | | |
| 6 | 1.636 | 23.879 | −2.771 |
| 7 | | | |
| 8 | 1.544 | 56.064 | 3.328 |
| 9 | | | |
| 10 | 1.661 | 20.391 | −7.082 |
| 11 | | | |
| 12 | 1.544 | 56.064 | 3.786 |
| 13 | | | |
| 14 | 1.517 | 64.13 | |
| 15 | | | |
| 16 | | | |

Reference wavelength = 555 nm; shield position: the clear aperture of the second surface is 0.206 mm; the clear aperture of the seventh surface is 0.410 mm; the clear aperture of the thirteenth surface is 0.795 mm

TABLE 12

Aspheric Coefficients of the sixth embodiment
Table 12: Aspheric Coefficients of the sixth embodiment

| | Surface No. | | | |
|---|---|---|---|---|
| | 1 | 2 | 4 | 5 |
| k | −1.952190E+01 | 0.000000E+00 | 0.000000E+00 | 0.000000E+00 |
| A4 | 1.788875E+00 | 3.557461E+00 | −3.077818E+00 | 1.253605E+00 |
| A6 | −7.331133E+00 | −2.018251E+02 | 2.157285E+02 | −1.718962E+02 |
| A8 | 4.074958E+01 | 5.979704E+03 | −1.616763E+04 | 1.814609E+03 |
| A10 | −1.013660E+02 | −8.173361E+04 | 5.231324E+05 | 2.707594E+04 |
| A12 | 3.064577E−01 | 1.376449E−03 | −1.208328E+07 | −8.105341E+05 |
| A14 | 1.075234E−03 | −1.431066E−02 | 1.962836E+08 | 6.928808E+06 |
| A16 | −1.197243E−02 | 0.000000E+00 | −1.669081E+09 | −1.997921E+07 |
| A18 | 0.000000E+00 | 0.000000E+00 | 0.000000E+00 | 0.000000E+00 |

| | Surface No. | | | |
|---|---|---|---|---|
| | 6 | 7 | 8 | 9 |
| k | −3.409608E−01 | −1.346002E−01 | −4.019171E−01 | −2.923210E−01 |
| A4 | 1.322701E+01 | −2.345373E+01 | −4.170799E+01 | −4.661786E+00 |
| A6 | −2.693844E+02 | 1.097636E+03 | 1.569550E+03 | 1.152305E+02 |
| A8 | 1.170067E+03 | −1.756130E+04 | −2.392649E+04 | −6.992565E+02 |
| A10 | 9.556469E+04 | 1.528863E+05 | 1.972109E+05 | −2.902271E+03 |
| A12 | −1.895245E+06 | −7.802444E+05 | −9.138245E+05 | 5.707743E+04 |
| A14 | 1.412104E+07 | 2.215109E+06 | 2.254171E+06 | −2.385760E+05 |
| A16 | −3.695447E+07 | −2.669325E+06 | −2.318342E+06 | 3.246765E+05 |
| A18 | 0.000000E+00 | 0.000000E+00 | 0.000000E+00 | 0.000000E+00 |

| | Surface No. | | | |
|---|---|---|---|---|
| | 10 | 11 | 12 | 13 |
| k | 3.138932E+00 | 3.592911E−01 | −1.598241E+00 | −2.281291E−01 |
| A4 | −5.805360E+00 | −2.736264E+00 | 6.405870E+00 | 6.612076E+00 |
| A6 | 1.227052E+02 | 4.196027E+01 | −7.952857E+01 | −8.319541E+01 |
| A8 | −1.216815E+03 | −3.640363E+02 | 3.263246E+02 | 3.781528E+02 |
| A10 | 6.358045E+03 | 1.458108E+03 | −6.695958E+02 | −9.261991E+02 |
| A12 | −1.909459E+04 | −3.046758E+03 | 7.281528E+02 | 1.296581E+03 |
| A14 | 3.133547E+04 | 3.182756E+03 | −3.897610E+02 | −9.829043E+02 |
| A16 | −2.207611E+04 | −1.276123E+03 | 7.643286E+01 | 3.130303E+02 |
| A18 | 0.000000E+00 | 0.000000E+00 | 0.000000E+00 | 0.000000E+00 |

In the sixth embodiment, the presentation of the aspheric surface formula is similar to that in the first embodiment. furthermore, the definitions of parameters in following tables are equal to those in the first embodiment, so the repetitious details will not be given here.

The following contents may be deduced from Table 11 and Table 12

| The sixth embodiment (Primary reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.20490 | 1.08351 | 0.35375 | 0.29450 | 0.13839 | 0.25891 |
| ΣPPR | ΣNPR | \|ΣNPR\| | IN12/f | ΣPPR/ \|ΣNPR\| | TP4/ (IN34 + TP4 + IN45) |
| 0.63779 | 1.69617 | 0.37602 | 0.03163 | 0.00765 | 0.93308 |
| \|f1/f2\| | \|f2/f3\| | | (TP1 + IN12)/TP2 | | (TP6 + IN56)/TP5 |
| 5.28789 | 0.32648 | | 1.61378 | | 1.22967 |
| HOS | InTL | HOS/HOI | InS/HOS | ODT % | TDT % |
| 2.00000 | 1.35369 | 2.00000 | 0.80642 | 2.26315 | 1.47415 |
| HVT51 | HVT52 | HVT61 | HVT62 | HVT62/HOI | HVT62/HOS |
| 0.446728 | 0.45112 | 0.45836 | 0.64508 | 0.64508 | 0.32254 |
| HVT21 | HVT22 | HVT31 | HVT32 | HVT41 | HVT42 |
| 0.014 | 0.000 | 0.000 | 0.000 | 0.393 | 0.440 |
| TP2/TP3 | TP3/TP4 | InRS61 | InRS62 | \|InRS61\|/ TP6 | \|InRS62\|/ TP6 |
| 2.07298 | 0.59762 | 0.10191 | 0.08561 | 0.69702 | 0.58551 |
| PLTA | PSTA | NLTA | NSTA | SLTA | SSTA |
| −0.009 mm | 0.005 mm | 0.037 mm | 0.040 mm | 0.008 mm | 0.008 mm |
| IN12 + IN23 | IN34 + IN45 | IN12 | IN23 | IN34 | IN45 |
| 0.080 | 0.016 | 0.031 | 0.049 | 0.008 | 0.008 |
| PhiA11 | PhiA12 | PhiA6 | PhiB | PhiC | PhiD |
| 0.852 mm | 0.426 mm | 1.590 mm | 1.605 mm | 1.805 mm | 2.205 mm |
| PhiA6/ InTL | PhiA6/ 2HOI | PhiA11/ 2HOI | SFR (PhiA11/ PhiA6) | | |
| 1.1746 | 0.795 | 0.426 | 0.5358 | | |

The values associated with outline curve length may be deduced from Table 11 and Table 12.

| The sixth embodiment (Primary reference wavelength: 555 nm) | | | | | | |
|---|---|---|---|---|---|---|
| ARE | 1/2(HEP) | ARE value | ARE − 1/2(HEP) | 2(ARE/ HEP)% | TP | ARE/ TP(%) |
| 11 | 0.233 | 0.235 | 0.00127 | 100.54% | 0.387 | 60.60% |
| 12 | 0.206 | 0.206 | 0.00022 | 100.11% | 0.387 | 53.28% |
| 21 | 0.214 | 0.214 | 0.00057 | 100.27% | 0.259 | 82.68% |
| 22 | 0.233 | 0.246 | 0.01263 | 105.41% | 0.259 | 94.93% |
| 31 | 0.233 | 0.253 | 0.01969 | 108.44% | 0.125 | 202.44% |
| 32 | 0.233 | 0.243 | 0.01004 | 104.30% | 0.125 | 194.73% |
| 41 | 0.233 | 0.244 | 0.01104 | 104.73% | 0.209 | 116.85% |
| 42 | 0.233 | 0.245 | 0.01210 | 105.19% | 0.209 | 117.36% |
| 51 | 0.233 | 0.234 | 0.00039 | 100.17% | 0.125 | 187.00% |
| 52 | 0.233 | 0.235 | 0.00131 | 100.56% | 0.125 | 187.74% |
| 61 | 0.233 | 0.240 | 0.00711 | 103.05% | 0.146 | 164.47% |
| 62 | 0.233 | 0.238 | 0.00494 | 102.12% | 0.146 | 162.99% |
| ARS | EHD | ARS value | ARS − EHD | (ARS/ EHD)% | TP | ARS/ TP(%) |
| 11 | 0.433 | 0.447 | 0.01407 | 103.25% | 0.387 | 115.37% |
| 12 | 0.206 | 0.206 | 0.00022 | 100.11% | 0.387 | 53.28% |
| 21 | 0.214 | 0.214 | 0.00057 | 100.27% | 0.259 | 82.68% |
| 22 | 0.315 | 0.355 | 0.03958 | 112.55% | 0.259 | 136.99% |
| 31 | 0.333 | 0.378 | 0.04552 | 113.69% | 0.125 | 302.50% |
| 32 | 0.410 | 0.449 | 0.03919 | 109.56% | 0.125 | 359.35% |
| 41 | 0.452 | 0.469 | 0.01743 | 103.86% | 0.209 | 224.44% |
| 42 | 0.485 | 0.532 | 0.04671 | 109.62% | 0.209 | 254.44% |
| 51 | 0.579 | 0.598 | 0.01906 | 103.29% | 0.125 | 478.42% |
| 52 | 0.670 | 0.692 | 0.02197 | 103.28% | 0.125 | 553.83% |
| 61 | 0.806 | 0.826 | 0.02013 | 102.50% | 0.146 | 565.15% |
| 62 | 0.795 | 0.816 | 0.02059 | 102.59% | 0.146 | 558.01% |

The following contents may be deduced from Table 11 and Table 12.

| Value associated with inflection point of the sixth embodiment (Primary reference wavelength: 555 nm) | | | | | | |
|---|---|---|---|---|---|---|
| HIF121 | 0.1620 | HIF121/HOI | 0.1620 | SGI121 | 0.0069 | \|SGI121\|/ (\|SGI121\| + TP1) | 0.0176 |
| HIF211 | 0.0080 | HIF211/HOI | 0.0080 | SGI211 | 0.0000 | \|SGI211\|/ (\|SGI211\| + TP2) | 0.0000 |
| HIF212 | 0.0080 | HIF212/HOI | 0.0080 | SGI212 | 0.0000 | \|SGI212\|/ (\|SGI212\| + TP2) | 0.0000 |
| HIF221 | 0.3061 | HIF221/HOI | 0.3061 | SGI221 | −0.1291 | \|SGI221\|/ (\|SGI221\| + TP2) | 0.3325 |
| HIF311 | 0.2855 | HIF311/HOI | 0.2855 | SGI311 | −0.1286 | \|SGI311\|/ (\|SGI311\| + TP3) | 0.5071 |
| HIF321 | 0.1659 | HIF321/HOI | 0.1659 | SGI321 | −0.0382 | \|SGI321\|/ (\|SGI321\| + TP3) | 0.2340 |
| HIF322 | 0.2469 | HIF322/HOI | 0.2469 | SGI322 | −0.0686 | \|SGI322\|/ (\|SGI322\| + TP3) | 0.3542 |
| HIF411 | 0.1649 | HIF411/HOI | 0.1649 | SGI411 | −0.0388 | \|SGI411\|/ (\|SGI411\| + TP4) | 0.1564 |
| HIF412 | 0.2777 | HIF412/HOI | 0.2777 | SGI412 | −0.0804 | \|SGI412\|/ (\|SGI412\| + TP4) | 0.2776 |
| HIF413 | 0.2963 | HIF413/HOI | 0.2963 | SGI413 | −0.0862 | \|SGI413\|/ (\|SGI413\| + TP4) | 0.2917 |
| HIF414 | 0.4330 | HIF414/HOI | 0.4330 | SGI414 | −0.1029 | \|SGI414\|/ (\|SGI414\| + TP4) | 0.3298 |
| HIF421 | 0.3330 | HIF421/HOI | 0.3330 | SGI421 | −0.1339 | \|SGI421\|/ (\|SGI421\| + TP4) | 0.3903 |
| HIF511 | 0.3203 | HIF511/HOI | 0.3203 | SGI511 | 0.0331 | \|SGI511\|/ (\|SGI511\| + TP5) | 0.2091 |
| HIF521 | 0.3099 | HIF521/HOI | 0.3099 | SGI521 | 0.0421 | \|SGI521\|/ (\|SGI521\| + TP5) | 0.2520 |
| HIF522 | 0.6355 | HIF522/HOI | 0.6355 | SGI522 | 0.0066 | \|SGI522\|/ (\|SGI522\| + TP5) | 0.0501 |
| HIF611 | 0.2655 | HIF611/HOI | 0.2655 | SGI611 | 0.0656 | \|SGI611\|/ (\|SGI611\| + TP6) | 0.3098 |
| HIF612 | 0.5338 | HIF612/HOI | 0.5338 | SGI612 | 0.1136 | \|SGI612\|/ (\|SGI612\| + TP6) | 0.4373 |

Value associated with inflection point of the sixth embodiment
(Primary reference wavelength: 555 nm)

| | | | | | | | |
|---|---|---|---|---|---|---|---|
| HIF613 | 0.6453 | HIF613/HOI | 0.6453 | SGI613 | 0.1067 | \| SGI613 \|/ (\| SGI613 \| + TP6) | 0.4218 |
| HIF621 | 0.2724 | HIF621/HOI | 0.2724 | SGI621 | 0.0577 | \| SGI621 \|/ (\| SGI621 \| + TP6) | 0.2830 |
| HIF622 | 0.5616 | HIF622/HOI | 0.5616 | SGI622 | 0.1115 | \| SGI622 \|/ (\| SGI622 \| + TP6) | 0.4327 |
| HIF623 | 0.5977 | HIF623/HOI | 0.5977 | SGI623 | 0.1120 | \| SGI623 \|/ (\| SGI623 \| + TP6) | 0.4337 |

Although the present invention is disclosed via the aforementioned embodiments, those embodiments do not serve to limit the scope of the present invention. A person skilled in the art may perform various alterations and modifications to the present invention without departing from the spirit and the scope of the present invention. Hence, the scope of the present invention should be defined by the following appended claims.

Despite the fact that the present invention is specifically presented and illustrated with reference to the exemplary embodiments thereof, it should be obvious to a person skilled in the art that, various modifications to the forms and details of the present invention may be performed without departing from the scope and spirit of the present invention defined by the following claims and equivalents thereof.

What is claimed is:

1. An optical image capturing system, in order along an optical axis from an object side to an image side, comprising:
    a first lens element with refractive power;
    a second lens element with refractive power;
    a third lens element with refractive power;
    a fourth lens element with refractive power;
    a fifth lens element with refractive power;
    a sixth lens element with refractive power; and
    an image plane;
    wherein the optical image capturing system comprises six lenses with refractive power, at least one lens element among the first lens element to the sixth lens element has positive refractive power, focal lengths of the first lens element to the sixth lens element are denoted by f1, f2, f3, f4, f5 and f6, a focal length of the optical image capturing system is denoted by f, an entrance pupil diameter of the optical image capturing system is denoted by HEP, a distance on the optical axis from an object-side surface of the first lens element to the image plane is denoted by HOS, a distance on the optical axis from the object-side surface of the first lens element to an image-side surface of the sixth lens element is denoted by InTL, a half of the maximum field angle of the optical image capturing system is denoted by HAF, a length of outline curve of a half of an entrance pupil diameter (HEP) of any surface of a single lens element refers to a length of outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE, and a maximum effective diameter of the image-side surface of the sixth lens element is denoted by PhiA6, wherein the optical image capturing system satisfies: 1.0≤f/HEP≤10; 0.5≤HOS/f≤30; 0<PhiA6/InTL≤1.6; and 0.1≤2(ARE/HEP)≤2.0;
    wherein the refractive powers of the first lens element to the sixth lens element are −+−++−, +−+++−, +−+−++, +−+−+− or ++−+−+ in sequence;
    wherein the entrance pupil diameter HEP is smaller than or substantially equal to diameters of the first lens element, the second lens element, the third lens element, the fourth lens element, the fifth lens element and the sixth lens element.

2. The optical image capturing system according to claim 1, wherein the half of the maximum field angle of the optical image capturing system is denoted by HAF, and the optical image capturing system satisfies: 0 deg<HAF≤100 deg.

3. The optical image capturing system according to claim 1, wherein the maximum height for image formation perpendicular to the optical axis on the image plane is denoted by HOI, and the optical image capturing system satisfies: 0<PhiA6/2HOI≤1.5.

4. The optical image capturing system according to claim 1, wherein a maximum effective diameter of the object-side surface of the first lens element is denoted by PhiA11, and the optical image capturing system satisfies: 0<PhiA11/2HOI≤1.5.

5. The optical image capturing system according to claim 4, wherein the optical image capturing system satisfies: 0<PhiA11/PhiA6≤1.5.

6. The optical image capturing system according to claim 1, wherein a maximum effective half diameter, which is a perpendicular distance between the optical axis and a crossing point on a surface where incident light with a maximum viewing angle of the optical image capturing system passing a very edge of the entrance pupil, of any surface of any lens is denoted by EHD, a length of the outline curve of the maximum effective half diameter position of any surface of a single lens element refers to a length of the outline curve from an axial point on the surface of the lens element to the maximum effective half diameter position of the surface along an outline of the surface of the lens element and is denoted as ARS, and the optical image capturing system satisfies: 0.9≤ARS/EHD≤2.0.

7. The optical image capturing system according to claim 1, wherein TV distortion for image formation in the optical image capturing system is denoted by TDT, the maximum height for image formation perpendicular to the optical axis on the image plane is denoted as HOI, the transverse aberration of the visible rays with the longest operation wavelength from the positive-directional tangential fan, which pass through an edge of the entrance pupil and strike at the position of 0.7 HOI on the image plane, is denoted as PLTA, the transverse aberration of the visible rays with the shortest operation wavelength from the positive-directional tangential fan, which pass through the edge of the entrance pupil and strike at the position of 0.7 HOI on the image plane, is denoted as PSTA, the transverse aberration of the visible rays with the longest operation wavelength from negative-directional tangential fan, which pass through the edge of the entrance pupil and strike at the position of 0.7 HOI on the image plane, is denoted as NLTA, the transverse aberration of the visible rays with the shortest operation wavelength from a negative-directional tangential fan, which pass through the edge of the entrance pupil and strike at the position of 0.7 HOI on the image plane, is denoted as NSTA, the transverse aberration of the visible rays with the longest operation wavelength from a sagittal fan, which pass through the edge of the entrance pupil and strike at the position of 0.7 HOI on the image plane, is denoted as SLTA, the transverse aberration of the visible rays with the shortest operation wavelength from the sagittal fan, which pass through the edge of the entrance pupil and strike at the position of 0.7 HOI on the image plane, is denoted as SSTA, wherein the optical image capturing system satisfies: PLTA≤50 μm; PSTA≤50 μm; NLTA≤50 μm; NSTA≤50 μm; SLTA≤50 μm; SSTA≤50 μm; and |TDT|<150%.

8. The optical image capturing system according to claim 1, wherein a length of the ½ entrance pupil diameter outline curve of the object-side surface of the sixth lens element is denoted as ARE61, a length of the ½ entrance pupil diameter outline curve of the image-side surface of the first lens element is denoted as ARE62, a central thickness of the sixth lens element on the optical axis is denoted by TP6, and the optical image capturing system satisfies: 0.05≤ARE 61/TP6≤25; and 0.05≤ARE 62/TP6≤25.

9. The optical image capturing system according to claim 1, further comprising an aperture stop, wherein a distance on the optical axis from the aperture stop to the image plane is denoted by InS, and the optical image capturing system satisfies: 0.2≤InS/HOS≤1.1.

10. An optical image capturing system, in order along an optical axis from an object side to an image side, comprising:
a first lens element with refractive power;
a second lens element with refractive power;
a third lens element with refractive power;
a fourth lens element with refractive power;
a fifth lens element with refractive power;
a sixth lens element with refractive power;
an image plane;
a first positioning element comprising a holder, wherein the holder is in a hollow shape and opaque, and comprises a cylinder and a basement connected with each other; the cylinder is configured to accommodate the first to sixth lens elements; the basement is between the sixth lens element and the image plane, an outer periphery of the basement is greater than an outer periphery of the cylinder; a maximum value of the minimum side length of the basement perpendicular to the optical axis is denoted by PhiD;
wherein the optical image capturing system comprises six lens elements with refractive powers, focal lengths of the first lens element to the sixth lens element are denoted by f1, f2, f3, f4, f5 and f6, a focal length of the optical image capturing system is denoted by f, an entrance pupil diameter of the optical image capturing system is denoted by HEP, a distance on the optical axis from an object-side surface of the first lens element to the image plane is denoted by HOS, a distance on the optical axis from the object-side surface of the first lens element to an image-side surface of the sixth lens element is denoted by InTL, a length of the outline curve of a half of an entrance pupil diameter (HEP) of any surface of a single lens element refers to a length of outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE, wherein the optical image capturing system satisfies: 1.0≤f/HEP≤10; 0.5≤HOS/f≤30; 0 mm<PhiD≤16 mm; and 0.1≤2(ARE/HEP)≤2.0;
wherein the refractive powers of the first lens element to the sixth lens element are −+−++−, +−+++−, +−+−++, +−+−+− or ++−+−+ in sequence;
wherein the entrance pupil diameter HEP is smaller than or substantially equal to diameters of the first lens element, the second lens element, the third lens element, the fourth lens element, the fifth lens element and the sixth lens element.

11. The optical image capturing system according to claim 10, wherein a maximum effective diameter of the image-side surface of the sixth lens element is denoted by PhiA6, and the optical image capturing system satisfies: 0<PhiA6/InTL≤1.6.

12. The optical image capturing system according to claim 10, wherein a half of a maximum view angle of the optical image capturing system is denoted by HAF, and the optical image capturing system satisfies: 0 deg<HAF≤100 deg.

13. The optical image capturing system according to claim 10, wherein the maximum effective diameter of the image-side surface of the sixth lens element is denoted by PhiA6, and a maximum height for image formation perpendicular to the optical axis on the image plane is denoted by HOI, and the optical image capturing system satisfies: 0<PhiA6/2HOI≤1.5.

14. The optical image capturing system according to claim 10, wherein a maximum effective diameter of the object-side surface of the first lens element is denoted by PhiA11, and a maximum height for image formation perpendicular to the optical axis on the image plane is denoted by HOI, wherein the optical image capturing system satisfies: 0<PhiA11/2HOI≤1.5.

15. The optical image capturing system according to claim 14, wherein the optical image capturing system satisfies: 0<PhiA11/PhiA6≤1.5.

16. The optical image capturing system according to claim 10, wherein a maximum effective half diameter, which is a perpendicular distance between the optical axis and a crossing point on a surface where incident light with a maximum viewing angle of the optical image capturing system passing a very edge of the entrance pupil, of any surface of any lens is denoted by EHD, a length of outline curve of the maximum effective half diameter position of any surface of a single lens element refers to a length of outline curve from an axial point on the surface of the lens element to the maximum effective half diameter position of the surface along an outline of the surface of the lens element and is denoted as ARS, wherein the optical image capturing system satisfies: 0.9≤ARS/EHD≤2.0.

17. The optical image capturing system according to claim 10, wherein the maximum height for image formation of a visible spectrum on the image plane perpendicular to the optical axis in the optical image capturing system is denoted by HOI, a relative illumination of the HOT is denoted by RI, the transverse aberration of the visible rays with the longest operation wavelength from the positive-directional tangential fan, which pass through an edge of the entrance pupil and strike at the position of 0.7 HOI on the image plane, is denoted as PLTA, and the transverse aberration of the visible rays with the shortest operation wavelength from the positive-directional tangential fan, which pass through the edge of the entrance pupil and strike at the position of 0.7 HOI on the image plane, is denoted as PSTA, the transverse aberration of the visible rays with the longest operation wavelength from negative-directional tangential fan, which pass through the edge of the entrance pupil and strike at the position of 0.7 HOI on the image plane, is denoted as NLTA, the transverse aberration of the visible rays with the shortest operation wavelength from a negative-directional tangential fan, which pass through the edge of the entrance pupil and strike at the position of 0.7 HOI on the image plane, is denoted as NSTA, the transverse aberration of the visible rays with the longest operation wavelength from a sagittal fan, which pass through the edge of the entrance pupil and strike at the position of 0.7 HOI on the image plane, is denoted as SLTA, the transverse aberration of the visible rays with the shortest operation wavelength from the sagittal fan, which pass through the edge of the entrance pupil and strike at the position of 0.7 HOI on the image plane, is denoted as SSTA, wherein the optical image capturing system satisfies: PLTA≤100 μm; PSTA≤100 μm; NLTA≤100 μm; NSTA≤100 μm; SLTA≤100 μm; SSTA≤100 μm; and 10%≤RI<100%.

18. The optical image capturing system according to claim 10, wherein a distance on the optical axis between the fifth lens element and the sixth lens element is IN56, wherein the optical image capturing system satisfies: 0<IN56/f≤5.0.

19. The optical image capturing system according to claim 10, wherein at least one of the first lens element, the second lens element, the third lens element, the fourth lens element, the fifth lens element and the sixth lens element is provided with a coating film or made of a material for blocking light with a wavelength of less than 500 nm.

20. An optical image capturing system, in order along an optical axis from an object side to an image side, comprising:
a first lens element with refractive power;
a second lens element with refractive power;
a third lens element with refractive power;
a fourth lens element with refractive power;
a fifth lens element with refractive power;
a sixth lens element with refractive power;
an image plane;
a first positioning element comprising a holder, wherein the holder is in a hollow shape and opaque, and comprises a cylinder and a basement connected with each other, and the cylinder is configured to accommodate the six lens elements; the basement is between the sixth lens element and the image plane; an outer periphery of the basement is greater than an outer periphery of the cylinder; and a maximum value of the minimum side length of the basement perpendicular to the optical axis denoted by PhiD; and
a second positioning element accommodated in the holder and comprising a positioning part and a connection part, wherein the positioning part is in a hollow shape and directly contacts and accommodates any of the six lens elements to arrange the six lens elements on the optical axis; the connection part is disposed outside the positioning part and directly contacts an inner periphery of the cylinder, and a maximum outer diameter of the connection part perpendicular to the surface of the optical axis is denoted by PhiC;
wherein the optical image capturing system comprises six lens elements with refractive powers, focal lengths of the first lens element to the sixth lens element are denoted by f1, f2, f3, f4, f5 and f6, a focal length of the optical image capturing system is denoted by f, an entrance pupil diameter of the optical image capturing system is denoted by HEP, a distance on the optical axis from an object-side surface of the first lens element to the image plane is denoted by HOS, a distance on the optical axis from the object-side surface of the first lens element to an image-side surface of the sixth lens element is denoted by InTL, a maximum height for image formation perpendicular to the optical axis on the image plane is denoted as HOI, a maximum effective diameter of the image-side surface of the sixth lens element is denoted by PhiA6, a length of outline curve of a half of a pupil diameter (HEP) of any surface of a single lens element refers to a length of outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE, wherein the optical image capturing system satisfies: 1.0≤f/HEP≤10; 0.5≤HOS/f≤30; PhiC<PhiD; 0 mm<PhiD≤16 mm; and 0.1≤2(ARE/HEP)≤2.0;
wherein the refractive powers of the first lens element to the sixth lens element are −+−++−, +−+++−, +−+−++, +−+−+− or ++−+−+ in sequence;
wherein the entrance pupil diameter HEP is smaller than or substantially equal to diameters of the first lens element, the second lens element, the third lens element, the fourth lens element, the fifth lens element and the sixth lens element.

21. The optical image capturing system according to claim 20, wherein a half of the maximum field angle of the optical image capturing system is denoted by HAF, wherein the optical image capturing system satisfies: 0 deg<HAF≤100 deg.

22. The optical image capturing system according to claim 20, wherein a maximum effective diameter of the image-side surface of the sixth lens element is denoted by PhiA6, the maximum height for image formation perpendicular to the optical axis on the image plane is denoted by HOI, wherein the optical image capturing system satisfies: 0<PhiA6/2HOI≤1.5.

23. The optical image capturing system according to claim 20, wherein a maximum effective diameter of the object-side surface of the first lens element is denoted by PhiA11, a maximum height for image formation perpendicular to the optical axis on the image plane is denoted by HOI, wherein the optical image capturing system satisfies: 0<PhiA11/2HOI≤1.5.

24. The optical image capturing system according to claim 23, wherein the optical image capturing system satisfies: 0<PhiA11/PhiA6≤1.5.

25. The optical image capturing system according to claim 20, further comprising an aperture stop, an image-sensing device and a driving module, wherein the image-sensing device is disposed in the image plane, a distance on the optical axis from the aperture stop to the image plane is denoted by InS, and the driving module is coupled with the six lens elements to displace the lens elements, and the optical image capturing system satisfies: $0.2 \leq InS/HOS \leq 1.1$.

* * * * *